(12) United States Patent
Nishi

(10) Patent No.: US 12,264,456 B2
(45) Date of Patent: Apr. 1, 2025

(54) SHOVEL

(71) Applicant: SUMITOMO CONSTRUCTION MACHINERY CO., LTD., Tokyo (JP)

(72) Inventor: Takashi Nishi, Chiba (JP)

(73) Assignee: SUMITOMO CONSTRUCTION MACHINERY CO., LTD., Tokyo (JP)

( * ) Notice: Subject to any disclaimer, the term of this patent is extended or adjusted under 35 U.S.C. 154(b) by 755 days.

(21) Appl. No.: 17/171,081

(22) Filed: Feb. 9, 2021

(65) Prior Publication Data

US 2021/0164194 A1 Jun. 3, 2021

Related U.S. Application Data

(63) Continuation of application No. PCT/JP2019/031706, filed on Aug. 9, 2019.

(30) Foreign Application Priority Data

Aug. 10, 2018 (JP) .................. 2018-151853

(51) Int. Cl.
*E02F 9/20* (2006.01)
*E02F 9/22* (2006.01)
(Continued)

(52) U.S. Cl.
CPC ............ *E02F 9/205* (2013.01); *E02F 9/2004* (2013.01); *E02F 9/2246* (2013.01); *E02F 9/262* (2013.01); *F15B 15/20* (2013.01); *G06V 40/20* (2022.01); *E02F 9/2235* (2013.01); *E02F 9/2285* (2013.01); *E02F 9/2292* (2013.01); *E02F 9/2296* (2013.01); *G06F 3/017* (2013.01)

(58) Field of Classification Search
CPC ....... E02F 9/205; E02F 9/2004; E02F 9/2246; E02F 9/262; E02F 9/2235; E02F 9/2285; E02F 9/2292; F15B 15/20; G06V 40/20
See application file for complete search history.

(56) References Cited

U.S. PATENT DOCUMENTS 9,393,699 B1 * 7/2016 Jules ...................... B25J 9/1656
9,834,905 B2   12/2017 Matsuyama et al.
(Continued)

FOREIGN PATENT DOCUMENTS

JP   H04-330123   11/1992
JP   2017-214761  12/2017
(Continued)

OTHER PUBLICATIONS

"Controlling a Robot Using Leap Motion", Chen, Chang et al. International Conference on Robotics and Automation Engineering, 2017 (Year: 2017).*
(Continued)

*Primary Examiner* — Joan T Goodbody
*Assistant Examiner* — Godfrey Aleksander MacIorowski
(74) *Attorney, Agent, or Firm* — IPUSA, PLLC

(57) ABSTRACT

A shovel includes an operating element and circuitry. The circuitry is configured to recognize a worker in an area surrounding the shovel and recognize a predetermined gesture made by the recognized worker. The circuitry is further configured to perform operation control on the operating element in response to the predetermined gesture made by the worker recognized by the recognition part.

17 Claims, 18 Drawing Sheets

(51) Int. Cl.
*E02F 9/26* (2006.01)
*F15B 15/20* (2006.01)
*G06V 40/20* (2022.01)
*G06F 3/01* (2006.01)

(56) References Cited

U.S. PATENT DOCUMENTS

| | | | |
|---|---|---|---|
| 2008/0085048 A1* | 4/2008 | Venetsky | G06V 40/28 |
| | | | 382/114 |
| 2012/0124516 A1* | 5/2012 | Friedman | G06F 3/017 |
| | | | 715/810 |
| 2012/0283896 A1 | 11/2012 | Persaud et al. | |
| 2014/0247263 A1* | 9/2014 | Wilson | F16M 11/2064 |
| | | | 345/420 |
| 2014/0343820 A1* | 11/2014 | Kim | E02F 9/24 |
| | | | 701/99 |
| 2015/0329117 A1* | 11/2015 | Bernier | B60W 10/06 |
| | | | 701/110 |
| 2016/0103553 A1* | 4/2016 | Peterson | G06F 3/0416 |
| | | | 345/173 |
| 2018/0101235 A1* | 4/2018 | Bodensteiner | H04W 4/021 |
| 2019/0346929 A1* | 11/2019 | Misra | G06V 40/28 |

FOREIGN PATENT DOCUMENTS

| | | |
|---|---|---|
| WO | 2016/035898 | 3/2016 |
| WO | 2017/058553 | 4/2017 |

OTHER PUBLICATIONS

Chen, Chang, et al, "Controlling a Robot Using Leap Motion", 2017 2nd International Conference on Robotics and Automation Engineering. (Year: 2017).*

Chen, Cheng, et al, "Controlling a Robot using Leap Motion", 2017 2nd International Conference on Robotics and Automation Engineering (Year: 2017).*

International Search Report for PCT/JP2019/031706 mailed on Nov. 5, 2019.

* cited by examiner

| OPERATION DETAILS | RECOGNITION TARGET GESTURE |
|---|---|
| RAISE ATTACHMENT |  |
| LOWER ATTACHMENT |  |
| HORIZONTAL MOVEMENT (SWING/TRAVEL) |  |
| CRAWLER SPIN TURN |  |
| STOP |  |
| SUDDEN STOP |  |
| CANCEL |  | ered herein by reference.

SHOVEL

CROSS-REFERENCE TO RELATED APPLICATIONS

This application is a continuation application filed under 35 U.S.C. 111(a) claiming benefit under 35 U.S.C. 120 and 365(c) of PCT International Application No. PCT/JP2019/031706, filed on Aug. 9, 2019 and designating the U.S., which claims priority to Japanese patent application No. 2018-151853, filed on Aug. 10, 2018. The entire contents of the foregoing applications are incorporated herein by reference.

BACKGROUND

Technical Field

The present disclosure relates to shovels.

Description of Related Art

A shovel whose movements are operated by an operator or the like is known.

SUMMARY

According to an aspect of the present invention, a shovel includes an operating element and circuitry. The circuitry is configured to recognize a worker in an area surrounding the shovel and recognize a predetermined gesture made by the recognized worker. The circuitry is further configured to perform operation control on the operating element in response to the predetermined gesture made by the worker recognized by the recognition part.

DETAILED DESCRIPTION

As noted above, a shovel whose movements are operated by an operator or the like is known. The shovel, however, does not move unless operated from inside the cabin by the operator or the like. Therefore, there is a demand for a shovel operable by a worker or the like around.

According to an aspect of the present invention, it is possible to provide a shovel operable by a worker or the like around.

An embodiment of the present invention is described below with reference to the drawings.

[Shovel Overview]

Figure 1:
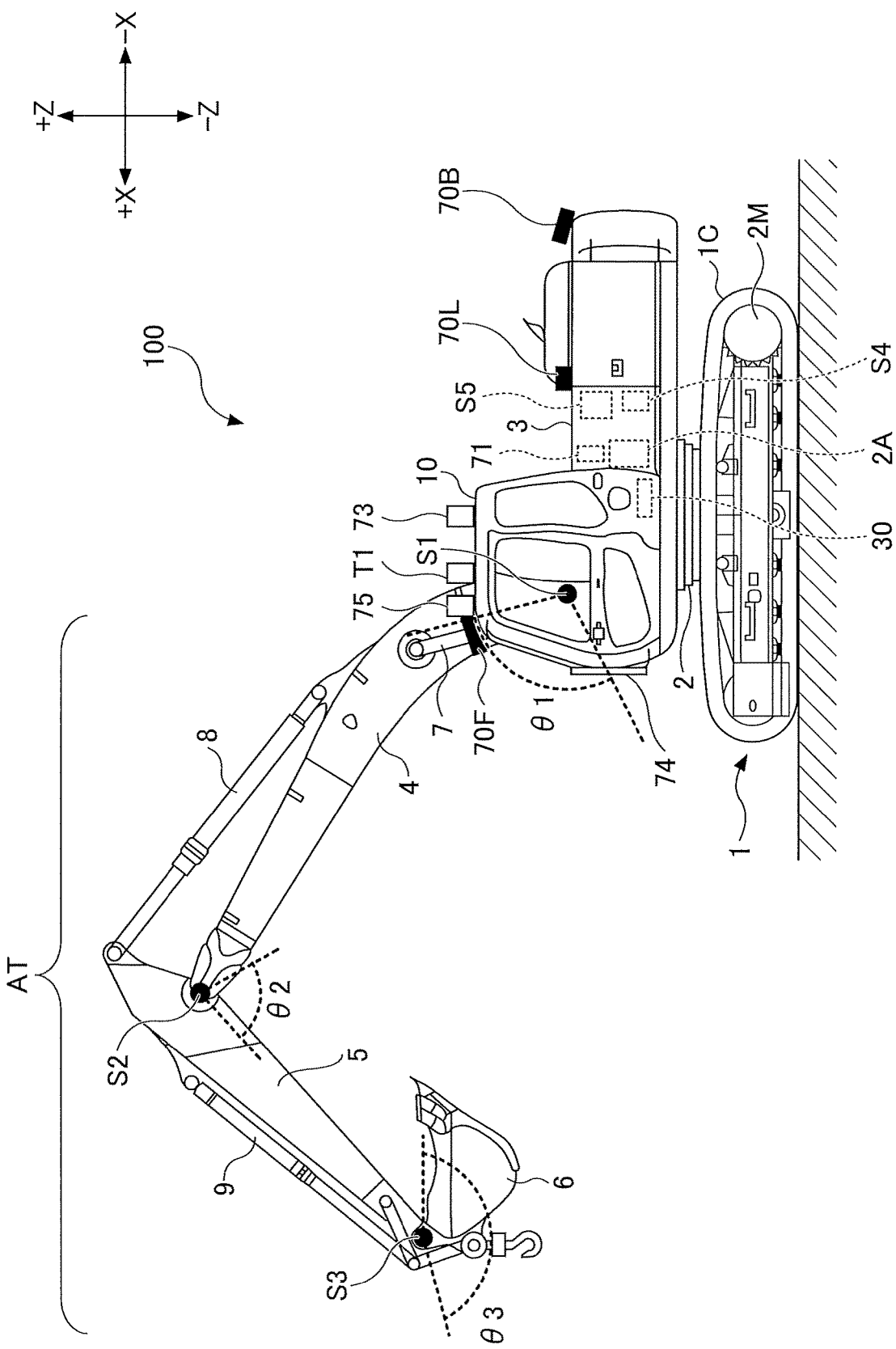
FIG. 1 is a side view of a shovel.
Figure 2:
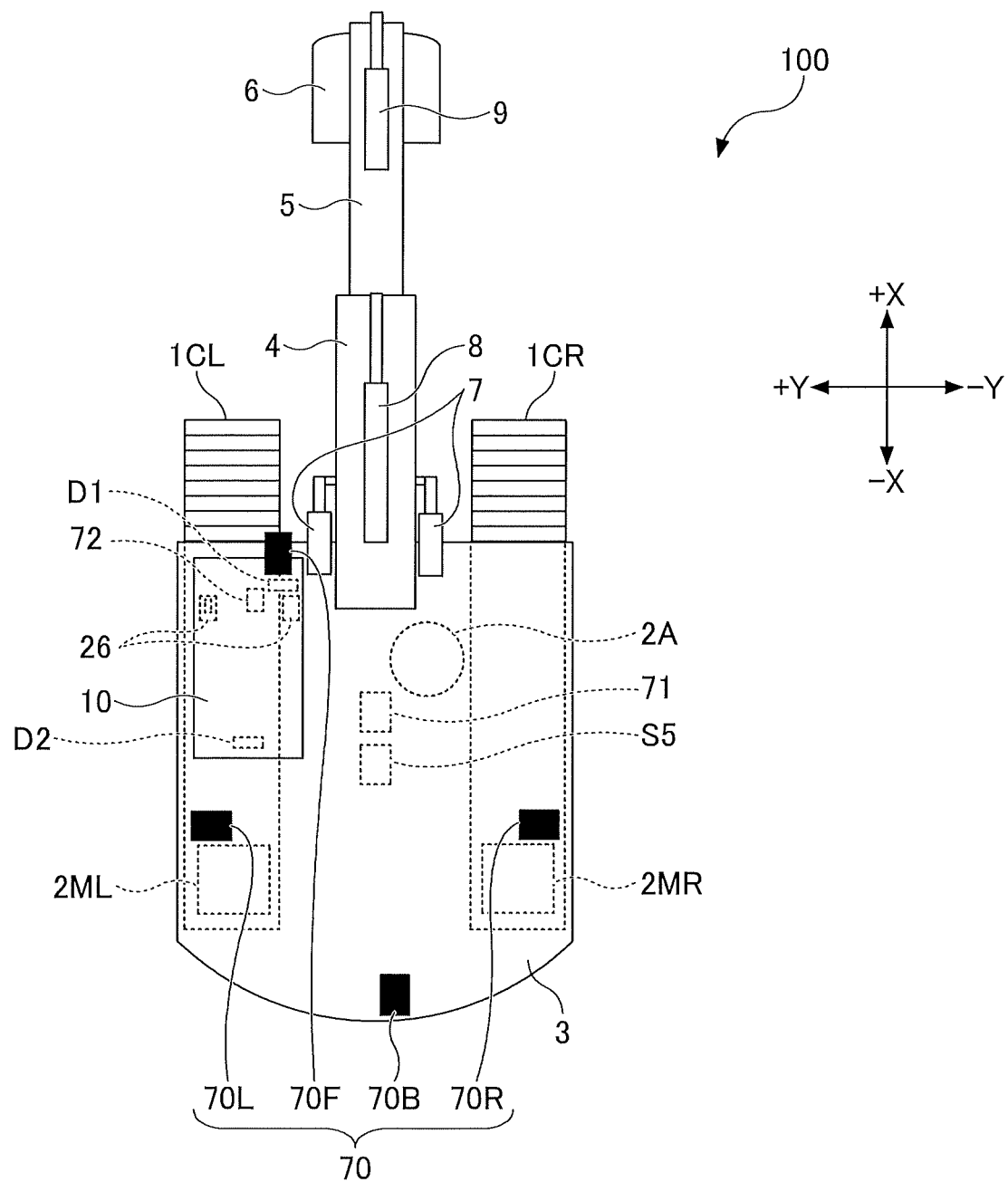
FIG. 2 is a plan view of the shovel.

First, an overview of a shovel 100 according to this embodiment is given with reference to FIGS. 1 and 2.

FIG. 1 is a side view of the shovel 100 according to this embodiment. FIG. 2 is a plan view of the shovel 100 according to this embodiment.

The shovel 100 according to this embodiment includes a lower traveling structure 1; an upper swing structure 3 swingably mounted on the lower traveling structure 1 via a swing mechanism 2; a boom 4, an arm 5 and a bucket 6 constituting an attachment AT; and a cabin 10.

The lower traveling structure 1 includes a pair of right and left crawlers 10, specifically, a left crawler 1CL and a right crawler 1CR. The left crawler 1CL and the right crawler 1CR are hydraulically driven by travel hydraulic motors 2M (specifically, travel hydraulic motors 2ML and 2MR), so that the lower traveling structure 1 causes the shovel 100 to travel.

The upper swing structure 3 is driven by a swing hydraulic motor 2A to swing relative to the lower traveling structure 1.

The boom 4 is pivotably attached to the front center of the upper swing structure 3 to be movable upward and downward. The arm 5 is pivotably attached to the distal end of the boom 4 to be pivotable upward and downward. The bucket 6 is pivotably attached to the distal end of the arm 5 to be pivotable upward and downward. The boom 4, the arm 5, and the bucket 6 are hydraulically driven by a boom cylinder 7, an arm cylinder 8, and a bucket cylinder 9, respectively, which serve as hydraulic actuators.

The cabin 10 is a cab in which an operator rides, and is mounted on the front left of the upper swing structure 3.

The shovel 100 operates operating elements (driven elements) such as the lower traveling structure 1, the upper swing structure 3, the boom 4, the arm 5, and the bucket 6 in response to operations of the operator riding in the cabin 10 (hereinafter "riding operator" for convenience) or remote control signals received from a predetermined external device (for example, a management apparatus 200 as described below)

Furthermore, the shovel 100 automatically operates hydraulic actuators independent of operations of the riding operator of the cabin 10 or the details of the remote control of an operator of the externa device (hereinafter "remote operator" for convenience). According to this, the shovel 100 implements the function of automatically operating at least one or more of operating elements (driven elements) such as the lower traveling structure 1, the upper swing structure 3, the boom 4, the arm 5, and the bucket 6 (hereinafter "automatic operation function"). For example, as describe below, the shovel 100 implements a gesture operation function using the automatic operation function, which is described in detail below.

The automatic operation function may include the function of automatically operating an operating element (hydraulic actuator) other than an operating element (hydraulic actuator) to be operated in response to the riding operator's operation or the remote control of the remote operator (so-called "semi-automatic operation function"). Furthermore, the automatic operation function may also include the function of automatically operating at least one or more of operating elements (hydraulic actuators) without the riding operator's operation or the remote control of the remote operator (so-called "fully automatic operation function"). Furthermore, the automatic operation function may include the function of the shovel 100 recognizing the gesture of a person such as a worker around the shovel 100 and automatically operating one or more of operating elements (hydraulic actuators) according to the details of the recognized gesture (below-described "gesture operation function"). Furthermore, the semi-automatic operation function, the fully automatic operation function, and the gesture operation function may include not only a mode in which the operation details of an operating element (hydraulic actuator) to be automatically operated are automatically determined according to predetermined rules but also a mode in which the shovel 100 autonomously performs various determinations and the operation details of an operating element (hydraulic actuator) to be automatically operated are autonomously determined along the determination results to cause the operating element to automatically operate (so-called "autonomous operation function").

[Shovel Configuration]

Next, a configuration of the shovel 100 is described with reference to FIG. 3, FIGS. 4A through 4D, FIGS. 5A and 5B, and FIG. 6 in addition to FIGS. 1 and 2.

Figure 3:
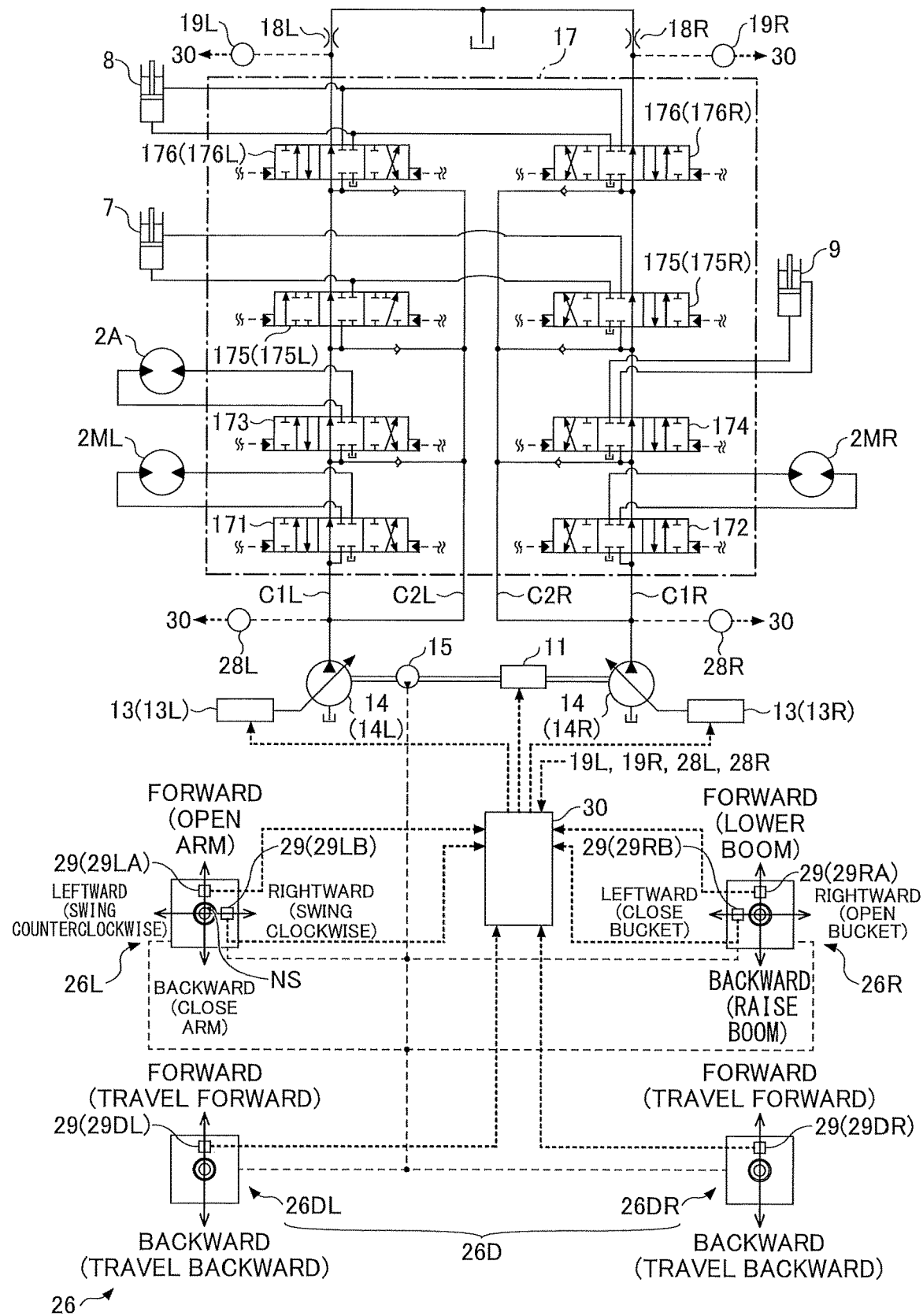
FIG. 3 is a diagram illustrating an example configuration of a hydraulic system of the shovel.

FIG. 3 is a diagram illustrating an example configuration of the hydraulic system of the shovel 100.

FIGS. 4A through 4D are diagrams illustrating examples of constituent parts of operation systems associated with the arm 5, the boom 4, the bucket 6, and the upper swing structure 3, respectively, in the hydraulic system of the shovel 100.

Figure 5A:
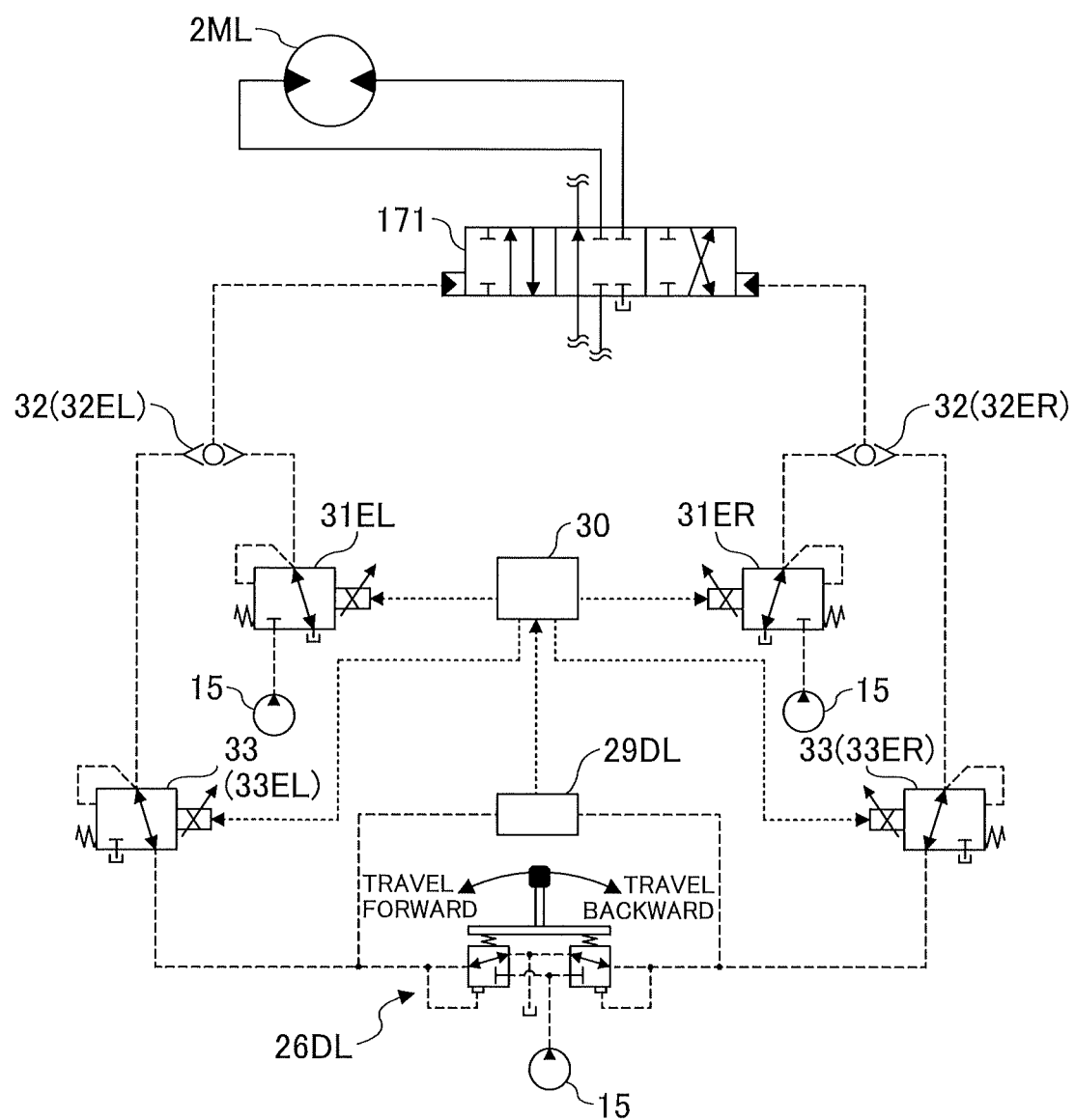
FIG. 5A is a diagram illustrating an example of a constituent part of a lower traveling structure-related operation system in the hydraulic system of the shovel.
Figure 5B:
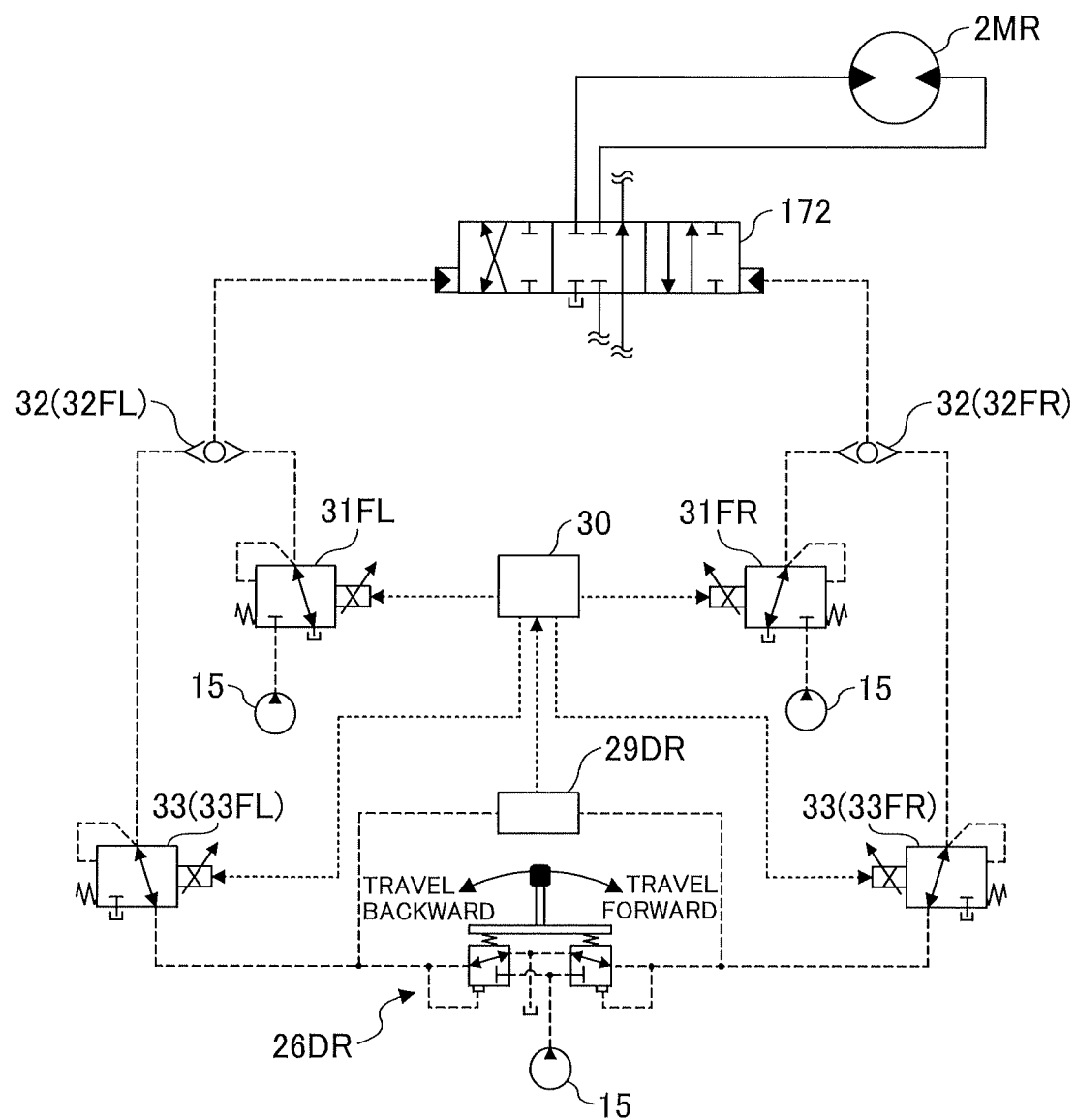
FIG. 5B is a diagram illustrating an example of a constituent part of the lower traveling structure-related operation system in the hydraulic system of the shovel.

FIGS. 5A and 5B are diagrams illustrating examples of constituent parts of an operation system associated with the lower traveling structure 1 in the hydraulic system of the shovel 100. Specifically, FIGS. 5A and 5B are diagrams illustrating examples of constituent parts of operation systems associated with the left crawler 1CL and the right crawler 1CR, respectively, in the hydraulic system of the shovel 100.

Figure 6:
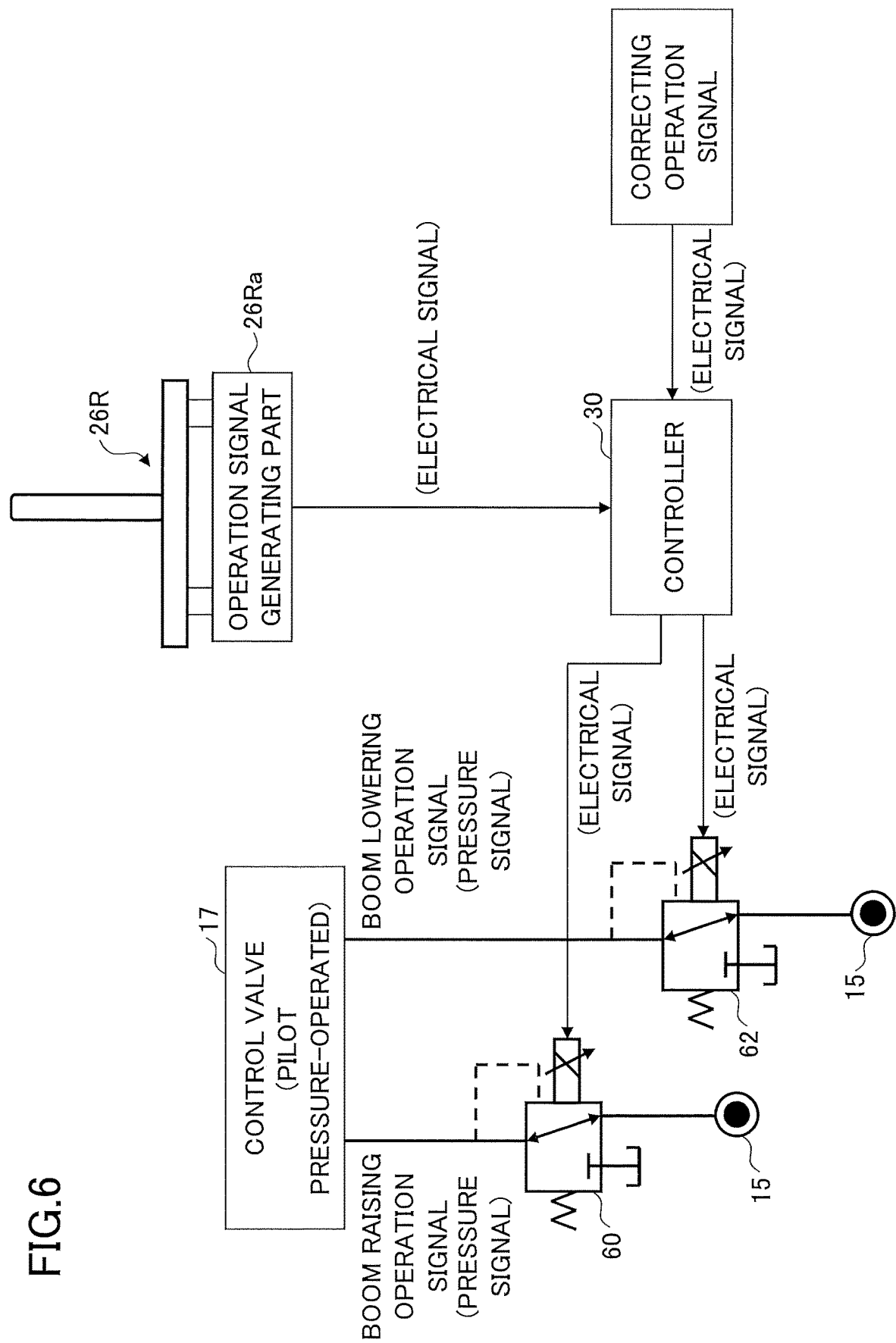
FIG. 6 is a diagram illustrating another example of an operating device.

FIG. 6 is a diagram illustrating another example of an operating device 26. Specifically, FIG. 6 is a diagram illustrating another example configuration of a pilot circuit that causes a pilot pressure to act on a control valve 17 (control valves 171, 172, 173, 174, 175L, 175R, 176L and 176R) that hydraulically controls hydraulic actuators. As an example, FIG. 6 illustrates a pilot circuit that causes a pilot pressure to act on the control valve 17 (the control valves 175L and 175R) that hydraulically controls the boom cylinder 7.

Individual pilot circuits that hydraulically controls the travel hydraulic motors 2ML and 2MR, the swing hydraulic motor 2A, the arm cylinder 8, and the bucket cylinder 9 are expressed the same as the pilot circuit of FIG. 6 that hydraulically controls the boom cylinder 7. Therefore, a graphical representation of these pilot circuits is omitted.

First, a configuration of the hydraulic system of the shovel 100 is described.

The hydraulic system of the shovel 100 according to this embodiment includes an engine 11, a regulator 13, a main pump 14, a pilot pump 15, the control valve 17, the operating device 26, discharge pressure sensors 28L and 28R, operating pressure sensors 29LA, 29LB, 29RA, 29RB, 29DL, and 29DR, and a controller 30. Hereinafter, the operating pressure sensors 29LA, 29LB, 29RA, 29RB, 29DL, and 29DR may be collectively or individually referred to as "operating pressure sensor 29." Furthermore, as described above, the hydraulic system of the shovel 100 according to this embodiment includes hydraulic actuators such as the travel hydraulic motors 2ML and 2MR, the swing hydraulic motor 2A, the boom cylinder 7, the arm cylinder 8, and the bucket cylinder 9 that hydraulically drive driven elements (operating elements) such as the lower traveling structure 1, the upper swing structure 3, the boom 4, the arm 5, and the bucket 6.

The engine 11 is the main power source of the hydraulic system and is mounted on the back of the upper swing structure 3, for example. Specifically, the engine 11 rotates constantly at a preset target rotational speed under the direct or indirect control of the controller 30 to drive the main pump 14 and the pilot pump 15. The engine 11 is, for example, a diesel engine fueled with diesel fuel.

Regulators 13L and 13R control the discharge quantities of main pumps 14L and 14R. For example, the regulators 13L and 13R adjust the angles (tilt angles) of the swash plates of the main pumps 14L and 14R in response to a control command from the controller 30. The regulators 13L and 13R correspond to the main pumps 14L and 14R, respectively.

The main pump 14L and 14R are, for example, mounted on the back of the upper swing structure 3 the same as the engine 11, and as described above, are driven by the engine 11 to supply hydraulic oil to the control valve 17 through a high-pressure hydraulic line. The main pumps 14L and 14R are, for example, variable displacement hydraulic pumps, and their discharge flow rates (discharge pressures) are controlled by the regulators 13L and 13R adjusting the tilt angles of the swash plates to adjust piston stroke lengths under the control of the controller 30 as described above.

The pilot pump 15 is, for example, mounted on the back of the upper swing structure 3 and supplies a pilot pressure to the operating device 26 via a pilot line. The pilot pump 15 is, for example, a fixed displacement hydraulic pump and is driven by the engine 11 as described above.

The control valve 17 is a hydraulic control device that is mounted in the center of the upper swing structure 3 and controls a hydraulic drive system according to the operator's operation on the operating device 26, for example. As described above, the control valve 17 is connected to the main pump 14 via a high-pressure hydraulic line, and selectively supplies hydraulic oil supplied from the main pump 14 to the hydraulic actuators (the travel hydraulic motors 2ML and 2MR, the swing hydraulic motor 2A, the boom cylinder 7, the arm cylinder 8, and the bucket cylinder 9) in accordance with the operating state of the operating device 26 or in response to a control command according to the automatic operation function of the shovel 100. Specifically, the control valve 17 includes the control valves 171 through 174, 175L, 175R, 176L and 176R that control the flow rate and flow direction of hydraulic oil supplied from the main pump 14 to the individual hydraulic actuators.

The control valve 171 corresponds to the travel hydraulic motor 2ML. The control valve 172 corresponds to the travel hydraulic motor 2MR. The control valve 173 corresponds to the swing hydraulic motor 2A. The control valve 174 corresponds to the bucket cylinder 9. The control valves 175L and 175R correspond to the boom cylinder 7. Hereinafter, the control valves 175L and 175R may be collectively or individually referred to as "control valve 175." The control valves 176L and 176R correspond to the arm cylinder 8. Hereinafter, the control valves 176L and 176R may be collectively or individually referred to as "control valve 176."

The operating device 26 is provided near the operator seat of the cabin 10 and serves as an operation inputting part for the operator operating various operating elements (driven elements such as the lower traveling structure 1, the upper swing structure 3, the boom 4, the arm 5, and the bucket 6). In other words, the operating device 26 is an operation inputting part for the operator operating hydraulic actuators (namely, the travel hydraulic motors 2ML and 2MR, the swing hydraulic motor 2A, the boom cylinder 7, the arm cylinder 8, the bucket cylinder 9, etc.) that drive corresponding operating elements (driven elements).

As illustrated in FIGS. 4A through 4D, 5A, and 5B, the operating device 26 is, for example, of a hydraulic pilot type to output a pilot pressure commensurate with its operating state. The operating device 26 is connected to the control valve 17 via a below-described shuttle valve 32 provided in a hydraulic line on its secondary side. This allows pilot pressures commensurate with the operating states of the lower traveling structure 1, the upper swing structure 3, the boom 4, the arm 5, the bucket 6, etc., in the operating device 26 to be input to the control valve 17. Therefore, the control valve 17 can drive hydraulic actuators in accordance with the operating states in the operating device 26.

The operating device 26 includes a left operating lever 26L and a right operating lever 26R for operating the attachment AT, namely, the boom 4 (the boom cylinder 7), the arm 5 (the arm cylinder 8), the bucket 6 (the bucket cylinder 9), and the upper swing structure 3 (the swing hydraulic motor 2A). Furthermore, the operating device 26 includes travel levers 26D for operating the lower traveling structure 1, and the travel levers 26D include a left travel lever 26DL for operating the left crawler 1CL (the travel hydraulic motor 2ML) and a right travel lever 26DR for operating the right crawler 1CR (the travel hydraulic motor 2MR).

The left operating lever 26L is used to swing the upper swing structure 3 and operate the arm 5. The left operating lever 26L is operated in a forward or a backward direction relative to the operator in the cabin 10 (namely, the forward or the backward direction of the upper swing structure 3) to output a control pressure commensurate with the amount of lever operation (pilot pressure) to secondary-side pilot lines connected to pilot ports of the control valves 176L and 176R, using hydraulic oil discharged from the pilot pump 15. Furthermore, the left operating lever 26L is operated in a rightward or a leftward direction relative to the operator in the cabin 10 (namely, the rightward or the leftward direction of the upper swing structure 3) to output a control pressure commensurate with the amount of lever operation (pilot pressure) to a secondary-side pilot line connected to a pilot port of the control valve 173, using hydraulic oil discharged from the pilot pump 15.

The right operating lever 26R is used to operate the boom 4 and operate the bucket 6. The right operating lever 26R is operated in the forward or the backward direction relative to the operator in the cabin 10 to output a control pressure commensurate with the amount of lever operation (pilot pressure) to secondary-side pilot lines connected to pilot ports of the control valves 175L and 175R, using hydraulic oil discharged from the pilot pump 15. Furthermore, the right operating lever 26R is operated in the rightward or the leftward direction relative to the operator in the cabin 10 to output a control pressure commensurate with the amount of lever operation (pilot pressure) to a secondary-side pilot line connected to the control valve 174, using hydraulic oil discharged from the pilot pump 15.

As described above, the left travel lever 26DL is used to operate the left crawler 1CL, and may be configured to work together with an undepicted left travel pedal. The left travel lever 26DL is operated in the forward or the backward direction relative to the operator in the cabin 10 to output a control pressure commensurate with the amount of lever operation (pilot pressure) to a secondary-side pilot line connected to the control valve 171, using hydraulic oil discharged from the pilot pump 15.

As described above, the right travel lever 26DR is used to operate the right crawler 1CR, and may be configured to work together with an undepicted right travel pedal. The right travel lever 26DR is operated in the forward or the backward direction relative to the operator in the cabin 10 to output a control pressure commensurate with the amount of lever operation (pilot pressure) to a secondary-side pilot line connected to the control valve 172, using hydraulic oil discharged from the pilot pump 15.

Furthermore, as illustrated in FIG. 6, the operating device 26 (the left operating lever 26L, the right operating lever 26R, the left travel lever 26DL, and the right travel lever 26DR) may be of an electric type that outputs an electrical signal instead of a hydraulic pilot type that outputs a pilot pressure. In this case, the control valves 171 through 174, 175L, 175R, 176L and 176R in the control valve 17 may be of an electromagnetic solenoid type that operates with an electrical signal commensurate with the operation details of the operating device 26 output from the operating device 26 or the controller 30.

As illustrated in FIG. 6, a pilot circuit according to the example includes a solenoid valve 60 for boom raising operation and a solenoid valve 62 for boom lowering operation.

The solenoid valve 60 is configured to be able to control the pressure of hydraulic oil in an oil conduit (pilot line) connecting the pilot pump 15 and the boom-raising-side pilot port of the control valve 17 of a pilot pressure-operated type (specifically, the control valves 175L and 175R).

The solenoid valve 62 is configured to be able to control the pressure of hydraulic oil in an oil conduit (pilot line) connecting the pilot pump 15 and the boom-lowering-side pilot port of the control valve 17 (the control valves 175L and 175R).

When the boom 4 (the boom cylinder 7) is manually operated, the controller 30 generates a boom raising operation signal (electrical signal) or a boom lowering operation signal (electrical signal) in response to an operation signal (electrical signal) commensurate with the details of a forward or a backward operation output by the right operating lever 26R (an operation signal generating part 26Ra). The operation signal (electrical signal) output from the right operating lever 26R represents the details (for example, the amount of operation and the direction of operation) of the forward or the backward operation. The boom raising operation signal (electrical signal) and the boom lowering operation signal (electrical signal) output by the controller 30 change according to the details (the amount of operation and the direction of operation) of the forward and the backward operation of the right operating lever 26R.

Specifically, when the right operating lever 26R is operated in a boom raising direction, the controller 30 outputs a boom raising operation signal (electrical signal) commensurate with the amount of operation to the solenoid valve 60. The solenoid valve 60 operates in response to the boom raising operation signal (electrical signal) to control a pilot pressure acting on the boom-raising-side pilot ports of the control valves 175L and 175R, namely, a boom raising operation signal (pressure signal). Likewise, when the right operating lever 26R is operated in a boom lowering direction, the controller 30 outputs a boom lowering operation signal (electrical signal) commensurate with the amount of operation to the solenoid valve 62. The solenoid valve 62 operates in response to the boom lowering operation signal (electrical signal) to control a pilot pressure acting on the boom-lowering-side pilot ports of the control valves 175L and 175R, namely, a boom lowering operation signal (pressure signal). This enables the control valve 17 to cause the boom cylinder 7 (the boom 4) to operate according to the details of the forward and the backward operation of the right operating lever 26R.

When the boom 4 (the boom cylinder 7) automatically operates, the controller 30, for example, generates a boom raising operating signal (electrical signal) or a boom lowering operation signal (electrical signal) according to a correcting operation signal (electrical signal) without depending on the operation signal (electrical signal) output by the operation signal generating part 26Ra of the right operating lever 26R. The correcting operation signal may be either an electrical signal generated by the controller 30 or an electrical signal generated by a control device other than the controller 30, or the like. This enables the control valve 17 to implement the function of automatically operating the boom 4 (the boom cylinder 7) according to the correcting operation signal (electrical signal).

The arm 5 (the arm cylinder 8), the bucket 6 (the bucket cylinder 9), the upper swing structure 3 (the swing hydraulic motor 2A), and the lower traveling structure 1 (the travel hydraulic motors 2ML and 2MR), whose operations are based on similar pilot circuits, operate the same as the boom 4 (the boom cylinder 7).

Thus, the automatic operation function of the shovel 100 can be executed more easily when the operating device 26 of an electric type is adopted than when the operating device 26 of a hydraulic pilot type is adopted.

The discharge pressure sensors 28L and 28R detect the discharge pressures of the main pumps 14L and 14R, respectively. Detection signals corresponding to the discharge pressures detected by the discharge pressure sensors 28L and 28R are fed into the controller 30.

The operating pressure sensor 29 detects the secondary-side pilot pressure of the operating device 26, namely, pilot pressures commensurate with the operating states of operating elements (namely, hydraulic actuators) in the operating device 26. The detection signals of pilot pressures commensurate with the operating states of the lower traveling structure 1, the upper swing structure 3, the boom 4, the arm 5, the bucket 6, etc., in the operating device 26 generated by the operating pressure sensor 29 are fed into the controller 30.

The operating pressure sensor 29LA detects the details (for example, the direction of operation and the amount of operation) of the operator's forward or backward operation of the left operating lever 26L in the form of the pressure of hydraulic oil (hereinafter "operating pressure") in corresponding secondary-side pilot lines of the left operating lever 26L.

The operating pressure sensor 29LB detects the details (for example, the direction of operation and the amount of operation) of the operator's rightward or leftward operation of the left operating lever 26L in the form of the operating pressure of a corresponding secondary-side pilot line of the left operating lever 26L.

The operating pressure sensor 29RA detects the details (for example, the direction of operation and the amount of operation) of the operator's forward or backward operation of the right operating lever 26R in the form of the operating pressure of corresponding secondary-side pilot lines of the right operating lever 26R.

The operating pressure sensor 29RB detects the details (for example, the direction of operation and the amount of operation) of the operator's rightward or leftward operation of the right operating lever 26R in the form of the operating pressure of a corresponding secondary-side pilot line of the right operating lever 26R.

The operating pressure sensor 29DL detects the details (for example, the direction of operation and the amount of operation) of the operator's forward or backward operation of the left travel lever 26DL in the form of the operating pressure of a corresponding secondary-side pilot line of the left travel lever 26DL.

The operating pressure sensor 29DR detects the details (for example, the direction of operation and the amount of operation) of the operator's forward or backward operation of the right travel lever 26DR in the form of the operating pressure of a corresponding secondary-side pilot line of the right travel lever 26DR.

The operation details of the operating device 26 (the left operating lever 26L, the right operating lever 26R, the left travel lever 26DL, and the right travel lever 26DR) may also be detected by sensors other than the operating pressure sensor 29 (for example, potentiometers or the like attached to the left operating lever 26L, the right operating lever 26R, the left travel lever 26DL, and the right travel lever 26DR). Furthermore, when the operating device 26 is of an electric type, the operating pressure sensor 29 is omitted. This is because an electrical signal (operation signal) corresponding to the operating state of the electric operating device 26 is input to the controller 30, so that the controller 30 can determine the operating state from the operation signal.

The controller 30 is, for example, provided in the cabin 10, and controls the driving of the shovel 100. The functions of the controller 30 may be implemented by desired hardware, desired software, or their combination. For example, the controller 30 includes circuitry constituted mainly of a microcomputer that includes a CPU (Central Processing Unit), a memory unit such as a RAM (Random Access Memory), a non-volatile secondary storage such as a ROM (Read Only Memory), and various input/output interfaces. The controller 30 implements various functions by executing, on the CPU, various programs stored in the secondary storage, for example.

One or more of the functions of the controller 30 may be implemented by another controller (control device). That is, the functions of the controller 30 may be distributed among and implemented by multiple controllers.

Here, as illustrated in FIG. 3, in the hydraulic system of the shovel 100, the part of the hydraulic system of a drive system that drives hydraulic actuators circulates hydraulic oil from each of the main pumps 14L and 14R driven by the engine 11 to a hydraulic oil tank by way of center bypass oil conduits C1L and C1R or parallel oil conduits C2L and C2R.

The center bypass oil conduit C1L starts at the main pump 14L and ends at the hydraulic oil tank, passing through the control valves 171, 173, 175L and 176L in this order in the control valve 17.

The center bypass oil conduit C1R starts at the main pump 14R and ends at the hydraulic oil tank, passing through the control valves 172, 174, 175R and 176R in this order in the control valve 17.

The control valve 171 is a spool valve that supplies hydraulic oil discharged from the main pump 14L to the travel hydraulic motor 2ML and discharges hydraulic oil discharged by the travel hydraulic motor 2ML to the hydraulic oil tank.

The control valve 172 is a spool valve that supplies hydraulic oil discharged from the main pump 14R to the travel hydraulic motor 2MR and discharges hydraulic oil discharged by the travel hydraulic motor 2MR to the hydraulic oil tank.

The control valve 173 is a spool valve that supplies hydraulic oil discharged from the main pump 14L to the swing hydraulic motor 2A and discharges hydraulic oil discharged by the swing hydraulic motor 2A to the hydraulic oil tank.

The control valve 174 is a spool valve that supplies hydraulic oil discharged from the main pump 14R to the bucket cylinder 9 and discharges hydraulic oil in the bucket cylinder 9 to the hydraulic oil tank.

The control valves 175L and 175R are spool valves that supply hydraulic oil discharged by the main pumps 14L and 14R, respectively, to the boom cylinder 7 and discharge hydraulic oil in the boom cylinder 7 to the hydraulic oil tank.

The control valves 176L and 176R are spool valves that supply hydraulic oil discharged by the main pumps 14L and 14R, respectively, to the arm cylinder 8 and discharge hydraulic oil in the arm cylinder 8 to the hydraulic oil tank.

Each of the control valves 171 through 174, 175L, 175R, 176L and 176R controls the flow rate of hydraulic oil discharged from or supplied to a hydraulic actuator according to a pilot pressure acting on its pilot port. Furthermore, each of the control valves 171 through 174, 175L, 175R, 176L and 176R switches the direction of flow of hydraulic oil discharged from or supplied to a hydraulic actuator according to on which one of the two pilot ports a pilot pressure is acting.

The parallel oil conduit C2L supplies hydraulic oil from the main pump 14L to the control valves 173, 175L and 176L in parallel with the center bypass oil conduit C1L. Specifically, the parallel oil conduit C2L is configured to diverge from the center bypass oil conduit C1L upstream of the control valve 171 to make it possible to supply hydraulic oil from the main pump 14L to the control valves 171, 173, 175L and 176L in parallel. This enables the parallel oil conduit C2L to supply hydraulic oil to a control valve further downstream when the flow of hydraulic oil through the center bypass oil conduit C1L is restricted or blocked by any of the control valves 171, 173 and 175L.

The parallel oil conduit C2R supplies hydraulic oil from the main pump 14R to the control valves 174, 175R and 176R in parallel with the center bypass oil conduit C1R. Specifically, the parallel oil conduit C2R is configured to diverge from the center bypass oil conduit C1R upstream of the control valve 172 to make it possible to supply hydraulic oil from the main pump 14R to the control valves 172, 174, 175R and 176R in parallel. This enables the parallel oil conduit C2L to supply hydraulic oil to a control valve further downstream when the flow of hydraulic oil through the center bypass oil conduit C1R is restricted or blocked by any of the control valves 172, 174 and 175R.

The regulators 13L and 13R control the discharge quantities of the main pumps 14L and 14R by adjusting the tilt angles of the swash plates of the main pumps 14L and 14R, respectively, under the control of the controller 30.

The discharge pressure sensor 28L detects the discharge pressure of the main pump 14L, and a detection signal corresponding to the detected discharge pressure is fed into the controller 30. The same is true for the discharge pressure sensor 28R. This enables the controller 30 to control the regulators 13L and 13R according to the discharge pressures of the main pump 14L and 14R.

Negative control throttles (hereinafter "NC throttles") 18L and 18R are provided between the most downstream control valves 176L and 176R and the hydraulic oil tank in the center bypass oil conduits C1L and C1R, respectively. As a result, the flow of hydraulic oil discharged by the main pumps 14L and 14R is restricted by the NC throttles 18L and 18R. The NC throttles 18L and 18R generate control pressures for controlling the regulators 13L and 13R (hereinafter "NC pressures").

NC pressure sensors 19L and 19R detect the NC pressures of the NC throttles 18L and 18R, respectively, and detection signals corresponding to the detected NC pressures are fed into the controller 30.

The controller 30 may control the regulators 13L and 13R and control the discharge quantities of the main pumps 14L and 14R according to the discharge pressures of the main pumps 14L and 14R detected by the discharge pressure sensors 28L and 28R. For example, according as the discharge pressure of the main pump 14L increases, the controller 30 may reduce the discharge quantity by adjusting the swash plate tilt angle of the main pump 14L by controlling the regulator 13L. The same is true for the regulator 13R. This enables the controller 30 to perform full power control on the main pumps 14L and 14R such that the absorbed power of the main pumps 14L and 14R expressed as the product of discharge pressure and discharge quantity is prevented from exceeding the output power of the engine 11.

Furthermore, the controller 30 may control the discharge quantities of the main pumps 14L and 14R by controlling the regulators 13L and 13R according to the NC pressures detected by the NC pressure sensors 19L and 19R. For example, the controller reduces the discharge quantities of the main pumps 14L and 14R as the NC pressures increase and increases the discharge quantities of the main pumps 14L and 14R as the NC pressures decrease.

Specifically, in a standby state where none of the hydraulic actuators is operated in the shovel 100 (the state illustrated in FIG. 3), hydraulic oil discharged from the main pumps 14L and 14R arrive at the NC throttles 18L and 18R through the center bypass oil conduits C1L and C1R. The flow of hydraulic oil discharged from the main pumps 14L and 14R increase the NC pressures generated upstream of the NC throttles 18L and 18R. As a result, the controller 30 decreases the discharge quantities of the main pumps 14L and 14R to a minimum allowable discharge quantity to reduce pressure loss (pumping loss) during the passage of the discharged hydraulic oil through the center bypass oil conduits C1L and C1R.

In contrast, when any of the hydraulic actuators is operated, hydraulic oil discharged from the main pump 14L or 14R flows into the operated hydraulic actuator via a control valve corresponding to the operated hydraulic actuator. The flow of hydraulic oil discharged from the main pump 14L or 14R that arrives at the NC throttle 18L or 18R is reduced in amount or lost, so that the control pressure generated upstream of the NC throttle 18L or 18R is reduced. As a result, the controller 30 can increase the discharge quantity of the main pump 14L or 14R to circulate sufficient hydraulic oil to the operated hydraulic actuator to ensure driving of the operated hydraulic actuator.

Furthermore, as illustrated in FIGS. 4A through 4D and FIGS. 5A and 5B, in the hydraulic system of the shovel 100, the part of the hydraulic system of an operation system includes the pilot pump 15, the operating device 26 (the left operating lever 26L, the right operating lever 26R, the left travel lever 26DL, and the right travel lever 26DR), proportional valves 31AL, 31AR, 31BL, 31BR, 31CL, 31CR, 31DL, 31DR, 31EL, 31ER, 31FL and 31FR, shuttle valves 32AL, 32AR, 32BL, 32BR, 32CL, 32CR, 32DL, 32DR, 32EL, 32ER, 32FL and 32FR, and pressure reducing proportional valves 33AL, 33AR, 33BL, 33BR, 33CL, 33CR, 33DL, 33DR, 33EL, 33ER, 33FL and 33FR. Hereinafter, the proportional valves 31AL, 31AR, 31BL, 31BR, 31CL, 31CR, 31DL, 31DR, 31EL, 31ER, 31FL and 31FR may be collectively or individually referred to as "proportional valve 31." Furthermore, the shuttle valves 32AL, 32AR, 32BL, 32BR, 32CL, 32CR, 32DL, 32DR, 32EL, 32ER, 32FL and 32FR may be collectively or individually referred to as "shuttle valve 32." Furthermore, the pressure reducing proportional valves 33AL, 33AR, 33BL, 33BR, 33CL, 33CR, 33DL, 33DR, 33EL, 33ER, 33FL and 33FR may be collectively or individually referred to as "pressure reducing proportional valve 33."

The proportional valve 31 is provided in a pilot line connecting the pilot pump 15 and the shuttle valve 32, and is configured to be able to change its flow area (a cross-sectional area through which hydraulic oil can pass). The proportional valve 31 operates in response to a control command input from the controller 30. This enables the controller 30 to supply hydraulic oil discharged from the pilot pump 15 to a pilot port of a corresponding control valve in the control valve 17 via the proportional valve 31 and the shuttle valve 32 even when the operating device 26 (specifically, the left operating lever 26L, the right operating lever 26R, the left travel lever 26DL, or the right travel lever 26DR) is not operated by the operator.

The shuttle valve 32 includes two inlet ports and one outlet port, and outputs hydraulic oil having the higher one of the pilot pressures input to the two inlet ports to the outlet port. Of the two inlet ports of the shuttle valve 32, one is connected to the operating device 26 via the pressure reducing proportional valve 33, and the other is connected to the proportional valve 31. The outlet port of the shuttle valve 32 is connected to a pilot port of a corresponding control valve in the control valve 17 through a pilot line. Therefore, the shuttle valve 32 can cause the higher one of the pilot pressure generated by the pressure reducing proportional valve 33 using a pilot pressure output from the operating device 26 as a source pressure and the pilot pressure generated by the proportional valve 31, to act on a pilot port of a corresponding control valve. The controller 30, for example, controls the proportional valve 31 and the pressure reducing proportional valve 33 to cause a pilot pressure higher than a pilot pressure input to the shuttle valve 32 from a secondary-side pilot line of the operating device 26 by way of the pressure reducing proportional valve 33 to be output from the proportional valve 31. This enables the controller 30 to control the operations of the lower traveling structure 1, the upper swing structure 3, and the attachment AT by controlling corresponding control valves independent of the operator's operation of the operating device 26. Therefore, the controller 30 can implement the automatic operation function of the shovel 100 using the proportional valve 31 and the pressure reducing proportional valve 33.

The pressure reducing proportional valve 33 is provided in a pilot line connecting the operating device 26 and the shuttle valve 32, and is configured to be able to change its flow area. The pressure reducing proportional valve 33 operates in response to a control command input from the controller 30. This enables the controller 30 to force reduction of the pilot pressure output from the operating device 26 when the operating device 26 (specifically, the left operating lever 26L, the right operating lever 26R, the left travel lever 26DL, or the right travel lever 26DR) is operated by the operator. Therefore, even during the operation of the operating device 26, the controller 30 can forcibly control or stop the operation of a hydraulic actuator corresponding to the operation of the operating device 26. Furthermore, for example, even during the operation of the operating device 26, the controller 30 can reduce the pilot pressure output from the operating device 26 to cause the pilot pressure output from the operating device 26 to be lower than the pilot pressure output from the proportional valve 31. Therefore, by controlling the proportional valve 31 and the pressure reducing proportional valve 33, the controller 30 can ensure that a desire pilot pressure acts on a pilot port of a control valve in the control valve 17 irrespective of the operation details of the operating device 26.

Figure 4A:
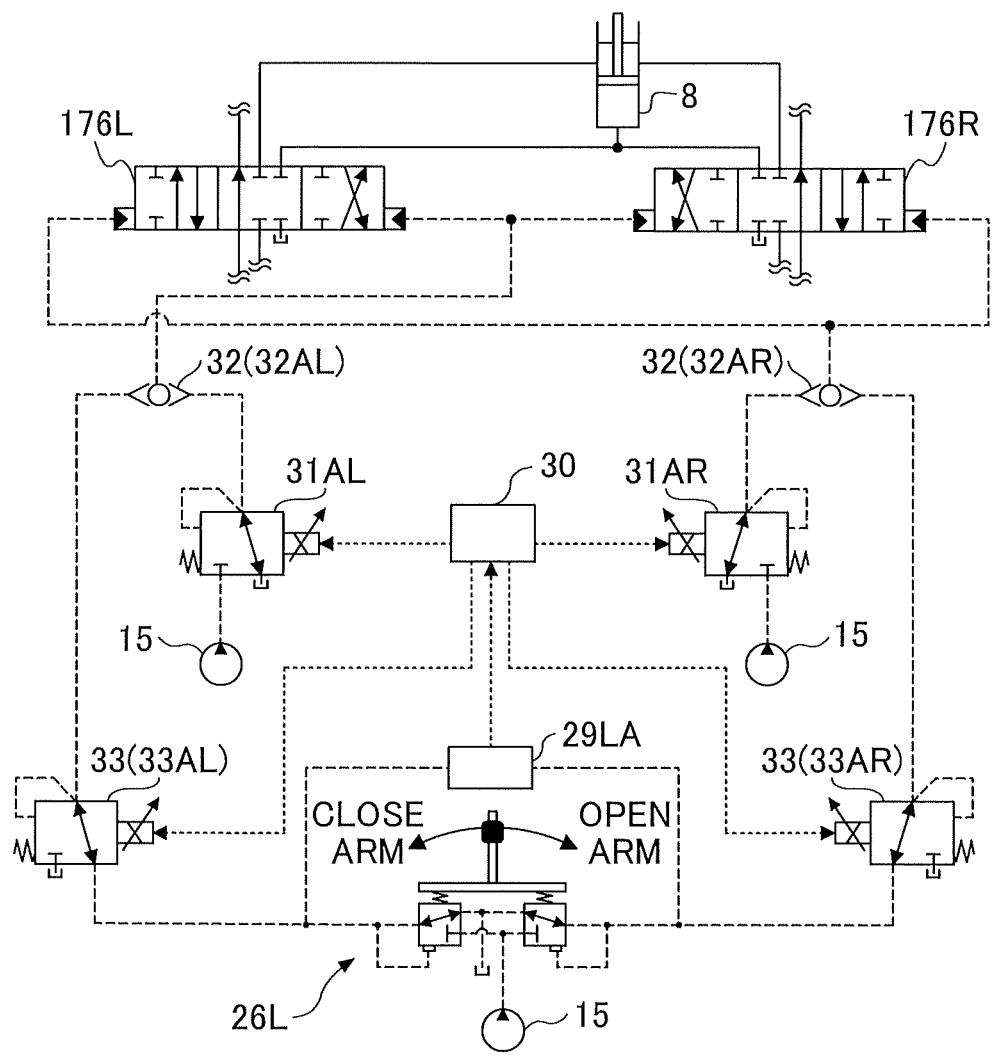
FIG. 4A is a diagram illustrating an example of a constituent part of an arm-related operation system in the hydraulic system of the shovel.

As illustrated in FIG. 4A, the left operating lever 26L is used to operate the arm cylinder 8 corresponding to the arm 5 in a manner in which the left operating lever 26L is tilted forward or backward by the operator. That is, when the left operating lever 26L is tilted forward or backward, the target of operation of the left operating lever 26L is the operation of the arm 5. The left operating lever 26L outputs a pilot pressure commensurate with the details of the forward or the backward operation to the secondary side, using hydraulic oil discharged from the pilot pump 15.

The shuttle valve 32AL has two inlet ports, one connected to a secondary-side pilot line of the left operating lever 26L corresponding to an operation in a direction to close the arm 5 (hereinafter "arm closing operation") and the other connected to the secondary-side pilot line of the proportional valve 31AL, and has an outlet port connected to the right pilot port of the control valve 176L and the left pilot port of the control valve 176R.

The shuttle valve 32AR has two inlet ports, one connected to a secondary-side pilot line of the left operating lever 26L corresponding to an operation in a direction to open the arm 5 (hereinafter "arm opening operation") and the other connected to the secondary-side pilot line of the proportional valve 31AR, and has an outlet port connected to the left pilot port of the control valve 176L and the right pilot port of the control valve 176R.

That is, the left operating lever 26L causes a pilot pressure commensurate with the details of the forward or the backward operation to act on pilot ports of the control valves 176L and 176R through the shuttle valve 32AL or 32AR. Specifically, in response to the arm closing operation, the left operating lever 26L outputs a pilot pressure commensurate with the amount of operation to one inlet port of the shuttle valve 32AL and causes the pilot pressure to act on the right pilot port of the control valve 176L and the left pilot port of the control valve 176R via the shuttle valve 32AL. Furthermore, in response to the atm opening operation, the left operating lever 26L outputs a pilot pressure commensurate with the amount of operation to one inlet port of the shuttle valve 32AR and causes the pilot pressure to act on the left pilot port of the control valve 176L and the right pilot port of the control valve 176R via the shuttle valve 32AR.

The proportional valve 31AL operates in response to a control current input from the controller 30. Specifically, the proportional valve 31AL outputs a pilot pressure commensurate with a control current input from the controller 30 to the other inlet port of the shuttle valve 32AL, using hydraulic oil discharged from the pilot pump 15. This enables the proportional valve 31AL to control a pilot pressure acting on the right pilot port of the control valve 176L and the left pilot port of the control valve 176R via the shuttle valve 32AL.

The proportional valve 31AR operates in response to a control current input from the controller 30. Specifically, the proportional valve 31AR outputs a pilot pressure commensurate with a control current input from the controller 30 to the other inlet port of the shuttle valve 32AR, using hydraulic oil discharged from the pilot pump 15. This enables the proportional valve 31AR to control a pilot pressure acting on the left pilot port of the control valve 176L and the right pilot port of the control valve 176R via the shuttle valve 32AR.

That is, the proportional valves 31AL and 31AR can control a pilot pressure output to the secondary side such that the control valves 176L and 176R can stop at a desired valve position independent of the forward or the backward operating state of the left operating lever 26L. Hereinafter, the proportional valves 31AL and 31AR may be collectively or individually referred to as "arm proportional valve 31A."

The pressure reducing proportional valve 33AL operates in response to a control current input from the controller 30. Specifically, when no control current is input from the controller 30, the pressure reducing proportional valve 33AL outputs a pilot pressure commensurate with the arm closing operation of the left operating lever 26L directly to the secondary side. In contrast, when a control current is input from the controller 30, the pressure reducing proportional valve 33AL reduces the pilot pressure of a secondary-side pilot line corresponding to the arm closing operation of the left operating lever 26L to an extent corresponding to the control current, and outputs the reduced pilot pressure to the one inlet port of the shuttle valve 32AL. This enables the pressure reducing proportional valve 33AL to forcibly control or stop the operation of the arm cylinder 8 corresponding to the arm closing operation on an as-needed basis even during the arm closing operation of the left operating lever 26L. Furthermore, the pressure reducing proportional valve 33AL can cause the pilot pressure acting on the one inlet port of the shuttle valve 32AL to be lower than the pilot pressure acting on the other inlet port of the shuttle valve 32AL from the proportional valve 31AL even during the arm closing operation of the left operating lever 26L. Therefore, the controller 30 can ensure that a desire pilot pressure acts on the am-closing-side pilot ports of the control valves 176L and 176R by controlling the proportional valve 31AL and the pressure reducing proportional valve 33AL.

The pressure reducing proportional valve 33AR operates in response to a control current input from the controller 30. Specifically, when no control current is input from the controller 30, the pressure reducing proportional valve 33AR outputs a pilot pressure commensurate with the arm opening operation of the left operating lever 26L directly to the secondary side. In contrast, when a control current is input from the controller 30, the pressure reducing proportional valve 33AR reduces the pilot pressure of a secondary-side pilot line corresponding to the arm opening operation of the left operating lever 26L to an extent corresponding to the control current, and outputs the reduced pilot pressure to the one inlet port of the shuttle valve 32AR. This enables the pressure reducing proportional valve 33AR to forcibly control or stop the operation of the arm cylinder 8 corresponding to the arm opening operation on an as-needed basis even during the arm opening operation of the left operating lever 26L. Furthermore, the pressure reducing proportional valve 33AR can cause the pilot pressure acting on the one inlet port of the shuttle valve 32AR to be lower than the pilot pressure acting on the other inlet port of the shuttle valve 32AR from the proportional valve 31AR even during the arm opening operation of the left operating lever 26L. Therefore, the controller 30 can ensure that a desire pilot pressure acts on the arm-opening-side pilot ports of the control valves 176L and 176R by controlling the proportional valve 31AR and the pressure reducing proportional valve 33AR.

Thus, the pressure reducing proportional valves 33AL and 33AR can forcibly control or stop the operations of the arm cylinder 8 corresponding to the forward and the backward operating state of the left operating lever 26L. Furthermore, the pressure reducing proportional valves 33AL and 33AR can assist in ensuring that the pilot pressures of the proportional valves 31AL and 31AR act on the pilot ports of the control valves 176L and 176R through the shuttle valves 32AL and 32AR by reducing pilot pressures acting on the one inlet ports of the shuttle valves 32AL and 32AR.

The controller 30 may forcibly control or stop the operation of the arm cylinder 8 corresponding to the arm closing operation of the left operating lever 26L by controlling the proportional valve 31AR instead of controlling the pressure reducing proportional valve 33AL. For example, in the case of performing the arm closing operation with the left operating lever 26L, the controller 30 may control the proportional valve 31AR to act on the arm-opening-side pilot ports of the control valves 176L and 176R from the proportional valve 31AR via the shuttle valve 32AR. This causes a pilot pressure to act on the arm-opening-side pilot ports of the control valves 176L and 176R against a pilot pressure acting on the arm-closing-side pilot ports of the control valves 176L and 176R from the left operating lever 26L via the shuttle valve 32AL. Therefore, the controller 30 can forcibly move the control valves 176L and 176R toward a neutral position to forcibly control or stop the operation of the arm cylinder 8 corresponding to the arm closing operation of the left operating lever 26L. Likewise, the controller 30 may forcibly control or stop the operation of the arm cylinder 8 corresponding to the arm opening operation of the left operating lever 26L by controlling the proportional valve 31AL instead of controlling the pressure reducing proportional valve 33AR.

The operating pressure sensor 29LA detects the details of the operator's forward or the backward operation of the left operating lever 26L in the form of pressure (operating pressure), and a detection signal corresponding to the detected pressure is fed into the controller 30. This enables the controller 30 to determine the details of the forward or the backward operation of the left operating lever 26L. Examples of the details of the forward and the backward operation of the left operating lever 26L to be detected may include the direction of operation and the amount of operation (the angle of operation). Hereinafter, the same applies to the rightward and the leftward operation of the left operating lever 26L and the forward and the backward operation and the rightward and the leftward operation of the right operating lever 26R.

The controller 30 can cause hydraulic oil discharged from the pilot pump 15 to be supplied to the right pilot port of the control valve 176L and the left pilot port of the control valve 176R via the proportional valve 31AL and the shuttle valve 32AL, independent of the operator's arm closing operation on the left operating lever 26L. Furthermore, the controller 30 can cause hydraulic oil discharged from the pilot pump 15 to be supplied to the left pilot port of the control valve 176L and the right pilot port of the control valve 176R via the proportional valve 31AR and the shuttle valve 32AR, independent of the operator's arm opening operation on the left operating lever 26L. That is, the controller 30 can automatically control the opening and closing operation of the arm 5.

Figure 4B:
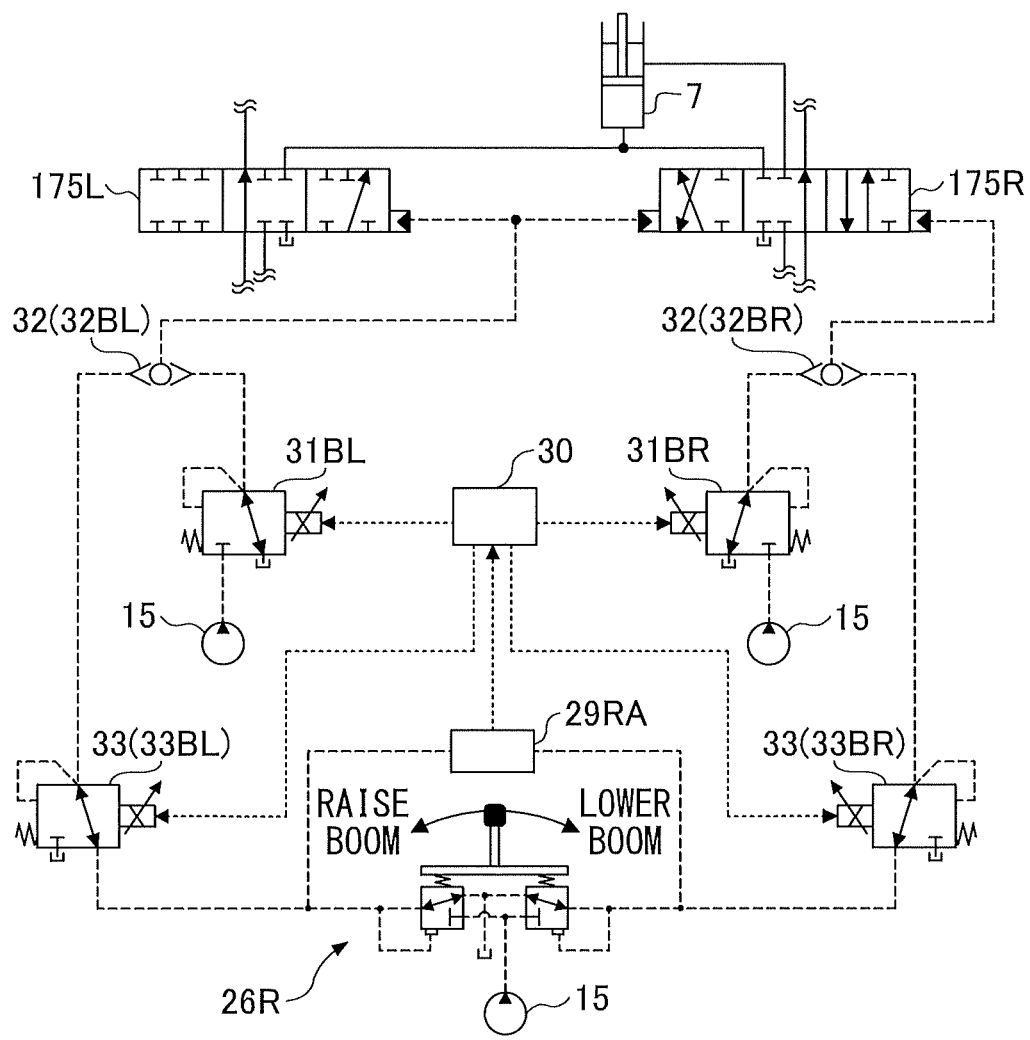
FIG. 4B is a diagram illustrating an example of a constituent part of a boom-related operation system in the hydraulic system of the shovel.

Furthermore, for example, as illustrated in FIG. 4B, the right operating lever 26R is used to operate the boom cylinder 7 corresponding to the boom 4 in a manner in which the right operating lever 26R is tilted forward or backward by the operator. That is, when the right operating lever 26R is tilted forward or backward, the target of operation of the right operating lever 26R is the operation of the boom 4. The right operating lever 26R outputs a pilot pressure commensurate with the details of the forward or the backward operation to the secondary side, using hydraulic oil discharged from the pilot pump 15.

The shuttle valve 32BL has two inlet ports, one connected to a secondary-side pilot line of the right operating lever 26R corresponding to an operation in a direction to raise the boom 4 (hereinafter "boom raising operation") and the other connected to the secondary-side pilot line of the proportional valve 31BL, and has an outlet port connected to the right pilot port of the control valve 175L and the left pilot port of the control valve 175R.

The shuttle valve 32BR has two inlet ports, one connected to a secondary-side pilot line of the right operating lever 26R corresponding to an operation in a direction to lower the boom 4 (hereinafter "boom lowering operation") and the other connected to the secondary-side pilot line of the proportional valve 31BR, and has an outlet port connected to the right pilot port of the control valve 175R.

That is, the right operating lever 26R causes a pilot pressure commensurate with the details of the forward or the backward operation to act on pilot ports of the control valves 175L and 175R through the shuttle valve 32BL or 32BR. Specifically, in response to the boom raising operation, the right operating lever 26R outputs a pilot pressure commensurate with the amount of operation to one inlet port of the shuttle valve 32BL and causes the pilot pressure to act on the right pilot port of the control valve 175L and the left pilot port of the control valve 175R via the shuttle valve 32BL. Furthermore, in response to the boom lowering operation, the right operating lever 26R outputs a pilot pressure commensurate with the amount of operation to one inlet port of the shuttle valve 32BR and causes the pilot pressure to act on the right pilot port of the control valve 175R via the shuttle valve 32BR.

The proportional valve 31BL operates in response to a control current input from the controller 30. Specifically, the proportional valve 31BL outputs a pilot pressure commensurate with a control current input from the controller 30 to the other inlet port of the shuttle valve 32BL, using hydraulic oil discharged from the pilot pump 15. This enables the proportional valve 31BL to control a pilot pressure acting on the right pilot port of the control valve 175L and the left pilot port of the control valve 175R via the shuttle valve 32BL.

The proportional valve 31BR operates in response to a control current input from the controller 30. Specifically, the proportional valve 31BR outputs a pilot pressure commensurate with a control current input from the controller 30 to the other pilot port of the shuttle valve 32BR, using hydraulic oil discharged from the pilot pump 15. This enables the proportional valve 31BR to control a pilot pressure acting on the right pilot port of the control valve 175R via the shuttle valve 32BR.

That is, the proportional valves 31BL and 31BR can control a pilot pressure output to the secondary side such that the control valves 175L and 175R can stop at a desired valve position independent of the forward or the backward operating state of the right operating lever 26R. Hereinafter, the proportional valves 31BL and 31BR may be collectively or individually referred to as "boom proportional valve 31B."

The pressure reducing proportional valve 33BL operates in response to a control current input from the controller 30. Specifically, when no control current is input from the controller 30, the pressure reducing proportional valve 33BL outputs a pilot pressure commensurate with the boom raising operation of the right operating lever 26R directly to the secondary side. In contrast, when a control current is input from the controller 30, the pressure reducing proportional valve 33BL reduces the pilot pressure of a secondary-side pilot line corresponding to the boom raising operation of the right operating lever 26R to an extent corresponding to the control current, and outputs the reduced pilot pressure to the one inlet port of the shuttle valve 32BL. This enables the pressure reducing proportional valve 33BL to forcibly control or stop the operation of the boom cylinder 7 corresponding to the boom raising operation on an as-needed basis even during the boom raising operation of the right operating lever 26R. Furthermore, the pressure reducing proportional valve 33BL can cause the pilot pressure acting on the one inlet port of the shuttle valve 32BL to be lower than the pilot pressure acting on the other inlet port of the shuttle valve 32BL from the proportional valve 31BL even during the boom raising operation of the right operating lever 26R. Therefore, the controller 30 can ensure that a desire pilot pressure acts on the boom-raising-side pilot ports of the control valves 175L and 175R by controlling the proportional valve 31BL and the pressure reducing proportional valve 33BL.

The pressure reducing proportional valve 33BR operates in response to a control current input from the controller 30. Specifically, when no control current is input from the controller 30, the pressure reducing proportional valve 33BR outputs a pilot pressure commensurate with the boom lowering operation of the right operating lever 26R directly to the secondary side. In contrast, when a control current is input from the controller 30, the pressure reducing proportional valve 33BR reduces the pilot pressure of a secondary-side pilot line corresponding to the boom lowering operation of the right operating lever 26R to an extent corresponding to the control current, and outputs the reduced pilot pressure to the one inlet port of the shuttle valve 32BR. This enables the pressure reducing proportional valve 33BR to forcibly control or stop the operation of the boom cylinder 7 corresponding to the boom lowering operation on an as-needed basis even during the boom lowering operation of the right operating lever 26R. Furthermore, the pressure reducing proportional valve 33BR can cause the pilot pressure acting on the one inlet port of the shuttle valve 32BR to be lower than the pilot pressure acting on the other inlet port of the shuttle valve 32BR from the proportional valve 31BR even during the boom lowering operation of the right operating lever 26R. Therefore, the controller 30 can ensure that a desire pilot pressure acts on the boom-lowering-side pilot ports of the control valves 175L and 175R by controlling the proportional valve 31BR and the pressure reducing proportional valve 33BR.

Thus, the pressure reducing proportional valves 33BL and 33BR can forcibly control or stop the operations of the boom cylinder 7 corresponding to the forward and the backward operating state of the right operating lever 26R. Furthermore, the pressure reducing proportional valves 33BL and 33BR can assist in ensuring that the pilot pressures of the proportional valves 31BL and 31BR act on the pilot ports of the control valves 175L and 175R through the shuttle valves 32BL and 32BR by reducing pilot pressures acting on the one inlet ports of the shuttle valves 32BL and 32BR.

The controller 30 may forcibly control or stop the operation of the boom cylinder 7 corresponding to the boom raising operation of the right operating lever 26R by controlling the proportional valve 31BR instead of controlling the pressure reducing proportional valve 33BL. For example, in the case of performing the boom raising operation with the right operating lever 26R, the controller 30 may control the proportional valve 31BR to act on the boom-lowering-side pilot ports of the control valves 175L and 175R from the proportional valve 31BR via the shuttle valve 32BR. This causes a pilot pressure to act on the boom-lowering-side pilot ports of the control valves 175L and 175R against a pilot pressure acting on the boom-raising-side pilot ports of the control valves 175L and 175R from the right operating lever 26R via the shuttle valve 32BL. Therefore, the controller 30 can forcibly move the control valves 175L and 175R toward a neutral position to forcibly control or stop the operation of the boom cylinder 7 corresponding to the boom raising operation of the right operating lever 26R. Likewise, the controller 30 may forcibly control or stop the operation of the boom cylinder 7 corresponding to the boom lowering operation of the right operating lever 26R by controlling the proportional valve 31BL instead of controlling the pressure reducing proportional valve 33BR.

The operating pressure sensor 29RA detects the details of the operator's forward or the backward operation of the right operating lever 26R in the form of pressure (operating pressure), and a detection signal corresponding to the detected pressure is fed into the controller 30. This enables the controller 30 to determine the details of the forward or the backward operation of the right operating lever 26R.

The controller 30 can cause hydraulic oil discharged from the pilot pump 15 to be supplied to the right pilot port of the control valve 175L and the left pilot port of the control valve 175R via the proportional valve 31BL and the shuttle valve 32BL, independent of the operator's boom raising operation on the right operating lever 26R. Furthermore, the controller 30 can cause hydraulic oil discharged from the pilot pump 15 to be supplied to the right pilot port of the control valve 175R via the proportional valve 31BR and the shuttle valve 32BR, independent of the operator's boom lowering operation on the right operating lever 26R. That is, the controller 30 can automatically control the raising and lowering operation of the boom 4.

Figure 4C:
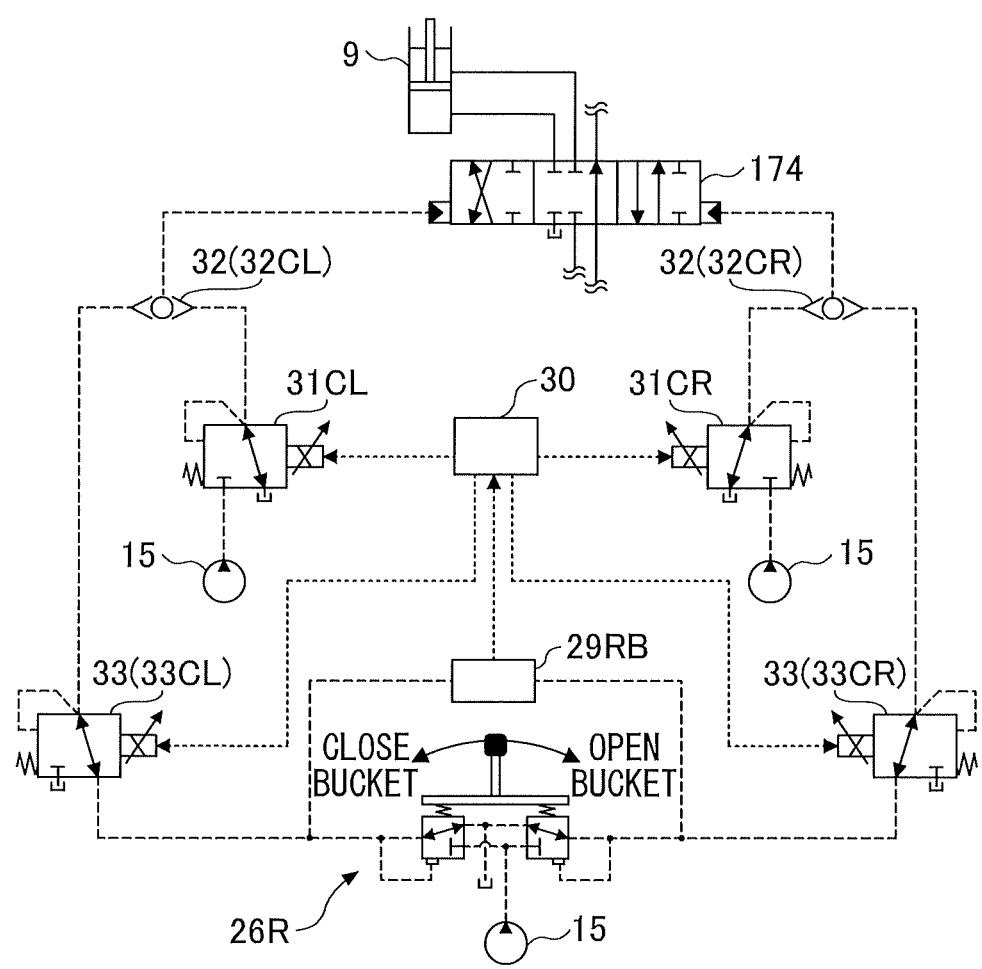
FIG. 4C is a diagram illustrating an example of a constituent part of a bucket-related operation system in the hydraulic system of the shovel.

As illustrated in FIG. 4C, the right operating lever 26R is used to operate the bucket cylinder 9 corresponding to the bucket 6 in a manner in which the right operating lever 26R is tilted rightward or leftward by the operator. That is, when the right operating lever 26R is tilted rightward or leftward, the target of operation of the right operating lever 26R is the operation of the bucket 6. The right operating lever 26R outputs a pilot pressure commensurate with the details of the rightward or the leftward operation to the secondary side, using hydraulic oil discharged from the pilot pump 15.

The shuttle valve 32CL has two inlet ports, one connected to a secondary-side pilot line of the right operating lever 26R corresponding to an operation in a direction to close the bucket 6 (hereinafter "bucket closing operation") and the other connected to the secondary-side pilot line of the proportional valve 31CL, and has an outlet port connected to the left pilot port of the control valve 174.

The shuttle valve 32CR has two inlet ports, one connected to a secondary-side pilot line of the right operating lever 26R corresponding to an operation in a direction to open the bucket (hereinafter "bucket opening operation") and the other connected to the secondary-side pilot line of the proportional valve 31CR, and has an outlet port connected to the right pilot port of the control valve 174.

That is, the right operating lever 26R causes a pilot pressure commensurate with the details of the rightward or the leftward operation to act on a pilot port of the control valve 174 through the shuttle valve 32CL or 32CR. Specifically, in response to the bucket closing operation, the right operating lever 26R outputs a pilot pressure commensurate with the amount of operation to one inlet port of the shuttle valve 32CL and causes the pilot pressure to act on the left pilot port of the control valve 174 via the shuttle valve 32CL. Furthermore, in response to the bucket opening operation, the right operating lever 26R outputs a pilot pressure commensurate with the amount of operation to one inlet port of the shuttle valve 32CR and causes the pilot pressure to act on the right pilot port of the control valve 174 via the shuttle valve 32CR.

The proportional valve 31CL operates in response to a control current input from the controller 30. Specifically, the proportional valve 31CL outputs a pilot pressure commensurate with a control current input from the controller 30 to the other inlet port of the shuttle valve 32CL, using hydraulic oil discharged from the pilot pump 15. This enables the proportional valve 31CL to control a pilot pressure acting on the left pilot port of the control valve 174 via the shuttle valve 32CL.

The proportional valve 31CR operates in response to a control current input from the controller 30. Specifically, the proportional valve 31CR outputs a pilot pressure commensurate with a control current input from the controller 30 to the other pilot port of the shuttle valve 32CR, using hydraulic oil discharged from the pilot pump 15. This enables the proportional valve 31CR to control a pilot pressure acting on the right pilot port of the control valve 174 via the shuttle valve 32CR.

That is, the proportional valves 31CL and 31CR can control a pilot pressure output to the secondary side such that the control valve 174 can stop at a desired valve position independent of the rightward or the leftward operating state of the right operating lever 26R. Hereinafter, the proportional valves 31CL and 31CR may be collectively or individually referred to as "bucket proportional valve 31C."

The pressure reducing proportional valve 33CL operates in response to a control current input from the controller 30. Specifically, when no control current is input from the controller 30, the pressure reducing proportional valve 33CL outputs a pilot pressure commensurate with the bucket closing operation of the right operating lever 26R directly to the secondary side. In contrast, when a control current is input from the controller 30, the pressure reducing proportional valve 33CL reduces the pilot pressure of a secondary-side pilot line corresponding to the bucket closing operation of the right operating lever 26R to an extent corresponding to the control current, and outputs the reduced pilot pressure to the one inlet port of the shuttle valve 32CL. This enables the pressure reducing proportional valve 33CL to forcibly control or stop the operation of the bucket cylinder 9 corresponding to the bucket closing operation on an as-needed basis even during the bucket closing operation of the right operating lever 26R. Furthermore, the pressure reducing proportional valve 33CL can cause the pilot pressure acting on the one inlet port of the shuttle valve 32CL to be lower than the pilot pressure acting on the other inlet port of the shuttle valve 32CL from the proportional valve 31CL even during the bucket closing operation of the right operating lever 26R. Therefore, the controller 30 can ensure that a desire pilot pressure acts on the bucket-closing-side pilot port of the control valve 174 by controlling the proportional valve 31CL and the pressure reducing proportional valve 33CL.

The pressure reducing proportional valve 33CR operates in response to a control current input from the controller 30. Specifically, when no control current is input from the controller 30, the pressure reducing proportional valve 33CR outputs a pilot pressure commensurate with the bucket opening operation of the right operating lever 26R directly to the secondary side. In contrast, when a control current is input from the controller 30, the pressure reducing proportional valve 33CR reduces the pilot pressure of a secondary-side pilot line corresponding to the bucket opening operation of the right operating lever 26R to an extent corresponding to the control current, and outputs the reduced pilot pressure to the one inlet port of the shuttle valve 32CR. This enables the pressure reducing proportional valve 33CR to forcibly control or stop the operation of the bucket cylinder 9 corresponding to the bucket opening operation on an as-needed basis even during the bucket opening operation of the right operating lever 26R. Furthermore, the pressure reducing proportional valve 33CR can cause the pilot pressure acting on the one inlet port of the shuttle valve 32CR to be lower than the pilot pressure acting on the other inlet port of the shuttle valve 32CR from the proportional valve 31CR even during the bucket opening operation of the right operating lever 26R. Therefore, the controller 30 can ensure that a desire pilot pressure acts on the bucket-opening-side pilot port of the control valve 174 by controlling the proportional valve 31CR and the pressure reducing proportional valve 33CR.

Thus, the pressure reducing proportional valves 33CL and 33CR can forcibly control or stop the operations of the bucket cylinder 9 corresponding to the rightward and the leftward operating state of the right operating lever 26R. Furthermore, the pressure reducing proportional valves 33CL and 33CR can assist in ensuring that the pilot pressures of the proportional valves 31CL and 31CR act on the pilot ports of the control valve 174 through the shuttle valves 32CL and 32CR by reducing pilot pressures acting on the one inlet ports of the shuttle valves 32CL and 32CR.

The controller 30 may forcibly control or stop the operation of the bucket cylinder 9 corresponding to the bucket closing operation of the right operating lever 26R by controlling the proportional valve 31CR instead of controlling the pressure reducing proportional valve 33CL. For example, in the case of performing the bucket closing operation with the right operating lever 26R, the controller 30 may control the proportional valve 31CR to act on the bucket-opening-side pilot port of the control valve 174 from the proportional valve 31CR via the shuttle valve 32CR. This causes a pilot pressure to act on the bucket-opening-side pilot port of the control valve 174 against a pilot pressure acting on the bucket-closing-side pilot port of the control valve 174 from the right operating lever 26R via the shuttle valve 32CL. Therefore, the controller 30 can forcibly move the control valve 174 toward a neutral position to forcibly control or stop the operation of the bucket cylinder 9 corresponding to the bucket closing operation of the right operating lever 26R. Likewise, the controller 30 may forcibly control or stop the operation of the bucket cylinder 9 corresponding to the bucket opening operation of the right operating lever 26R by controlling the proportional valve 31CL instead of controlling the pressure reducing proportional valve 33CR.

The operating pressure sensor 29RB detects the details of the operator's rightward or the leftward operation of the right operating lever 26R in the form of pressure (operating pressure), and a detection signal corresponding to the detected pressure is fed into the controller 30. This enables the controller 30 to determine the details of the rightward or the leftward operation of the right operating lever 26R.

The controller 30 can cause hydraulic oil discharged from the pilot pump 15 to be supplied to the left pilot port of the control valve 174 via the proportional valve 31CL and the shuttle valve 32CL, independent of the operator's bucket closing operation on the right operating lever 26R. Furthermore, the controller 30 can cause hydraulic oil discharged from the pilot pump 15 to be supplied to the right pilot port of the control valve 174 via the proportional valve 31CR and the shuttle valve 32CR, independent of the operator's bucket opening operation on the right operating lever 26R. That is, the controller 30 can automatically control the opening and closing operation of the bucket 6.

Figure 4D:
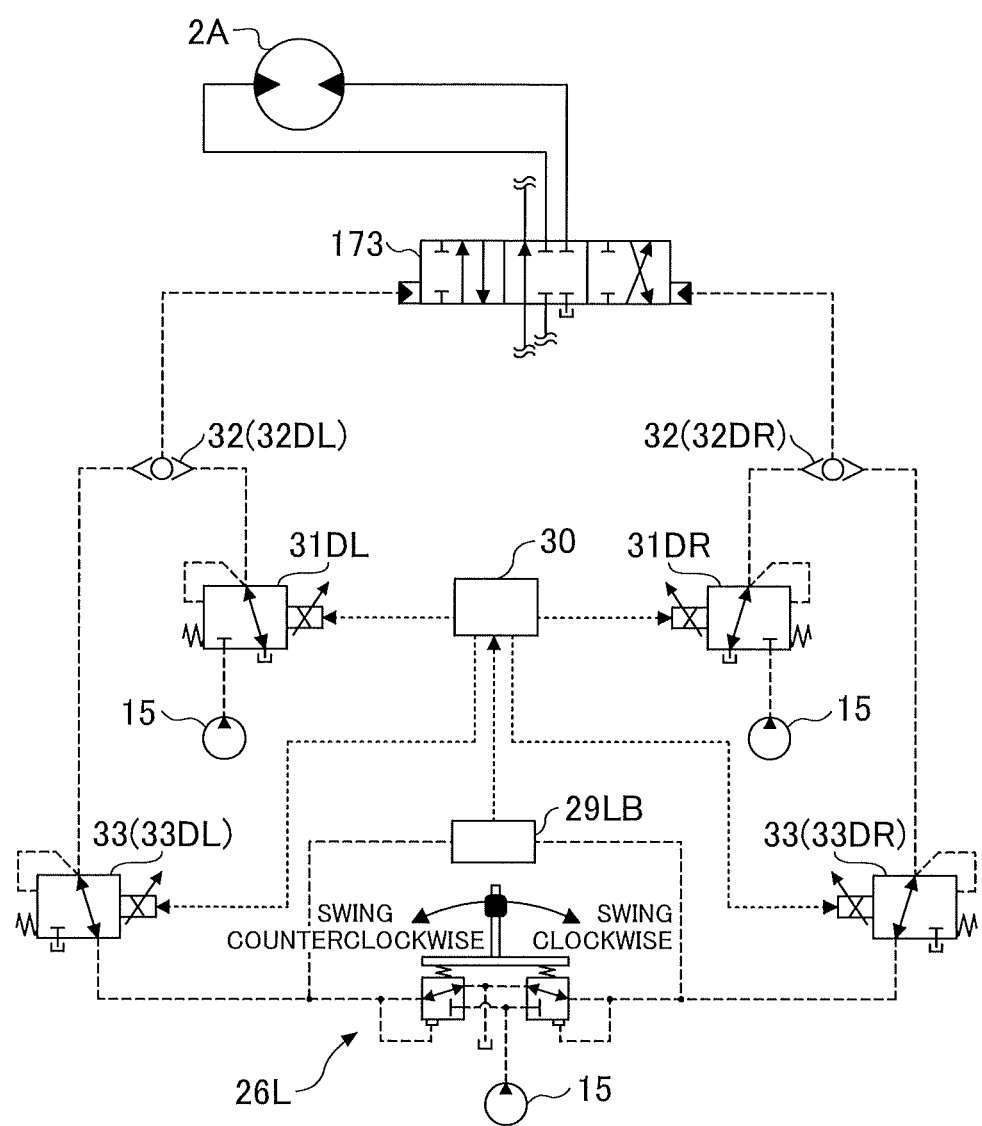
FIG. 4D is a diagram illustrating an example of a constituent part of an upper swing structure-related operation system in the hydraulic system of the shovel.

Furthermore, for example, as illustrated in FIG. 4D, the left operating lever 26L is used to operate the swing hydraulic motor 2A corresponding to the upper swing structure 3 (the swing mechanism 2) in a manner in which the left operating lever 26L is tilted rightward or leftward by the operator. That is, when the left operating lever 26L is tilted rightward or leftward, the target of operation of the left operating lever 26L is the operation of the upper swing structure 3. The left operating lever 26L outputs a pilot pressure commensurate with the details of the rightward or the leftward operation to the secondary side, using hydraulic oil discharged from the pilot pump 15.

The shuttle valve 32DL has two inlet ports, one connected to a secondary-side pilot line of the left operating lever 26L corresponding to an operation to swing the Upper swing structure 3 counterclockwise (hereinafter "counterclockwise swing operation") and the other connected to the secondary-side pilot line of the proportional valve 31DL, and has an outlet port connected to the left pilot port of the control valve 173.

The shuttle valve 32DR has two inlet ports, one connected to a secondary-side pilot line of the left operating lever 26L corresponding to an operation to swing the upper swing structure 3 clockwise (hereinafter "clockwise swing operation") and the other connected to the secondary-side pilot line of the proportional valve 31DR, and has an outlet port connected to the right pilot port of the control valve 173.

That is, the left operating lever 26L causes a pilot pressure commensurate with the details of the clockwise or the counterclockwise swing operation to act on a pilot port of the control valve 173 through the shuttle valve 32DL or 32DR. Specifically, in response to the counterclockwise swing operation, the left operating lever 26L outputs a pilot pressure commensurate with the amount of operation to one inlet port of the shuttle valve 32DL and causes the pilot pressure to act on the left pilot port of the control valve 173 via the shuttle valve 32DL. Furthermore, in response to the clockwise swing operation, the left operating lever 26L outputs a pilot pressure commensurate with the amount of operation to one inlet port of the shuttle valve 32DR and causes the pilot pressure to act on the right pilot port of the control valve 173 via the shuttle valve 32DR.

The proportional valve 31DL operates in response to a control current input from the controller 30. Specifically, the proportional valve 31DL outputs a pilot pressure commensurate with a control current input from the controller 30 to the other pilot port of the shuttle valve 32DL, using hydraulic oil discharged from the pilot pump 15. This enables the proportional valve 31DL to control a pilot pressure acting on the left pilot port of the control valve 173 via the shuttle valve 32DL.

The proportional valve 31DR operates in response to a control current input from the controller 30. Specifically, the proportional valve 31DR outputs a pilot pressure commensurate with a control current input from the controller 30 to the other pilot port of the shuttle valve 32DR, using hydraulic oil discharged from the pilot pump 15. This enables the proportional valve 31DR to control a pilot pressure acting on the right pilot port of the control valve 173 via the shuttle valve 32DR.

That is, the proportional valves 31DL and 31DR can control a pilot pressure output to the secondary side such that the control valve 173 can stop at a desired valve position independent of the rightward or the leftward operating state of the left operating lever 26L. Hereinafter, the proportional valves 31DL and 31DR may be collectively or individually referred to as "swing proportional valve 31D."

The pressure reducing proportional valve 33DL operates in response to a control current input from the controller 30. Specifically, when no control current is input from the controller 30, the pressure reducing proportional valve 33DL outputs a pilot pressure commensurate with the counterclockwise swing operation of the left operating lever 26L directly to the secondary side. In contrast, when a control current is input from the controller 30, the pressure reducing proportional valve 33DL reduces the pilot pressure of a secondary-side pilot line corresponding to the counterclockwise swing operation of the left operating lever 26L to an extent corresponding to the control current, and outputs the reduced pilot pressure to the one inlet port of the shuttle valve 32DL. This enables the pressure reducing proportional valve 33DL to forcibly control or stop the operation of the swing hydraulic motor 2A corresponding to the counterclockwise swing operation on an as-needed basis even during the counterclockwise swing operation of the left operating lever 26L. Furthermore, the pressure reducing proportional valve 33DL can cause the pilot pressure acting on the one inlet port of the shuttle valve 32DL to be lower than the pilot pressure acting on the other inlet port of the shuttle valve 32DL from the proportional valve 31DL even during the counterclockwise swing operation of the left operating lever 26L. Therefore, the controller 30 can ensure that a desire pilot pressure acts on the counterclockwise-swing-side pilot port of the control valve 173 by controlling the proportional valve 31DL and the pressure reducing proportional valve 33DL.

The pressure reducing proportional valve 33DR operates in response to a control current input from the controller 30. Specifically, when no control current is input from the controller 30, the pressure reducing proportional valve 33DR outputs a pilot pressure commensurate with the clockwise swing operation of the left operating lever 26L directly to the secondary side. In contrast, when a control current is input from the controller 30, the pressure reducing proportional valve 33DR reduces the pilot pressure of a secondary-side pilot line corresponding to the clockwise swing operation of the left operating lever 26L to an extent corresponding to the control current, and outputs the reduced pilot pressure to the one inlet port of the shuttle valve 32DR. This enables the pressure reducing proportional valve 33DR to forcibly control or stop the operation of the swing hydraulic motor 2A corresponding to the clockwise swing operation on an as-needed basis even during the clockwise swing operation of the left operating lever 26L. Furthermore, the pressure reducing proportional valve 33DR can cause the pilot pressure acting on the one inlet port of the shuttle valve 32DR to be lower than the pilot pressure acting on the other inlet port of the shuttle valve 32DR from the proportional valve 31DR even during the clockwise swing operation of the left operating lever 26L. Therefore, the controller 30 can ensure that a desire pilot pressure acts on the clockwise-swing-side pilot port of the control valve 173 by controlling the proportional valve 31DR and the pressure reducing proportional valve 33DR.

Thus, the pressure reducing proportional valves 33DL and 33DR can forcibly control or stop the operations of the swing hydraulic motor 2A corresponding to the rightward and the leftward operating state of the left operating lever 26L. Furthermore, the pressure reducing proportional valves 33DL and 33DR can assist in ensuring that the pilot pressures of the proportional valves 31DL and 31DR act on the pilot ports of the control valve 173 through the shuttle valves 32DL and 32DR by reducing pilot pressures acting on the one inlet ports of the shuttle valves 32DL and 32DR.

The controller 30 may forcibly control or stop the operation of the swing hydraulic motor 2A corresponding to the counterclockwise swing operation of the left operating lever 26L by controlling the proportional valve 31DR instead of controlling the pressure reducing proportional valve 33DL. For example, in the case of performing the counterclockwise swing operation with the left operating lever 26L, the controller 30 may control the proportional valve 31DR to act on the clockwise-swing-side pilot port of the control valve 173 from the proportional valve 31DR via the shuttle valve 32DR. This causes a pilot pressure to act on the clockwise-swing-side pilot port of the control valve 173 against a pilot pressure acting on the counterclockwise-swing-side pilot port of the control valve 173 from the left operating lever 26L via the shuttle valve 32DL. Therefore, the controller 30 can forcibly move the control valve 173 toward a neutral position to forcibly control or stop the operation of the swing hydraulic motor 2A corresponding to the counterclockwise swing operation of the left operating lever 26L. Likewise, the controller 30 may forcibly control or stop the operation of the swing hydraulic motor 2A corresponding to the clockwise swing operation of the left operating lever 26L by controlling the proportional valve 31DL instead of controlling the pressure reducing proportional valve 33DR.

The operating pressure sensor 29LB detects the state of the operator's operation of the left operating lever 26L in the form of pressure, and a detection signal corresponding to the detected pressure is fed into the controller 30. This enables the controller 30 to determine the details of the rightward or the leftward operation of the left operating lever 26L.

The controller 30 can cause hydraulic oil discharged from the pilot pump 15 to be supplied to the left pilot port of the control valve 173 via the proportional valve 31DL and the shuttle valve 32DL, independent of the operator's counterclockwise swing operation on the left operating lever 26L. Furthermore, the controller 30 can cause hydraulic oil discharged from the pilot pump 15 to be supplied to the right pilot port of the control valve 173 via the proportional valve 31DR and the shuttle valve 32DR, independent of the operator's clockwise swing operation on the left operating lever 26L. That is, the controller 30 can automatically control the clockwise and counterclockwise operation of the upper swing structure 3.

Furthermore, for example, as illustrated in FIG. 5A, the left travel lever 26DL is used to operate the travel hydraulic motor 2ML corresponding to the left crawler 1CL. That is, the target of operation of the left travel lever 26DL is the travel operation of the left crawler 1CL. The left travel lever 26DL outputs a pilot pressure commensurate with the details of the forward or the backward operation to the secondary side, using hydraulic oil discharged from the pilot pump 15.

The shuttle valve 32EL has two inlet ports, one connected to a secondary-side pilot line of the left travel lever 26DL corresponding to an operation in a forward direction corresponding to the forward travel direction of the left crawler 1CL (hereinafter "forward travel operation") and the other connected to the secondary-side pilot line of the proportional valve 31EL, and has an outlet port connected to the left pilot port of the control valve 171.

The shuttle valve 32ER has two inlet ports, one connected to a secondary-side pilot line of the left travel lever 26DL corresponding to an operation in a backward direction corresponding to the backward travel direction of the left crawler 1CL (hereinafter "backward travel operation") and the other connected to the secondary-side pilot line of the proportional valve 31ER, and has an outlet port connected to the right pilot port of the control valve 171.

That is, the left travel lever 26DL causes a pilot pressure commensurate with the details of the forward or the backward operation to act on a pilot port of the control valve 171 through the shuttle valve 32EL or 32ER. Specifically, in response to the forward travel operation, the left travel lever 26DL outputs a pilot pressure commensurate with the amount of operation to one inlet port of the shuttle valve 32EL and causes the pilot pressure to act on the left pilot port of the control valve 171 via the shuttle valve 32EL. Furthermore, in response to the backward travel operation, the left travel lever 26DL outputs a pilot pressure commensurate with the amount of operation to one inlet port of the shuttle valve 32ER and causes the pilot pressure to act on the right pilot port of the control valve 171 via the shuttle valve 32ER.

The proportional valve 31EL operates in response to a control current input from the controller 30. Specifically, the proportional valve 31EL outputs a pilot pressure commensurate with a control current input from the controller 30 to the other pilot port of the shuttle valve 32EL, using hydraulic oil discharged from the pilot pump 15. This enables the proportional valve 31EL to control a pilot pressure acting on the left pilot port of the control valve 171 via the shuttle valve 32EL.

The proportional valve 31ER operates in response to a control current input from the controller 30. Specifically, the proportional valve 31ER outputs a pilot pressure commensurate with a control current input from the controller 30 to the other pilot port of the shuttle valve 32ER, using hydraulic oil discharged from the pilot pump 15. This enables the proportional valve 31ER to control a pilot pressure acting on the right pilot port of the control valve 171 via the shuttle valve 32ER.

That is, the proportional valves 31EL and 31ER can control a pilot pressure output to the secondary side such that the control valve 171 can stop at a desired valve position independent of the operating state of the left travel lever 26DL.

The pressure reducing proportional valve 33EL operates in response to a control current input from the controller 30. Specifically, when no control current is input from the controller 30, the pressure reducing proportional valve 33EL outputs a pilot pressure commensurate with the forward travel operation of the left travel lever 26DL directly to the secondary side. In contrast, when a control current is input from the controller 30, the pressure reducing proportional valve 33EL reduces the pilot pressure of a secondary-side pilot line corresponding to the forward travel operation of the left travel lever 26DL to an extent corresponding to the control current, and outputs the reduced pilot pressure to the one inlet port of the shuttle valve 32EL. This enables the pressure reducing proportional valve 33EL to forcibly control or stop the operation of the travel hydraulic motor 2ML corresponding to the forward travel operation on an as-needed basis even during the forward travel operation of the left travel lever 26DL. Furthermore, the pressure reducing proportional valve 33EL can cause the pilot pressure acting on the one inlet port of the shuttle valve 32EL to be lower than the pilot pressure acting on the other inlet port of the shuttle valve 32EL from the proportional valve 31EL even during the forward travel operation of the left travel lever 26DL. Therefore, the controller 30 can ensure that a desire pilot pressure acts on the forward-travel-side pilot port of the control valve 171 by controlling the proportional valve 31EL and the pressure reducing proportional valve 33EL.

The pressure reducing proportional valve 33ER operates in response to a control current input from the controller 30. Specifically, when no control current is input from the controller 30, the pressure reducing proportional valve 33ER outputs a pilot pressure commensurate with the backward travel operation of the left travel lever 26DL directly to the secondary side. In contrast, when a control current is input from the controller 30, the pressure reducing proportional valve 33ER reduces the pilot pressure of a secondary-side pilot line corresponding to the backward travel operation of the left travel lever 26DL to an extent corresponding to the control current, and outputs the reduced pilot pressure to the one inlet port of the shuttle valve 32ER. This enables the pressure reducing proportional valve 33ER to forcibly control or stop the operation of the travel hydraulic motor 2ML corresponding to the backward travel operation on an as-needed basis even during the backward travel operation of the left travel lever 26DL. Furthermore, the pressure reducing proportional valve 33ER can cause the pilot pressure acting on the one inlet port of the shuttle valve 32ER to be lower than the pilot pressure acting on the other inlet port of the shuttle valve 32ER from the proportional valve 31ER even during the backward travel operation of the left travel lever 26DL. Therefore, the controller 30 can ensure that a desire pilot pressure acts on the backward-travel-side pilot port of the control valve 171 by controlling the proportional valve 31ER and the pressure reducing proportional valve 33ER.

Thus, the pressure reducing proportional valves 33EL and 33ER can forcibly control or stop the operations of the travel hydraulic motor 2ML corresponding to the forward and the backward operating state of the left travel lever 26DL. Furthermore, the pressure reducing proportional valves 33EL and 33ER can assist in ensuring that the pilot pressures of the proportional valves 31EL and 31ER act on the pilot ports of the control valve 171 through the shuttle valves 32EL and 32ER by reducing pilot pressures acting on the one inlet ports of the shuttle valves 32EL and 32ER.

The controller 30 may forcibly control or stop the operation of the travel hydraulic motor 2ML corresponding to the forward travel operation of the left travel lever 26DL by controlling the proportional valve 31ER instead of controlling the pressure reducing proportional valve 33EL. For example, in the case of performing the forward travel operation with the left travel lever 26DL, the controller 30 may control the proportional valve 31ER to act on the backward-travel-side pilot port of the control valve 171 from the proportional valve 31ER via the shuttle valve 32ER. This causes a pilot pressure to act on the backward-travel-side pilot port of the control valve 171 against a pilot pressure acting on the forward-travel-side pilot port of the control valve 171 from the left travel lever 26DL via the shuttle valve 32EL. Therefore, the controller 30 can forcibly move the control valve 171 toward a neutral position to forcibly control or stop the operation of the travel hydraulic motor 2ML corresponding to the forward travel operation of the left travel lever 26DL. Likewise, the controller 30 may forcibly control or stop the operation of the travel hydraulic motor 2ML corresponding to the backward travel operation of the left travel lever 26DL by controlling the proportional valve 31EL instead of controlling the pressure reducing proportional valve 33ER.

The operating pressure sensor 29DL detects the details of the operator's forward or the backward operation of the left travel lever 26DL in the form of pressure, and a detection signal corresponding to the detected pressure is fed into the controller 30. This enables the controller 30 to determine the details of the forward or the backward operation of the left travel lever 26DL.

The controller 30 can cause hydraulic oil discharged from the pilot pump 15 to be supplied to the left pilot port of the control valve 171 via the proportional valve 31EL and the shuttle valve 32EL, independent of the operator's forward travel operation on the left travel lever 26DL. Furthermore, the controller 30 can cause hydraulic oil discharged from the pilot pump 15 to be supplied to the right pilot port of the control valve 171 via the proportional valve 31ER and the shuttle valve 32ER, independent of the operator's backward travel operation on the left travel lever 26DL. That is, the controller 30 can automatically control the forward and backward operation of the left crawler 1CL.

Furthermore, for example, as illustrated in FIG. 5B, the right travel lever 26DR is used to operate the travel hydraulic motor 2MR corresponding to the right crawler 1CR. That is, the target of operation of the right travel lever 26DR is the travel operation of the right crawler 1CR. The right travel lever 26DR outputs a pilot pressure commensurate with the details of the forward or the backward operation to the secondary side, using hydraulic oil discharged from the pilot pump 15.

The shuttle valve 32FR has two inlet ports, one connected to a secondary-side pilot line of the right travel lever 26DR corresponding to an operation in a forward direction corresponding to the forward travel direction of the right crawler 1CR (hereinafter "forward travel operation") and the other connected to the secondary-side pilot line of the proportional valve 31FR, and has an outlet port connected to the right pilot port of the control valve 172.

The shuttle valve 32FL has two inlet ports, one connected to a secondary-side pilot line of the right travel lever 26DR corresponding to an operation in a backward direction corresponding to the backward travel direction of the right crawler 1CR (hereinafter "backward travel operation") and the other connected to the secondary-side pilot line of the proportional valve 31FL, and has an outlet port connected to the left pilot port of the control valve 172.

That is, the right travel lever 26DR causes a pilot pressure commensurate with the details of the forward or the backward operation to act on a pilot port of the control valve 172 through the shuttle valve 32FL or 32FR. Specifically, in response to the forward travel operation, the right travel lever 26DR outputs a pilot pressure commensurate with the amount of operation to one inlet port of the shuttle valve 32FR and causes the pilot pressure to act on the right pilot port of the control valve 172 via the shuttle valve 32FR. Furthermore, in response to the backward travel operation, the right travel lever 26DR outputs a pilot pressure commensurate with the amount of operation to one inlet port of the shuttle valve 32FL and causes the pilot pressure to act on the left pilot port of the control valve 172 via the shuttle valve 32FL.

The proportional valve 31FL operates in response to a control current input from the controller 30. Specifically, the proportional valve 31FL outputs a pilot pressure commensurate with a control current input from the controller 30 to the other pilot port of the shuttle valve 32FL, using hydraulic oil discharged from the pilot pump 15. This enables the proportional valve 31FL to control a pilot pressure acting on the left pilot port of the control valve 172 via the shuttle valve 32FL.

The proportional valve 31FR operates in response to a control current input from the controller 30. Specifically, the proportional valve 31FR outputs a pilot pressure commensurate with a control current input from the controller 30 to the other pilot port of the shuttle valve 32FR, using hydraulic oil discharged from the pilot pump 15. This enables the proportional valve 31FR to control a pilot pressure acting on the right pilot port of the control valve 172 via the shuttle valve 32FR.

That is, the proportional valves 31FL and 31FR can control a pilot pressure output to the secondary side such that the control valve 172 can stop at a desired valve position independent of the operating state of the right travel lever 26DR.

The pressure reducing proportional valve 33FL operates in response to a control current input from the controller 30. Specifically, when no control current is input from the controller 30, the pressure reducing proportional valve 33FL outputs a pilot pressure commensurate with the backward travel operation of the right travel lever 26DR directly to the secondary side. In contrast, when a control current is input from the controller 30, the pressure reducing proportional valve 33FL reduces the pilot pressure of a secondary-side pilot line corresponding to the backward travel operation of the right travel lever 26DR to an extent corresponding to the control current, and outputs the reduced pilot pressure to the one inlet port of the shuttle valve 32FL. This enables the pressure reducing proportional valve 33FL to forcibly control or stop the operation of the travel hydraulic motor 2MR corresponding to the backward travel operation on an as-needed basis even during the backward travel operation of the right travel lever 26DR. Furthermore, the pressure reducing proportional valve 33FL can cause the pilot pressure acting on the one inlet port of the shuttle valve 32FL to be lower than the pilot pressure acting on the other inlet port of the shuttle valve 32FL from the proportional valve 31FL even during the backward travel operation of the right travel lever 26DR. Therefore, the controller 30 can ensure that a desire pilot pressure acts on the backward-travel-side pilot port of the control valve 172 by controlling the proportional valve 31FL and the pressure reducing proportional valve 33FL.

The pressure reducing proportional valve 33FR operates in response to a control current input from the controller 30. Specifically, when no control current is input from the controller 30, the pressure reducing proportional valve 33FR outputs a pilot pressure commensurate with the forward travel operation of the right travel lever 26DR directly to the secondary side. In contrast, when a control current is input from the controller 30, the pressure reducing proportional valve 33ER reduces the pilot pressure of a secondary-side pilot line corresponding to the forward travel operation of the right travel lever 26DR to an extent corresponding to the control current, and outputs the reduced pilot pressure to the one inlet port of the shuttle valve 32FR. This enables the pressure reducing proportional valve 33FR to forcibly control or stop the operation of the travel hydraulic motor 2MR corresponding to the forward travel operation on an as-needed basis even during the forward travel operation of the right travel lever 26DR. Furthermore, the pressure reducing proportional valve 33FR can cause the pilot pressure acting on the one inlet port of the shuttle valve 32FR to be lower than the pilot pressure acting on the other inlet port of the shuttle valve 32FR from the proportional valve 31FR even during the forward travel operation of the right travel lever 26DR. Therefore, the controller 30 can ensure that a desire pilot pressure acts on the forward-travel-side pilot port of the control valve 172 by controlling the proportional valve 31FR and the pressure reducing proportional valve 33FR.

Thus, the pressure reducing proportional valves 33FL and 33FR can forcibly control or stop the operations of the travel hydraulic motor 2MR corresponding to the forward and the backward operating state of the right travel lever 26DR. Furthermore, the pressure reducing proportional valves 33FL and 33FR can assist in ensuring that the pilot pressures of the proportional valves 31FL and 31FR act on the pilot ports of the control valve 172 through the shuttle valves 32FL and 32FR by reducing pilot pressures acting on the one inlet ports of the shuttle valves 32FL and 32FR.

The controller 30 may forcibly control or stop the operation of the travel hydraulic motor 2MR corresponding to the backward travel operation of the right travel lever 26DR by controlling the proportional valve 31FR instead of controlling the pressure reducing proportional valve 33FL. For example, in the case of performing the backward travel operation with the right travel lever 26DR, the controller 30 may control the proportional valve 31FR to act on the forward-travel-side pilot port of the control valve 172 from the proportional valve 31FR via the shuttle valve 32FR. This causes a pilot pressure to act on the forward-travel-side pilot port of the control valve 172 against a pilot pressure acting on the backward-travel-side pilot port of the control valve 172 from the right travel lever 26DR via the shuttle valve 32FL. Therefore, the controller 30 can forcibly move the control valve 172 toward a neutral position to forcibly control or stop the operation of the travel hydraulic motor 2MR corresponding to the backward travel operation of the right travel lever 26DR. Likewise, the controller 30 may forcibly control or stop the operation of the travel hydraulic motor 2MR corresponding to the forward travel operation of the right travel lever 26DR by controlling the proportional valve 31FL instead of controlling the pressure reducing proportional valve 33FR.

The operating pressure sensor 29DR detects the details of the operator's forward or the backward operation of the right travel lever 26DR in the form of pressure, and a detection signal corresponding to the detected pressure is fed into the controller 30. This enables the controller 30 to determine the details of the forward or the backward operation of the right travel lever 26DR.

The controller 30 can cause hydraulic oil discharged from the pilot pump 15 to be supplied to the right pilot port of the control valve 172 via the proportional valve 31FR and the shuttle valve 32FR, independent of the operator's forward travel operation on the right travel lever 26DR. Furthermore, the controller 30 can cause hydraulic oil discharged from the pilot pump 15 to be supplied to the left pilot port of the control valve 172 via the proportional valve 31FL and the shuttle valve 32FL, independent of the operator's backward travel operation on the right travel lever 26DR. That is, the controller 30 can automatically control the forward and backward operation of the right crawler 1CR.

Next, the control system of the shovel 100 according to this embodiment includes the controller 30, a space recognition device 70, an orientation detector 71, an input device 72, a positioning device 73, an external display device 74, an external audio output device 75, a display device D1, an audio output device D2, a boom angle sensor S1, an arm angle sensor S2, a bucket angle sensor S3, a machine body tilt sensor S4, a swing state sensor S5, and a communications device T1.

The space recognition device 70 is configured to detect or recognize an object present in a three-dimensional space surrounding the shovel 100 and measure (calculate) a positional relationship such as a distance from the space recognition device 70 or the shovel 100 to the recognized object. Examples of the space recognition device 70 may include an ultrasonic sensor, a millimeter wave radar, a monocular camera, a stereo camera, a LIDAR (Light Detecting and Ranging), a distance image sensor, and an infrared sensor. According to this embodiment, the space recognition device 70 includes a forward recognition sensor 70F attached to the front end of the upper surface of the cabin 10, a backward recognition sensor 70B attached to the back end of the upper surface of the upper swing structure 3, a leftward recognition sensor 70L attached to the left end of the upper surface of the upper swing structure 3, and a rightward recognition sensor 70R attached to the right end of the upper surface of the upper swing structure 3. Furthermore, an upward recognition sensor that recognizes an object present in a space above the upper swing structure 3 may be attached to the shovel 100.

The location of installation of the forward recognition sensor 70F is not limited to the upper surface of the cabin 10, and may be determined as desired to the extent that the location allows an object in front of the upper swing structure 3 to be recognized. Specifically, the forward recognition sensor 70F may be placed in such a manner as to be directly attached to a desired part of the front end of the upper swing structure 3 or may be placed on a component installed at the front end of the upper swing structure 3 other than the cabin 10, such as the boom 4 or the arm 5 of the attachment.

The orientation detector 71 detects information on the relative relationship between the orientation of the upper swing structure 3 and the orientation of the lower traveling structure 1 (for example, the swing angle of the upper swing structure 3 relative to the lower traveling structure 1).

The orientation detector 71 may include, for example, a combination of a geomagnetic sensor attached to the lower traveling structure 1 and a geomagnetic sensor attached to the upper swing structure 3. Furthermore, the orientation detector 71 may also include a combination of a GNSS (Global Navigation Satellite System) receiver attached to the lower traveling structure 1 and a GNSS receiver attached to the upper swing structure 3. The orientation detector 71 may also include a rotary encoder, a rotary position sensor, etc., that can detect the swing angle of the upper swing structure 3 relative to the lower traveling structure 1, namely, the below-described swing state sensor S5, and may be, for example, attached to a center joint provided in relation to the swing mechanism 2 that achieves relative rotation between the lower traveling structure 1 and the upper swing structure 3. The orientation detector 71 may also include a camera attached to the upper swing structure 3. In this case, the orientation detector 71 performs known image processing on an image captured by a camera attached to the upper swing structure 3 (an input image) to detect an image of the lower traveling structure 1 included in the input image. The orientation detector 71 may identify the longitudinal direction of the lower traveling structure 1 by detecting an image of the lower traveling structure 1 using a known image recognition technique and derive the angle formed between the direction of the longitudinal axis of the upper swing structure 3 and the longitudinal direction of the lower traveling structure 1. At this point, the direction of the longitudinal axis of the upper swing structure 3 may be derived from the attachment position of the camera. In particular, the crawlers 1C protrude from the upper swing structure 3. Therefore, the orientation detector 71 can identify the longitudinal direction of the lower traveling structure 1 by detecting an image of the crawlers 1C.

In the case where the upper swing structure 3 is configured to be driven by an electric motor instead of the swing hydraulic motor 2A to swing, the orientation detector 71 may be a resolver.

The input device 72 is provided within the reach of the operator seated in the cabin 10, and receives the operator's various operation inputs to output signals corresponding to the operation inputs. The input device 72 includes a touchscreen provided on the display of the display device D1 that displays various information images, a knob switch provided at the end of the left operating lever 26L or the right operating lever 26R, and a button switch, a lever, a toggle, a dial, etc., provided around the display device D1. A signal corresponding to the details of operation on the input device 72 is fed into the controller 30.

The positioning device 73 measures the position and the orientation of the upper swing structure 3. The positioning device 73 is, for example, a GNSS compass, and detects the position and the orientation of the upper swing structure 3. A detection signal corresponding to the position and the orientation of the upper swing structure 3 is fed into the controller 30. Furthermore, among the functions of the positioning device 73, the function of detecting the orientation of the upper swing structure 3 may be replaced with a direction sensor attached to the upper swing structure 3.

The external display device 74 is attached outside the cabin 10, for example, a side surface of the upper swing structure 3 (specifically, the front side surface, the back side surface or the like of the upper swing structure 3 (the cabin 10)), and displays various kinds of image information to the outside of the cabin 10, namely, workers, etc., around the shovel 100, under the control of the controller 30. Examples of the external display device 74 include a liquid crystal display and an electronic message board.

The external audio output device 75 is, for example, attached to the upper swing structure 3, and outputs audio to the outside of the cabin 10, namely, workers, etc., around the shovel 100. Examples of the external audio output device 75 include a loudspeaker and a buzzer. The same is true for the below-described audio output device D2.

The display device D1 is provided at such a position as to be easily visible by the operator seated in the cabin 10, and displays various information images under the control of the controller 30. Examples of the display device D1 include a liquid crystal display and an organic EL (Electroluminescence) display. The display device D1 may be connected to the controller 30 via an in-vehicle communications network such as a CAN (Controller Area Network) or may be connected to the controller 30 via a one-to-one dedicated line.

The audio output device D2 is, for example, provided in the cabin 10, and outputs various kinds of audio information in response to audio output commands from the controller 30.

The boom angle sensor S1 is attached to the boom 4 to detect the elevation angle of the boom 4 relative to the upper swing structure 3 (hereinafter, "boom angle"), for example, the angle of a straight line connecting the pivot points of the boom 4 at its both ends to the swing plane of the upper swing structure 3 in a side view. Examples of the boom angle sensor S1 may include a rotary encoder, an acceleration sensor, a six-axis sensor, and an IMU (Inertial Measurement Unit), which is hereinafter also the case with the arm angle sensor S2, the bucket angle sensor S3, and the machine body tilt sensor S4. A detection signal corresponding to the boom angle detected by the boom angle sensor S1 is fed into the controller 30.

The arm angle sensor S2 is attached to the arm 5 to detect the pivot angle of the arm 5 relative to the boom 4 (hereinafter "arm angle"), for example, the angle of a straight line connecting the pivot points of the arm 5 at its both ends to the straight line connecting the pivot points of the boom 4 at its both ends in a side view. A detection signal corresponding to the arm angle detected by the arm angle sensor S2 is fed into the controller 30.

The bucket angle sensor S3 is attached to the bucket 6 to detect the pivot angle of the bucket 6 relative to the arm 5 (hereinafter "bucket angle"), for example, the angle of a straight line connecting the pivot point and the distal end (blade edge) of the bucket 6 to the straight line connecting the pivot points of the arm 5 at its both ends in a side view. A detection signal corresponding to the bucket angle detected by the bucket angle sensor S3 is fed into the controller 30.

The machine body tilt sensor S4 detects the tilt state of the machine body (for example, the upper swing structure 3) relative to a predetermined reference plane (for example, a horizontal plane). The machine body tilt sensor S4 is, for example, attached to the upper swing structure 3 to detect the tilt angles of the shovel 100 (namely, the upper swing structure 3) about two axes in its longitudinal direction and lateral direction (hereinafter "longitudinal tilt angle" and "lateral tilt angle"). Detection signals corresponding to the tilt angles (longitudinal tilt angle and lateral tilt angle) detected by the machine body tilt sensor S4 are fed into the controller 30.

The swing state sensor S5 is attached to the upper swing structure 3 to output detection information regarding the swing state of the upper swing structure 3. The swing state sensor S5 detects, for example, the swing angular velocity and the swing angle of the upper swing structure 3. Examples of the swing state sensor S5 include a gyroscope, a resolver, and a rotary encoder. The detection information regarding the swing state detected by the swing state sensor S5 is fed into the controller 30.

When the machine body tilt sensor S4 includes a gyroscope, a six-axis sensor, an IMU or the like that can detect angular velocities about three axes, the swing state (for example, the swing angular velocity) of the upper swing structure 3 may be detected based on a detection signal of the machine body tilt sensor S4. In this case, the swing state sensor S5 may be omitted.

The communications device T1 performs communications with external apparatuses through a predetermined network including a mobile communication network including a base station as a terminal end, a satellite communication network using a communications satellite, or the Internet. The communications device T1 is, for example, a mobile communication module compliant with a mobile communication standard such as LTE (Long Term Evolution), 4G (4th Generation), or 5G ($5^{th}$ generation), a satellite communication module for connecting to a satellite communication network, or the like.

[Gesture Operation Function of Shovel]

Next, the function of enabling the operating elements of the shovel 100 to be operated with a gesture from a worker or the like around the shovel 100 (hereinafter "gesture operation function") is described with reference to FIGS. 7 through 13.

<First Example of Gesture Operation Function of Shovel>

First, a configuration associated with the gesture operation function of the shovel 100 is described with reference to FIG. 7.

Figure 7:
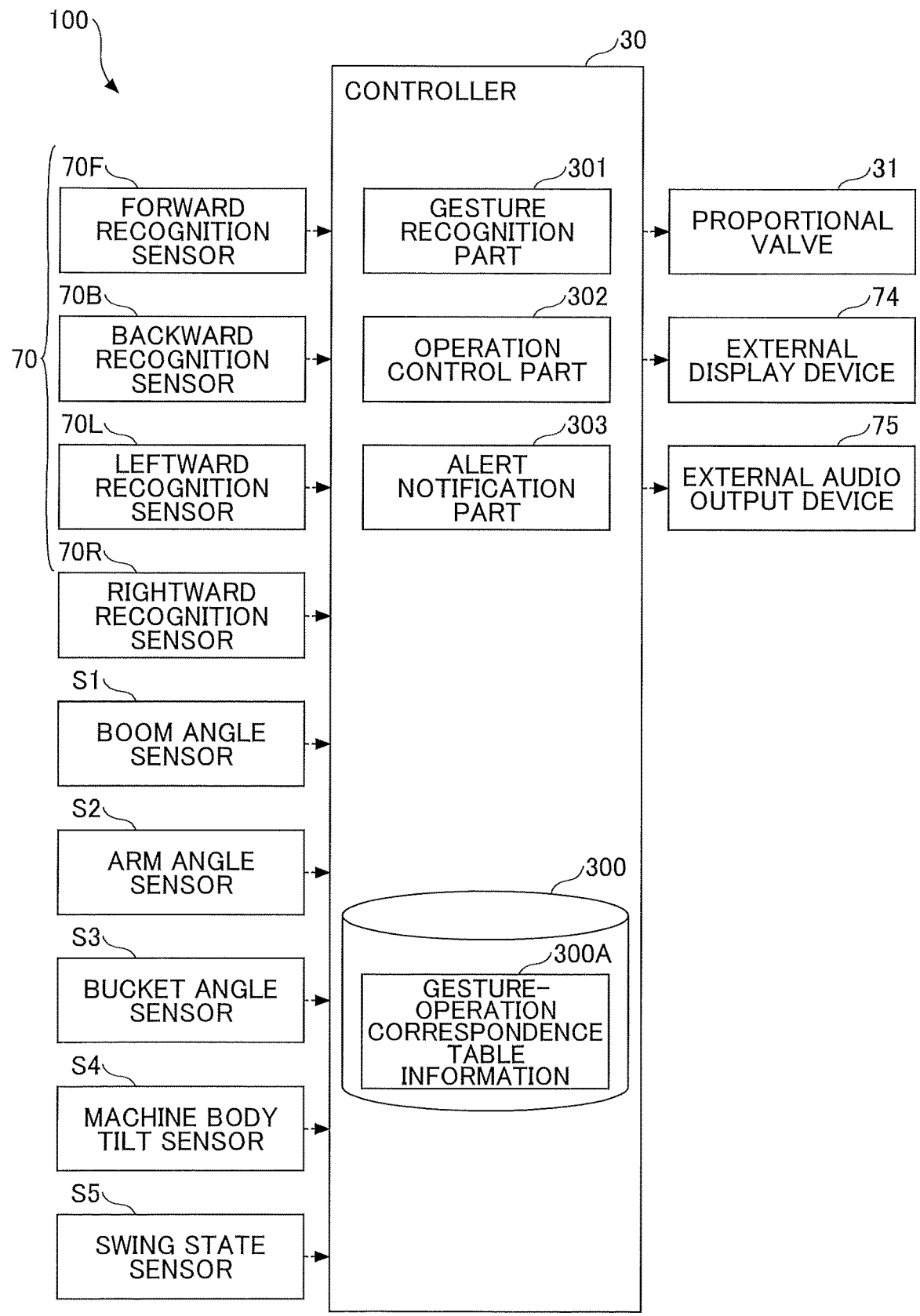
FIG. 7 is a functional block diagram illustrating a first example of a configuration associated with a gesture operation function of the shovel.

FIG. 7 is a functional block diagram illustrating a first example of the configuration associated with the gesture operation function of the shovel 100 (the controller 30).

For example, as functional parts associated with the gesture operation function implemented by executing one or more programs stored in the secondary storage on the CPU, the controller 30 includes a gesture recognition part 301, an operation control part 302, and an alert notification part 303. Furthermore, the controller 30 includes, for example, a storage part 300 serving as a storage area specified in an internal memory such as a non-volatile secondary storage.

The gesture recognition part 301 recognizes a person around the shovel 100, for example, a worker, a work site foreman, or the like (hereinafter "worker"), and recognizes a predetermined gesture (hereinafter "recognition target gesture") made by the recognized worker. The recognition target gesture is one or more gestures predefined for a worker to operate the shovel 100 from an area outside (around) the shovel 100. Specifically, the gesture recognition part 301 recognizes a worker around the shovel 100 and a recognition target gesture made by the worker based on information input from the space recognition device 70, for example, a captured image of an area surrounding the shovel 100, through application of a known image recognition process.

The function of the gesture recognition part 301 may be built into the space recognition device 70 (an example of a recognition part).

For example, the gesture recognition part 301 recognizes and pre-records an instructor who makes a recognition target gesture to give instructions for the operation control part 302 to perform operation control as described below (hereinafter "gesture instructor"). In other words, the shovel 100 may switch to a mode in which operations are performed through gestures (hereinafter "gesture operation mode") serving as one of operating modes in response to the recording of a gesture instructor by the gesture recognition part 301. Specifically, the gesture recognition part 301 may recognize and record a worker as a gesture instructor when the worker has continued the action of staring at the lens of an image capturing device serving as the space recognition device 70 for a certain period of time or more (the start of the gesture operation mode). The gesture recognition part 301 recognizes a recognition target gesture made by the recorded gesture instructor.

When the operating mode of the shovel 100 switches from other than the gesture operation mode to the gesture operation mode, the rotational speed of the engine 11 is changed to a rotational speed predetermined for the gesture operation mode (hereinafter "gesture operation mode rotational speed"). The gesture operation mode rotational speed is set to a value lower than the rotational speed of the engine 11 in the normal operation mode of the shovel 100. Thus, in the case of the gesture operation mode, the operating speed of hydraulic actuators is limited to be lower than in the case of the normal operating mode. Therefore, in the gesture operation mode, the limit values (upper limit values) of the travel operating speed of the lower traveling structure 1, the swing operating speed of the upper swing structure 3, and the operating speed of the attachment are set (restricted) to be lower than in the normal operating mode. Hereinafter, the same may be true for the below-described cases of second through fourth examples.

The gesture recognition part 301 may cancel the recording of a worker as a gesture instructor when an action necessary for the worker being recorded as a gesture instructor (for example, the action of staring at the lens of an image capturing device) has not been performed for a certain period of time after the recording of the worker as a gesture instructor. In this case, the gesture operation mode is canceled.

Furthermore, the gesture recognition part 301 may recognize a worker not recorded as a gesture instructor (hereinafter "non-gesture-instructor") and exceptionally recognize particular kinds of recognition target gestures made by the non-gesture-instructor. The recognition target gestures that are exceptionally processed may be recognition target gestures whose priorities predetermined in view of the safety of the shovel 100 are relatively high among the recognition target gestures. Examples of the recognition target gestures having relatively high priorities to be exceptionally processed may include "stop gesture," "sudden stop gesture," and "cancel gesture" as described below. This makes it possible for even a worker who is not recorded as a gesture instructor to stop or suddenly stop the shovel 100 or cancel control of the operation of the shovel 100 to ensure the safety of the shovel and an area surrounding the shovel 100.

The operation control part 302 controls the operation of an operating element of the shovel 100 (specifically, at least one of the lower traveling structure 1, the upper swing structure 3, the boom 4, the arm 5, the bucket 6, etc.) in response to a worker's recognition target gesture recognized by the gesture recognition part 301. For example, the operation control part 302 controls the operation of an operating element of the shovel 100 based on gesture-operation correspondence table information 300A (an example of correspondence information) stored in the storage part 300. The operation control part 302 can cause various operating elements of the shovel 100 to automatically operate by causing a pilot pressure to act on a control valve corresponding to a hydraulic actuator via the proportional valve 31 and the shuttle valve 32 independent of the operating state of the operating device 26 as described above.

Figure 8:
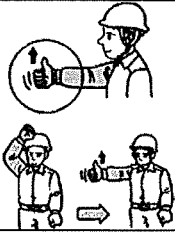
FIG. 8 is a diagram illustrating an example of a correspondence between recognition target gestures and the operation details of operating elements.
Figure 8:
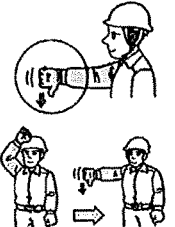
Figure 8:
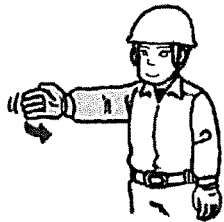
Figure 8:
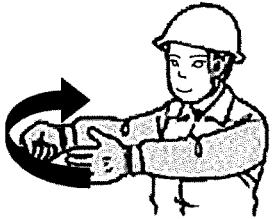
Figure 8:
Figure 8:
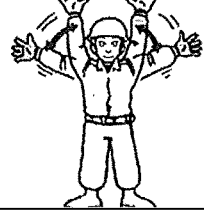
Figure 8:
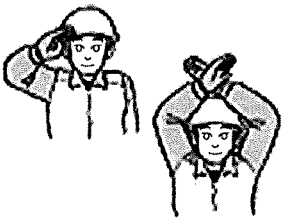

For example, FIG. 8 is a diagram explaining the gesture-operation correspondence table information 300A. Specifically, FIG. 8 is a diagram illustrating an example of the correspondence between recognition target gestures and the operation details of operating elements defined by the gesture-operation correspondence table information 300A.

As illustrated in FIG. 8, according to this example, seven recognition target gestures are defined and the operation details of an operating element with respect to each of the seven recognition target gestures are defined in the gesture-operation correspondence table information 300A.

Specifically, according to this example, a recognition target gesture for raising the attachment AT (for example, raising the boom 4) (hereinafter "attachment raising gesture") is defined in the gesture-operation correspondence table information 300A. More specifically, the attachment raising gesture is the gesture of moving up a closed first from a level with only the thumb pointed upward. The attachment raising gesture may also be the gesture of moving up a closed first from a level with only the thumb pointed upward after placing the first on the head.

Furthermore, according to this example, a recognition target gesture for lowering the attachment AT (for example, lowering the boom 4) (hereinafter "attachment lowering gesture") is defined in the gesture-operation correspondence table information 300A. More specifically, the attachment lowering gesture is the gesture of moving down a closed first from a level with only the thumb pointed downward. The attachment raising gesture may also be the gesture of moving down a closed first from a level with only the thumb pointed downward after placing the first on the head.

Furthermore, according to this example, a recognition target gesture for horizontally moving the shovel 100 (for example, swinging the upper swing structure 3 or causing the lower traveling structure 1 to travel) (hereinafter "horizontal movement gesture") is defined in the gesture-operation correspondence table information 300A. More specifically, the horizontal movement gesture is the gesture of extending an arm substantially horizontally and moving the palm a few times in the direction of movement.

With respect to whether the horizontal movement caused by the horizontal movement gesture corresponds to the swing operation of the upper swing structure 3 or the travel operation of the lower traveling structure 1, a setting may be recorded in the controller 30 (for example, the storage part 300) through the input device 72 or the like, for example. Furthermore, different recognition target gestures may be provided one for each of the swing operation and the travel operation of the shovel 100.

Furthermore, according to this example, a recognition target gesture for causing the lower traveling structure 1 (the crawlers 1C) to do a spin turn (hereinafter "crawler spin turn") (hereinafter "spin turn gesture") is defined in the gesture-operation correspondence table information 300A. More specifically, the spin turn gesture is the gesture of horizontally extending both arms substantially parallel to each other and substantially horizontally turning the alms in such a manner as to wrap the arms in a direction in which the crawlers 1C are caused to do a spin turn.

Furthermore, according to this example, a recognition target gesture for stopping (specifically, stopping and keeping stopped) an operating element of the shovel 100 (hereinafter "stop gesture") is defined in the gesture-operation correspondence table information 300A. More specifically, the stop gesture is the gesture of raising a palm high. The stop gesture may also be the action of raising a palm high and thereafter clenching the fingers.

Furthermore, according to this example, a recognition target gesture for suddenly stopping (specifically, suddenly stopping and keeping stopped) an operating element of the shovel 100 (hereinafter "sudden stop gesture") is defined in the gesture-operation correspondence table information 300A. More specifically, the sudden stop gesture is the gesture of spreading both arms, raising them high, and waving them wildly from side to side.

Furthermore, according to this example, a gesture for canceling the operation of an operating element of the shovel 100 using the gesture operation function, namely, a gesture for canceling the operation control part 302's control of the operation of an operating element of the shovel 100 based on a recognition target gesture (hereinafter "cancel gesture"), is defined in the gesture-operation correspondence table information 300A. More specifically, the cancel gesture is a hand salute gesture. The cancel gesture may also be the gesture of crossing both hands (both arms) above the head.

The recognition target gestures of FIG. 8 are examples, and recognition target gestures corresponding to other operation details of operating elements of the shovel 100 may be further defined in the gesture-operation correspondence table information 300A. For example, a recognition target gesture for causing the shovel 100 to move (travel) following the movement of a worker while keeping the interval between the worker and the shovel 100 constant, etc., may be defined in the gesture-operation correspondence table information 300A. This enables a worker to easily move the shovel 100 to a desired location.

The correspondence between recognition target gestures and their respective operation details of operating elements may be defined in a format other than a table format such as the gesture-operation correspondence table information 300A.

The operation control part 302 selects the operation details of an operating element corresponding to the details of a recognition target gesture recognized by the gesture recognition part 301 from the gesture-operation correspondence table information 300A, and causes the operating element to execute the selected operation details. This enables a worker around the shovel 100 to combine recognition target gestures (for example, the seven recognition target gestures of FIG. 8) to cause the shovel 100 to operate as desired, independent of the operation of the operator in the cabin 10. That is, even in the absence of the operator of the shovel 100, a worker around the shovel 100 can manipulate the operation of the shovel 100 from the surrounding area. For example, a worker can cause the shovel 100 to travel and guide the shovel 100 to a predetermined position with gestures from outside the shovel 100 without riding in the cabin 10 of the shovel 100. Furthermore, for example, even in the absence of the operator of the shovel 100, a worker outside the shovel 100 can alone replace the bucket 6 or perform crane work.

Even when a recognition target gesture is recognized by the gesture recognition part 301, the operation control part 302 does not perform (prevents) operation control of an operating element corresponding to the recognition target gesture if a predetermined condition for permitting execution of the operation details of the operating element corresponding to the recognition target gesture (hereinafter "operation permission condition") is not satisfied. The operation permission condition may include, for example, the condition that "the weight of a load suspended from a hook during crane work is not in a state corresponding to overloading (specifically, a state in which a load exceeds a predetermined reference)." In this case, the weight of the suspended load may be calculated based on the detection value of the pressure sensor of the bottom-side oil chamber of the boom cylinder 7 attached to the boom cylinder 7 and the pose of the attachment AT derived from the detection values of the boom angle sensor S1, the arm angle sensor S2, and the bucket angle sensor S3. Furthermore, the operation permission condition may include, for example, the condition that "the pose of the shovel 100 is stable (specifically, not in a state where the degree of stability with respect to the pose of the shovel 100 is lower than a predetermined reference)." In this case, the degree of stability with respect to the shovel 100 may be calculated from, for example, the pose of the attachment AT derived from the detection values of the boom angle sensor S1, the arm angle sensor S2, and the bucket angle sensor S3, the pose of the machine body derived from the detection value of the machine body tilt sensor S4 (the tilt state of the upper swing structure 3), or the like.

Referring back to FIG. 7, when an operation permission condition corresponding to a recognition target gesture recognized by the gesture recognition part 301 is not satisfied, the alert notification part 303 notifies (imparts) alert information (an alert) to that effect to a worker around the shovel 100. Specifically, the alert notification part 303 notifies a worker around the shovel 100 of alert information (an alert) through the external display device 74 or the external audio output device 75.

Next, a control process associated with the gesture operation function (hereinafter "gesture operation control process") executed by the controller 30 of the shovel 100 is described with reference to FIG. 9.

Figure 9:
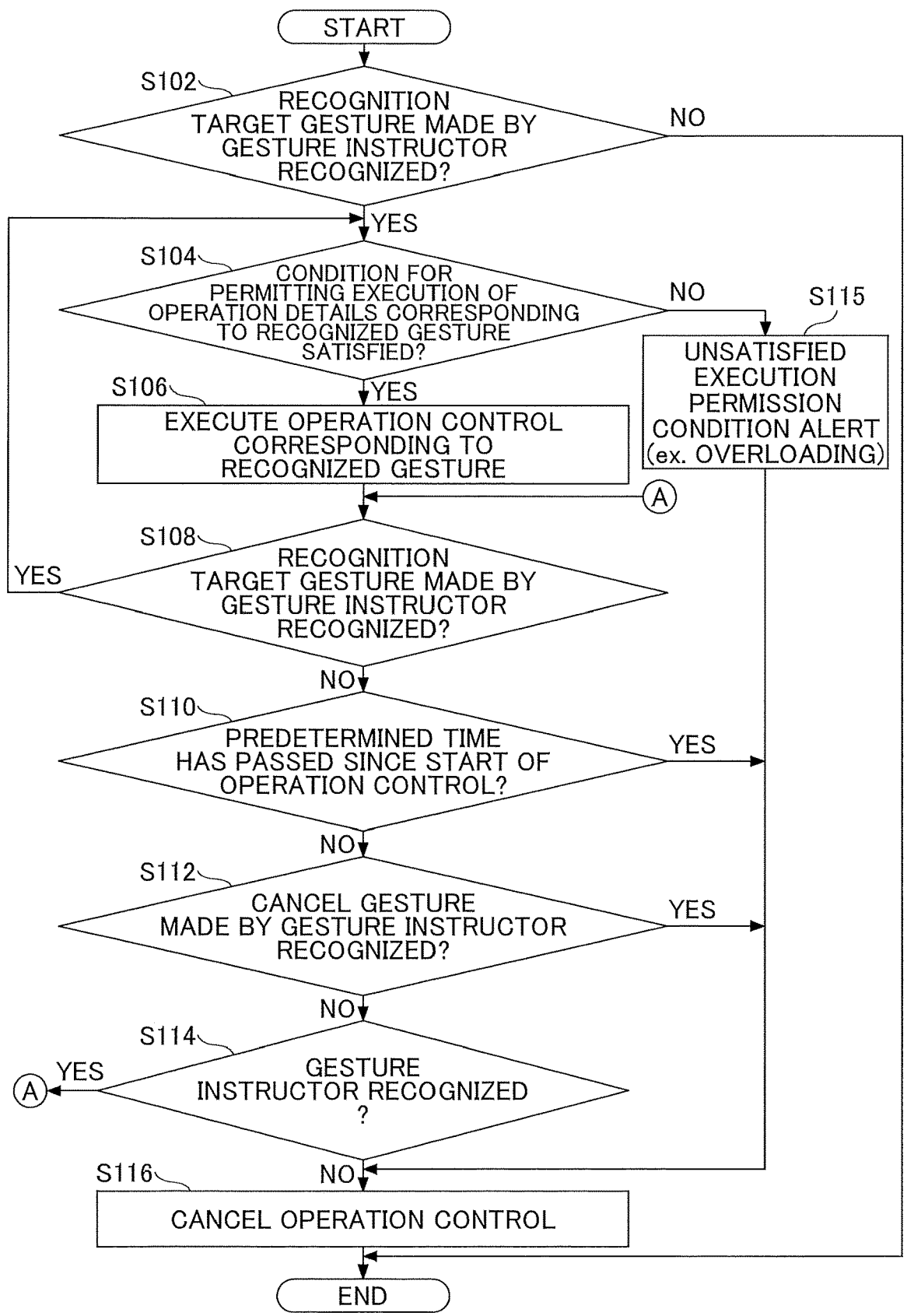
FIG. 9 is a flowchart schematically illustrating an example of a gesture operation control process executed by a controller of the shovel.

FIG. 9 is a flowchart schematically illustrating an example of the gesture operation control process executed by the controller 30. This flowchart is repeatedly executed at predetermined processing intervals, for example, during a period after the completion of the initial processing of the controller 30 at the time of starting the shovel 100 before the start of the termination processing of the controller 30 at the time of stopping the shovel 100.

As illustrated in FIG. 9, at step S102, the gesture recognition part 301 determines whether a recognition target gesture made by a gesture instructor is recognized. The gesture recognition part 301 proceeds to step S104 if a recognition target gesture made by a gesture instructor is recognized, and ends the process according to this flowchart of this time if no recognition target gesture made by a gesture instructor is recognized.

At step S104, the operation control part 302 compares the recognition target gesture recognized by the gesture recognition part 301 with pre-recorded gesture details, and determines whether a condition for permitting execution of the operation details of an operating element corresponding to the recognized recognition target gesture is satisfied. The operation control part 302 proceeds to step S106 if the condition for permitting execution is satisfied, and proceeds to step S115 if the condition for permitting execution is not satisfied.

At step S106, the operation control part 302 performs (starts) operation control with respect to the operation details of an operating element corresponding to the recognition target gesture recognized by the gesture recognition part 301 at step S102.

At step S108, the gesture recognition part 301 determines whether a recognition target gesture other than a cancel gesture made by a worker corresponding to the recognition target gesture recognized at step S102, namely, the gesture instructor, is again recognized. The gesture recognition part 301 returns to step S104 if a recognition target gesture other than a cancel gesture made by the gesture instructor is recognized, and otherwise, proceeds to step S110.

At step S110, the operation control part 302 determines whether a predetermined time has passed since the start of the operation control at step S106. The predetermined time is wait time for canceling the operation control because of the continuance of the absence of operation performed by the worker around the shovel 100 (gesture instructor) (a time lag for determining the cancellation). The operation control part 302 proceeds to step S112 if a predetermined time has not passed since the start of the operation control, and proceeds to step S116 if a predetermined time has passed since the start of the operation control.

At step S112, the gesture recognition part 301 determines whether a cancel gesture made by the gesture instructor is recognized. The gesture recognition part 301 proceeds to step S114 if no cancel gesture made by the gesture instructor is recognized, and proceeds to step S116 if a cancel gesture made by the gesture instructor is recognized.

As described above, the gesture recognition part 301 may recognize a cancel gesture made by a non-gesture-instructor, and in this case, the gesture recognition part 301 proceeds to step S116 if a cancel gesture made by the non-gesture-instructor is recognized.

At step S114, the gesture recognition part 301 determines whether the gesture instructor can be recognized. The gesture recognition part 301 returns to step S108 if the gesture instructor can be recognized, and proceeds to step S116 if the gesture instructor cannot be recognized.

At step S115, the alert notification part 303 outputs an alert to the effect that the condition for permitting execution is not satisfied (hereinafter "unsatisfied execution permission condition alert") to a worker around the shovel 100 (including the gesture instructor) through the external display device 74 or the external audio output device 75, and proceeds to step S116.

At step S116, the operation control part 302 stops all operating elements and thereafter cancels (ends) the operation control started at step S106 to end the process according to this flowchart of this time.

Thus, according to this example, the operation control part 302 controls the operation of an operating element (at least one of the lower traveling structure 1, the upper swing structure 3, the boom 4, the arm 5, the bucket 6, etc.) in response to a worker's predetermined gesture (recognition target gesture) recognized by the gesture recognition part 301.

This enables a worker around the shovel 100 to operate the shovel 100 with a predetermined gesture even in the absence of the operator of the shovel 100 in the cabin 10 as described above.

Furthermore, according to this example, the operation control part 302 may start to control the operation of an operating element in response to a predetermined gesture (recognition target gesture) recognized by the gesture recognition part 301 and thereafter cancel the operation control in response to the passage of a predetermined time.

This enables the controller 30 to cancel unnecessary operation control in such a case as when the absence of operation continues after the start of the operation performed by a worker around the shovel 100 based on the gesture operation function. Therefore, for example, it is possible to prevent unnecessary continuation of a predetermined operation of an operating element to improve the safety of the shovel 100.

Furthermore, according to this example, in the case of having started operation control in response to a predetermined gesture (recognition target gesture) made by a worker recognized by the gesture recognition part 301 (gesture instructor), the operation control part 302 cancels the operation control when a cancel gesture made by the worker is thereafter recognized by the gesture recognition part 301. In other words, the operation control part 302 does not have to cancel the operation control when a cancel gesture made by another worker different from the worker is recognized by the gesture recognition part 301.

This enables the controller 30 to avoid such a situation where another worker different from a worker who has started operation of the shovel 100 based on the gesture operation function cancels control of the operation of the shovel 100.

Furthermore, according to this example, in the case of having started controlling the operation of an operating element in response to a predetermined gesture (recognition target gesture) made by a worker recognized by the gesture recognition part 301, the operation control part 302 stops the operating element (that is, cancels the gesture operation mode) when the worker (gesture instructor) is no longer recognized by the gesture recognition part 301 thereafter.

This makes it possible to stop the shovel 100 even when a worker who has started operation of the shovel 100 based on the gesture operation function leaves an area surrounding the shovel 100 without canceling the operation control of the shovel 100. Therefore, it is possible to achieve both the gesture operation function and the safety of the shovel 100.

<Second Example of Gesture Operation Function of Shovel>

Figure 10:
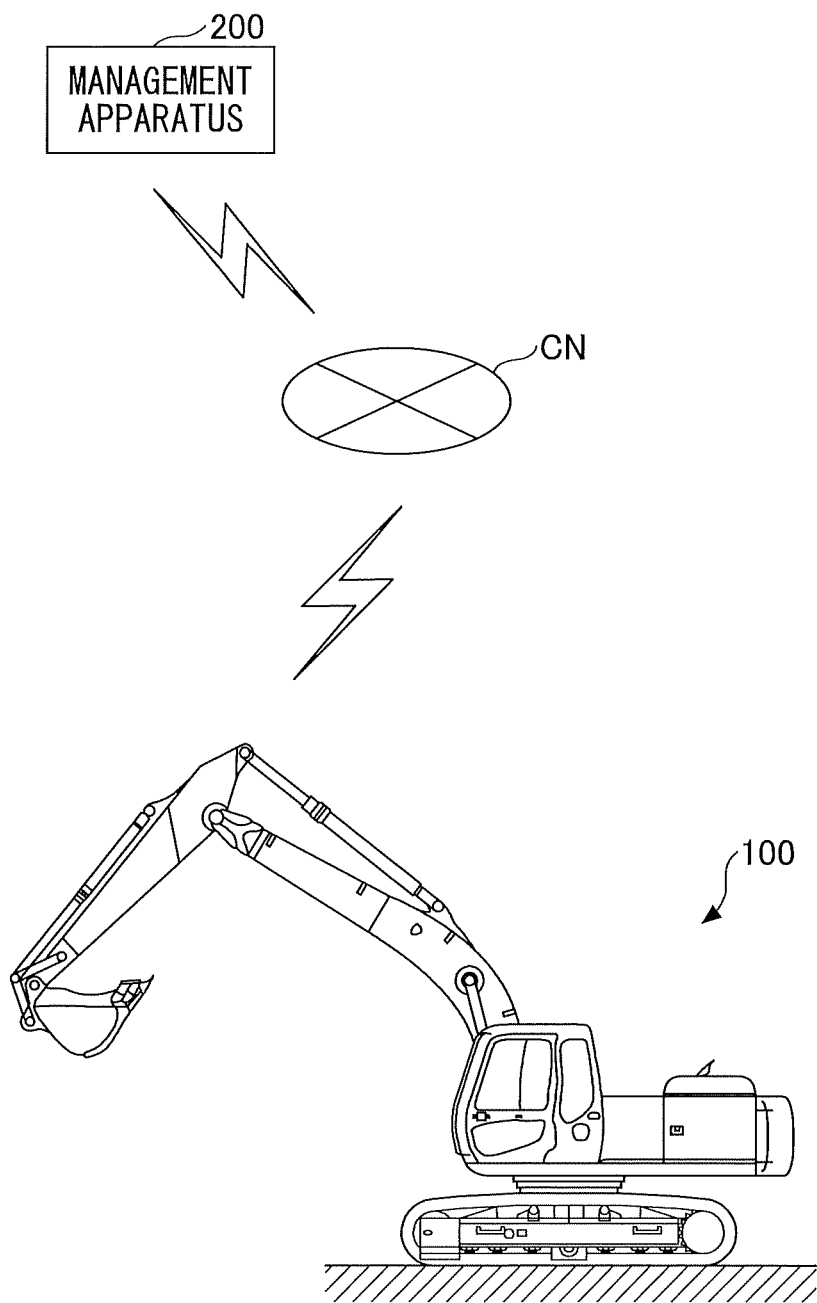
FIG. 10 is a schematic diagram illustrating an example configuration of a remote control system including the shovel.
Figure 11:
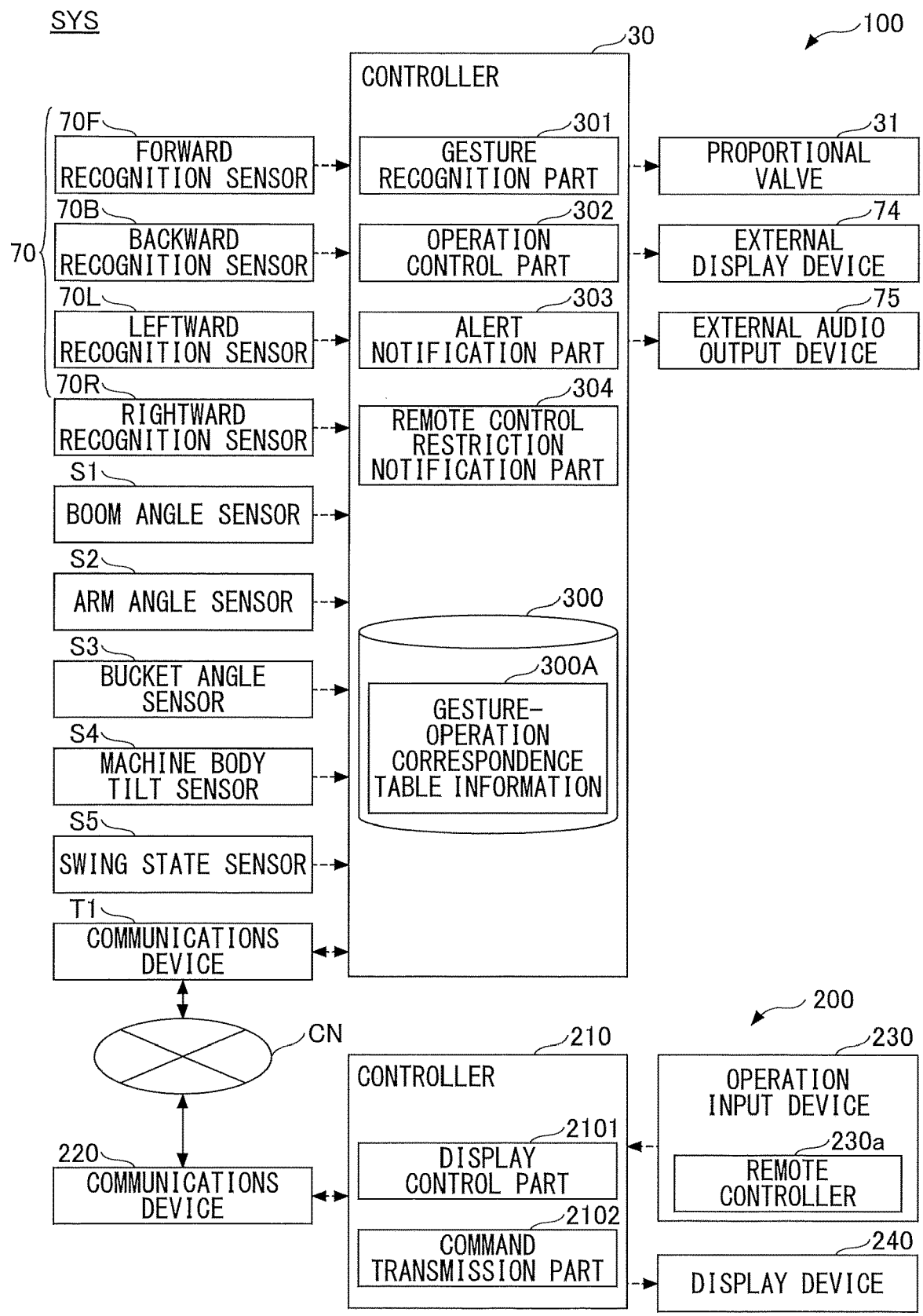
FIG. 11 is a functional block diagram illustrating a second example of the configuration associated with the gesture operation function of the shovel.

First, an overview of a remote control system SYS that serves as a basis for the gesture function of the shovel 100 is given with reference to FIGS. 10 and 11.

FIG. 10 is a schematic diagram illustrating an example of a configuration of the remote control system SYS including the shovel 100. FIG. 11 is a functional block diagram illustrating a second example of the configuration associated with the gesture operation function of the shovel 100, and is specifically a functional block diagram of the remote control system SYS configured to include the second example of the configuration associated with the gesture operation function of the shovel 100 and an example configuration of the management apparatus 200 related to this example.

As illustrated in FIG. 10, the remote control system SYS includes the shovel 100 and the management apparatus 200 connected to the shovel 100 through a communications network CN in such a manner as to be able to bidirectionally communicate with the shovel 100, and is configured in such a manner as to enable a remote operator to remotely control the shovel 100 from the management apparatus 200.

As illustrated in FIG. 11, the management apparatus 200 includes a controller 210, a communications device 220, an operation input device 230, and a display device 240.

The controller 210 executes various control processes associated with the management apparatus 200. The controller 210 may be constituted mainly of one or more server computers each including a CPU, a memory unit such as a RAM, a secondary storage such as a ROM, and various input/output interfaces. For example, the controller 210 includes a display control part 2101 and a command transmission part 2102 as functional parts implemented by executing one or more programs stored in the secondary storage on the CPU.

The communications device 220 is any device that performs bilateral communications with the shovel 100 through the communications network CN under the control of the controller 210.

The operation input device 230 receives various operation inputs to the controller 210 and outputs operation signals corresponding to the details of the operation inputs to the controller 210. The operation input device 230 includes a remote controller 230a.

The remote controller 230a receives operation inputs for remotely controlling operating elements of the shovel 100 (the lower traveling structure 1, the upper swing structure 3, the boom 4, the arm 5, the bucket 6, etc.) and outputs remote control signals corresponding to the details of the operation inputs to the controller 210. The remote controller 230a may be constituted mainly of a lever operating device (for example, a joystick or the like) the same as the operating device 26 of the shovel 100, for example. Hereinafter, an operator who remotely controls the shovel 100 through the remote controller 230a may be referred to as "remote operator" for convenience.

The display device 240 is, for example, a liquid crystal display or an organic EL display, and displays various information images under the control of the controller 210.

The display control part 2101 causes the display device 240 to display various information images.

For example, the display control part 2101 causes the display device 240 to display captured images (specifically, captured images captured by the space recognition device 70) of an area surrounding the upper swing structure 3 (the cabin 10) successively transmitted from the shovel 100. This enables the remote operator to remotely control the shovel 100 while being aware of the surroundings of the upper swing structure 3 and the status of the attachment. Furthermore, as described below, when remote control of the shovel 100 from the management apparatus 200 is restricted, the remote operator can be aware of a work site situation when the remote control is restricted.

Furthermore, when a notification to the effect that remote control from the management apparatus 200 is restricted (prevented) (hereinafter "remote control restriction notification") is received from the shovel 100 through the communications device 220, the display control part 2101 causes the display device 240 to display an information image indicating that remote control is restricted. This enables the remote operator to be aware that a worker's operation of the shovel 100 based on the gesture operation function on a work site is prioritized and that remote control is prevented as described below.

The command transmission part 2102 transmits, in response to a remote control signal input from the remote controller 230a, command information for causing an operating element of the shovel 100 to execute operation details identified by the remote control signal to the shovel 100 through the communications device 220.

Next, the configuration associated with the gesture control function of the shovel 100 is described with reference to FIG. 11.

The controller 30 of the shovel 100 includes the gesture recognition part 301, the operation control part 302, the alert notification part 303, and a remote control restriction notification part 304. Furthermore, the same as in the case of the above-described example, the controller 30, for example, includes the storage part 300 serving as a storage area specified in an internal memory such as a secondary storage, and the gesture-operation correspondence table information 300A is stored in the storage part 300. The following description focuses on differences from the above-described first example (FIGS. 7 through 9).

The operation control part 302 controls, in response to a command signal received from the management apparatus 200 through the communications device T1, the operation of an operating element of the shovel 100 according to operation details specified by the command signal. Specifically, the operation control part 302 can cause various operating elements of the shovel 100 to automatically operate by causing a pilot pressure to act on a control valve corresponding to a hydraulic actuator via the proportional valve 31 and the shuttle valve 32 independent of the operating state of the operating device 26 as described above. This enables the remote operator of the management apparatus 200 to remotely control the shovel 100.

When a recognition target gesture is recognized by the gesture recognition part 301 during execution of the operation control of the shovel 100 based on remote control from the management apparatus 200, the operation control part 302 prioritizes operation control based on the gesture operation function. That is, in this case, the operation control part 302 restricts (prevents) the remote control of the shovel 100 by stopping the operation control based on the remote control, and starts to control the operation of the shovel 100 based on the gesture operation function. This enables the controller 30 to stop the operation of the shovel 100 independent of the details of remote control when the recognition target gesture is, for example, a stop gesture. During remote control of the shovel 100 from the management apparatus 200, an abnormality or the like that cannot be recognized by the remote operator may occur at a work site or in the shovel 100. In response to this, the controller 30 can improve the safety of the shovel 100 by giving priority to the gesture operation function over the remote control function, that is, giving priority to the determination of a worker around the shovel 100 who is likely to be more familiar with the work site situation over the determination of the remote operator. A description of operation control of the shovel 100 performed based on the gesture operation function by the operation control part 302, which is the same as in the above-described example as illustrated in FIGS. 7 through 9, is omitted.

When operation control based on remote control, namely, remote control of the shovel 100 from the management apparatus 200, is restricted (prevented) by the operation control part 302, the remote control restriction notification part 304 transmits a notification to that effect (hereinafter "remote control restriction notification") from the shovel 100 to the management apparatus 200. This enables the remote operator of the management apparatus 200 to look at information corresponding to the remote control restriction notification displayed on the display device 240 to be aware that remote control of the shovel 100 is restricted as described above.

<Third Example of Gesture Operation Function of Shovel>

A configuration associated with the gesture operation function is described with reference to FIGS. 12A and 12B. The following description focuses on differences from the above-described first and second examples, and a description of the same or corresponding portion may be omitted.

Figure 12A:
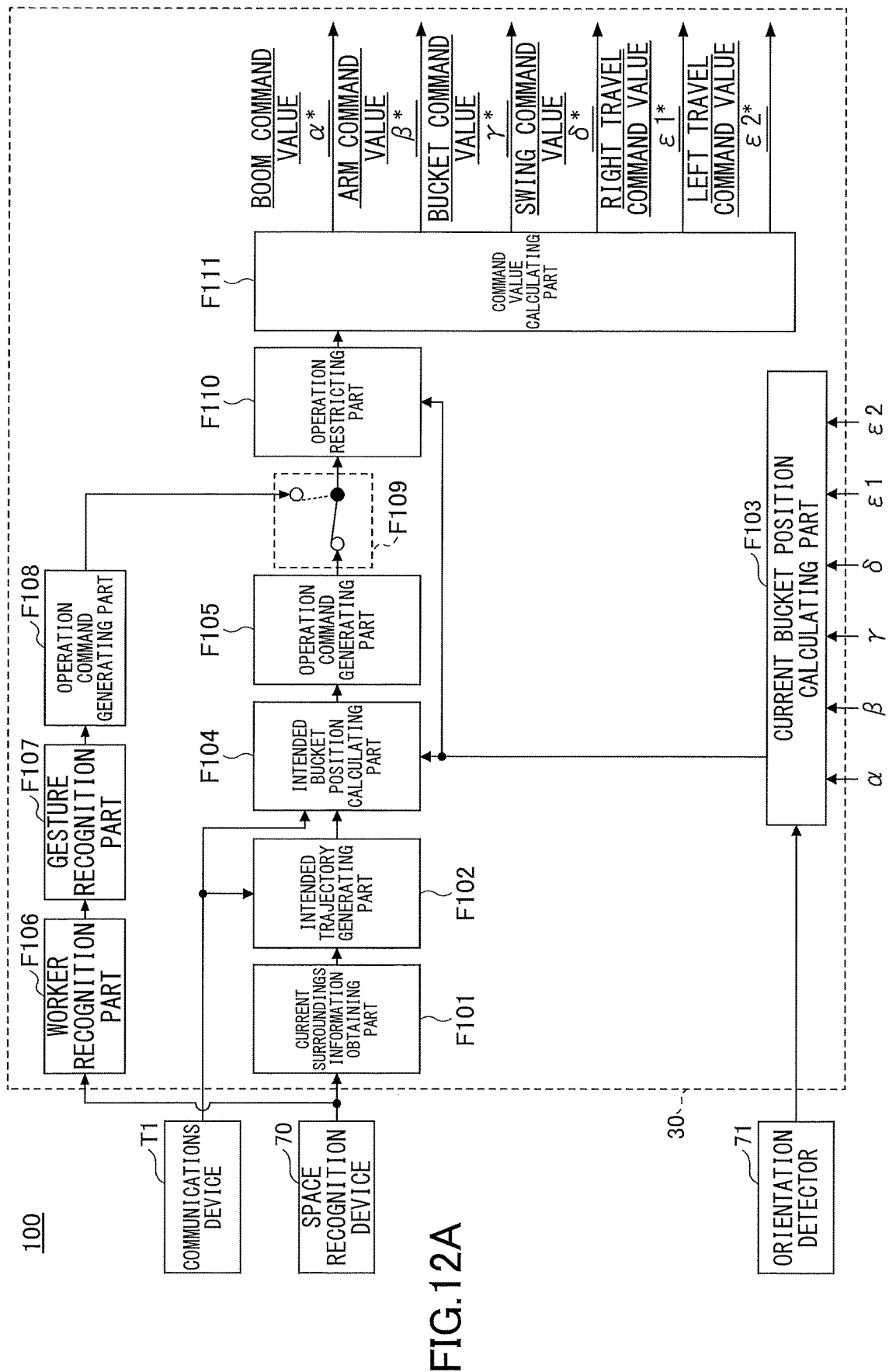
FIG. 12A is a functional block diagram illustrating a third example of the configuration associated with the gesture operation function of the shovel.
Figure 12B:
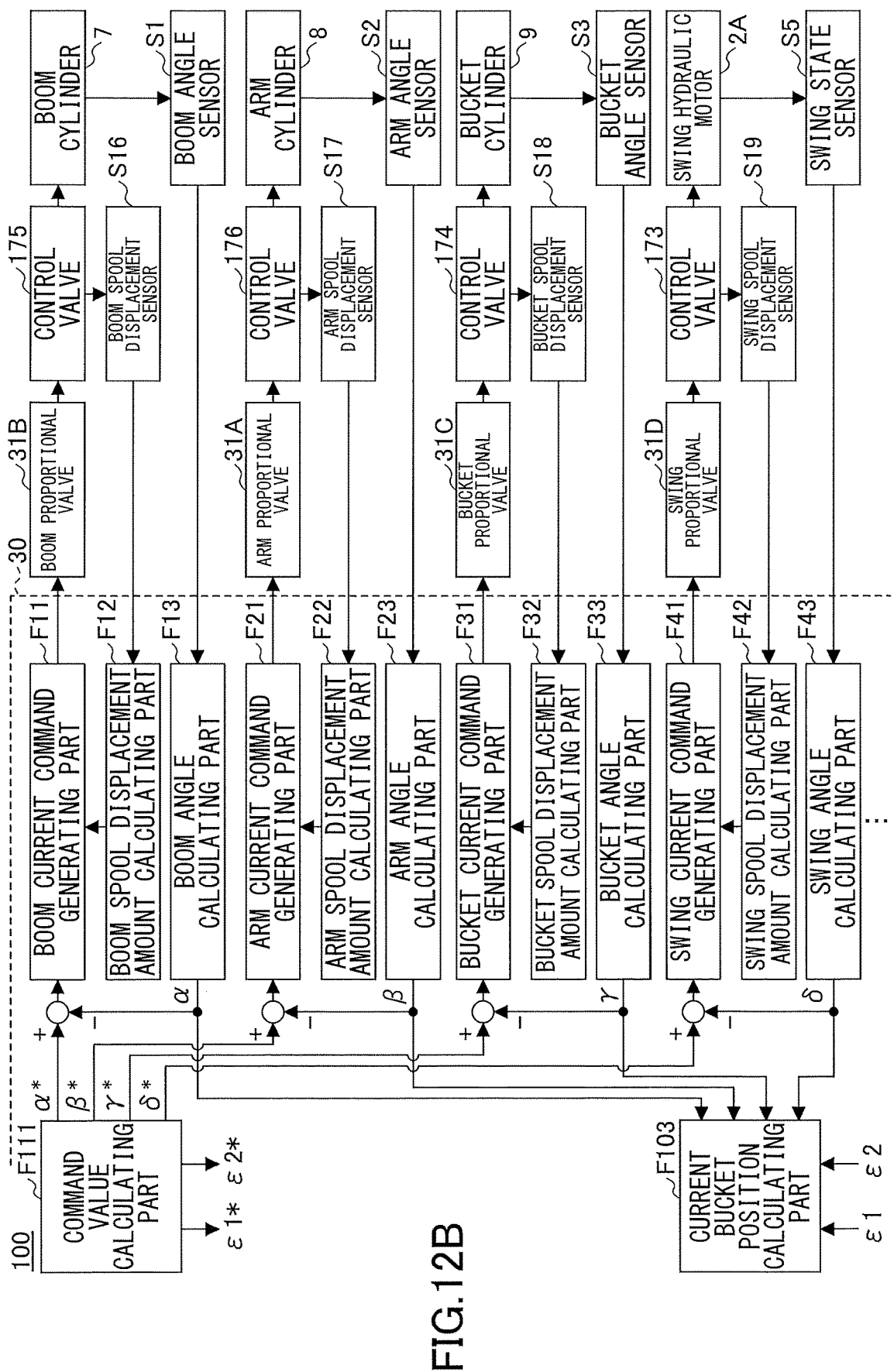
FIG. 12B is a functional block diagram illustrating the third example of the configuration associated with the gesture operation function of the shovel.

FIGS. 12A and 12B are functional block diagrams illustrating a third example of the configuration associated with the gesture operation function of the shovel 100.

According to this example, the shovel 100 is remotely controlled from the management apparatus 200 the same as in the above-described second example to implement the semi-automatic operation function of causing at least one of operating elements (driven elements) to automatically operate in response to a remote control signal received from the management apparatus 200.

As illustrated in FIG. 12A, the controller 30 includes a current surroundings information obtaining part F101, an intended trajectory generating part F102, a current bucket position calculating part F103, an intended bucket position calculating part F104, an operation command generating part F105, a worker recognition part F106, a gesture recognition part F107, an operation command generating part F108, a switch part F109, an operation restricting part F110, and a command value calculating part F111. Furthermore, as illustrated in FIG. 12B, the controller 30 includes a boom current command generating part F11, a boom spool displacement amount calculating part F12, a boom angle calculating part F13, an arm current command generating part F21, an arm spool displacement amount calculating part F22, an arm angle calculating part F23, a bucket current command generating part F31, a bucket spool displacement amount calculating part F32, a bucket angle calculating part F33, a swing current command generating part F41, a swing spool displacement amount calculating part F42, and a swing angle calculating part F43. These functions may be implemented by desired hardware or a combination of desired hardware and software. The controller 30 implements these functions by executing, on the CPU, various programs installed in the secondary storage, for example.

The current surroundings information obtaining part F101 obtains information on the current surroundings of the shovel 100 (hereinafter "current surroundings information") based on the output of the space recognition device 70. The current surroundings information includes, for example, infatuation (for example, the three-dimensional data of a three-dimensional point cloud, surface, or the like) on the shape of the surrounding terrain of the shovel 100. The current surroundings information may include, for example, information on the presence or absence of an object that is a monitoring target in an area surrounding the shovel 100 and its position, orientation, state, etc. Examples of monitoring targets may include persons, animals, work vehicles (for example, dump trucks), construction machines (for example, other shovels, bulldozers, etc.), walls, fences, holes, helmets, and safety vests. For example, when the monitoring target is a dump truck, the current surroundings information may include the position of the dump truck, the amount of earth in the bed, and the shape of earth in the bed.

The intended trajectory generating part F102 generates a trajectory intended for the working part (for example, teeth tips, a back surface, or the like) of the bucket 6 which serves as a reference based on the current surroundings information and information on a work target (for example, information on an intended work surface) received from the management apparatus 200 through the communications device T1.

The current bucket position calculating part F103 calculates the current position of the working part of the bucket 6 (hereinafter "current bucket position"). The current bucket position may be either a position relative to a local reference such as the terrain of or a dump truck in an area surrounding the shovel 100 or an absolute position (absolute coordinates) in the world geodetic system using a GNSS. Specifically, the current bucket position calculating part F103 calculates the current bucket position based on a boom angle $\alpha$, an arm angle $\beta$, a bucket angle $\gamma$, a right drive wheel rotation angle $\epsilon1$, and a left drive wheel rotation angle $\epsilon2$ fed back from the boom angle calculating part F13, the arm angle calculating part F23, the bucket angle calculating part F33, the swing angle calculating part F43, etc., the output of the orientation detector 71, etc.

The intended bucket position calculating part F104 calculates the next intended position of the working part of the bucket 6 (hereinafter "intended bucket position") based on the details of a remote control signal received through the communications device T1, the intended trajectory for the working part of the bucket 6, and the current bucket position.

The operation command generating part F105 generates an operation command for the shovel 100 (for example, an operation command for the bucket 6) for attaining the intended bucket position based on the intended bucket position. The operation command generating part F105 may generate, for example, a speed command for the bucket 6.

The worker recognition part F106 recognizes a worker around the shovel 100 based on the output of the space recognition device 70.

The gesture recognition part F107 (an example of a recognition part) recognizes a recognition target gesture made by a worker around the shovel 100 when the worker is recognized by the worker recognition part F106.

The functions of the worker recognition part F106 and the gesture recognition part F107 may be included in the space recognition device 70 (an example of a recognition part). Hereinafter, the same applies to the functions of a worker recognition part F209 and a gesture recognition part F210 as described below.

The operation command generating part F108 generates an operation command for causing the shovel 100 to perform an operation corresponding to the details of a recognition target gesture when the recognition target gesture is recognized by the gesture recognition part F107.

The switch part F109 (an example of a control part) switches an operation command for the shovel 100 to be input to the operation restricting part F110 between the output of the operation command generating part F105 based on remote control of the shovel 100 and the output of the operation command generating part F108 based on the gesture operation function of the shovel 100. Specifically, normally, that is, when the gesture recognition part F107 recognizes no recognition target gesture of a worker and the operation command generating part F108 outputs no operation command, the switch part F109 outputs an operation command generated by the operation command generating part F105 to the operation restricting part F110. When the gesture recognition part F107 recognizes a recognition target gesture of a worker and the operation command generating part F108 outputs an operation command, the switch part F109 inputs the operation command of the operation command generating part F108 to the operation restricting part F110.

The operation restricting part F110 restricts the operation of the shovel 100 corresponding to an operation command input through the switch part F109 according to a predetermined operation restricting condition. Restrictions on the operation of the shovel 100 include not only controlling (decelerating) the operation of the shovel 100 but also stopping the operation of the shovel 100. Examples of operation restricting conditions may include the condition that "the operation of the shovel 100 corresponding to an operation command may cause a part of the shovel 100 other than the working part to contact a surrounding object." Furthermore, examples of operation restricting conditions may include the condition that "the operation of the shovel 100 corresponding to an operation command may cause the angular velocity of the operating axis of the attachment to be out of its allowable range." Hereinafter, the same applies to an operation restricting part F213 as described below. Specifically, if the operation restricting condition is satisfied, the operation restricting part F110 outputs, to the command value calculating part F111, a corrected operation command into which an operation command input through the switch part F109 is corrected in such a manner as to correct the operation of the shovel 100. If the operation restricting condition is not satisfied, the operation restricting part F110 outputs an operation command input through the switch part F109 directly to the command value calculating part F111.

The command value calculating part F111 outputs command values to driven elements (the boom 4, the arm 5, the bucket 6, the upper swing structure 3, and the right and left crawlers 1CL and 1CR of the lower traveling structure 1) based on an operation command or a corrected operation command input from the operation restricting part F110. Specifically, the command value calculating part F111 outputs a boom command value $\alpha^*$ for the boom 4, an arm command value $\beta^*$ for the arm 5, a bucket command value $\gamma^*$ for the bucket 6, a swing command value $\delta^*$ for the upper swing structure 3, a right travel command value $\epsilon1^*$ for the right crawler 1CR, and a left travel command value $\epsilon2^*$ for the left crawler 1CL.

Thus, the controller 30 can give priority to the gesture operation function over the semi-automatic operation function through remote control of the shovel 100 by the action of the switch part F109 when a recognition target gesture made by a worker is recognized in an area surrounding the shovel 100. In other words, the controller 30 can give priority to the determination (the details of a recognition target gesture) of a worker around the shovel 100 who is likely to be more familiar with a work site situation over the determination (the details of remote control) of a remote operator. Thus, even when an abnormality or the like at a work site or in the shovel 100 which cannot be recognized by the remote operator occurs, it is possible to stop the operation of the shovel 100 at the discretion of the worker at the work site. Therefore, it is possible to improve the safety of the shovel 100 when the shovel 100 is remotely controlled.

The boom current command generating part F11 outputs a boom current command to the boom proportional valve 31B.

The boom spool displacement amount calculating part F12 calculates the amount of displacement of the boom spool of the control valve 175 corresponding to the boom cylinder 7 based on the output of a boom spool displacement sensor S16.

The boom angle calculating part F13 calculates the boom angle $\alpha$ based on the output of the boom angle sensor S1.

The boom current command generating part F11 basically generates a boom current command for the boom proportional valve 31B such that the difference between the boom command value $\alpha^*$ generated by the command value calculating part F111 and the boom angle α calculated by the boom angle calculating part F13 is zero. In this case, the boom current command generating part F11 adjusts the boom current command to eliminate the difference between the intended amount of the displacement of the boom spool derived from the boom current command and the amount of the displacement of the boom spool calculated by the boom spool displacement amount calculating part F12. The boom current command generating part F11 outputs the adjusted boom current command to the boom proportional valve 31B.

The boom proportional valve 31B changes its opening area according to the boom current command and causes a pilot pressure commensurate with the magnitude of the boom current command to act on a pilot port of the control valve 175. The control valve 175 moves the boom spool according to the pilot pressure to cause hydraulic oil to flow into the boom cylinder 7. The boom spool displacement sensor S16 detects the displacement of the boom spool and feeds the detection result back to the boom spool displacement amount calculating part F12 of the controller 30. The boom cylinder 7 extends or retracts as hydraulic oil flows in to raise or lower the boom 4. The boom angle sensor S1 detects the rotation angle of the rising or lowering boom 4 and feeds the detection result back to the boom angle calculating part F13 of the controller 30. The boom angle calculating part F13 feeds the calculated boom angle α back to the current bucket position calculating part F103.

The arm current command generating part F21 outputs an arm current command to the arm proportional valve 31A.

The arm spool displacement amount calculating part F22 calculates the amount of displacement of the arm spool of the control valve 176 corresponding to the arm cylinder 8 based on the output of an arm spool displacement sensor S17.

The arm angle calculating part F23 calculates the arm angle β based on the output of the arm angle sensor S2. The arm current command generating part F21 basically generates an arm current command for the arm proportional valve 31A such that the difference between the arm command value β* generated by the command value calculating part F111 and the arm angle β calculated by the arm angle calculating part F23 is zero. In this case, the arm current command generating part F21 adjusts the arm current command to eliminate the difference between the intended amount of the displacement of the arm spool derived from the arm current command and the amount of the displacement of the arm spool calculated by the arm spool displacement amount calculating part F22. The arm current command generating part F21 outputs the adjusted arm current command to the arm proportional valve 31A.

The arm proportional valve 31A changes its opening area according to the arm current command and causes a pilot pressure commensurate with the magnitude of the arm current command to act on a pilot port of the control valve 176. The control valve 176 moves the arm spool according to the pilot pressure to cause hydraulic oil to flow into the arm cylinder 8. The arm spool displacement sensor S17 detects the displacement of the arm spool and feeds the detection result back to the arm spool displacement amount calculating part F22 of the controller 30. The arm cylinder 8 extends or retracts as hydraulic oil flows in to close or open the arm 5. The arm angle sensor S2 detects the rotation angle of the closing or opening arm 5 and feeds the detection result back to the arm angle calculating part F23 of the controller 30. The arm angle calculating part F23 feeds the calculated arm angle β back to the current bucket position calculating part F103.

The bucket current command generating part F31 outputs a bucket current command to the bucket proportional valve 31C.

The bucket spool displacement amount calculating part F32 calculates the amount of displacement of the bucket spool of the control valve 174 corresponding to the bucket cylinder 9 based on the output of a bucket spool displacement sensor S18.

The bucket angle calculating part F33 calculates the bucket angle γ based on the output of the bucket angle sensor S3.

The bucket current command generating part F31 basically generates a bucket current command for the bucket proportional valve 31C such that the difference between the bucket command value γ* generated by the command value calculating part F111 and the bucket angle γ calculated by the bucket angle calculating part F33 is zero. In this case, the bucket current command generating part F31 adjusts the bucket current command to eliminate the difference between the intended amount of the displacement of the bucket spool derived from the bucket current command and the amount of the displacement of the bucket spool calculated by the bucket spool displacement amount calculating part F32. The bucket current command generating part F31 outputs the adjusted bucket current command to the bucket proportional valve 31C.

The bucket proportional valve 31C changes its opening area according to the bucket current command and causes a pilot pressure commensurate with the magnitude of the bucket current command to act on a pilot port of the control valve 174. The control valve 174 moves the bucket spool according to the pilot pressure to cause hydraulic oil to flow into the bucket cylinder 9. The bucket spool displacement sensor S18 detects the displacement of the bucket spool and feeds the detection result back to the bucket spool displacement amount calculating part F32 of the controller 30. The bucket cylinder 9 extends or retracts as hydraulic oil flows in to close or open the bucket 6. The bucket angle sensor S3 detects the rotation angle of the closing or opening bucket 6 and feeds the detection result back to the bucket angle calculating part F33 of the controller 30. The bucket angle calculating part F33 feeds the calculated bucket angle γ back to the current bucket position calculating part F103.

The swing current command generating part F41 outputs a swing current command to the swing proportional valve 31D.

The swing spool displacement amount calculating part F42 calculates the amount of displacement of the swing spool of the control valve 173 corresponding to the swing hydraulic motor 2A based on the output of a swing spool displacement sensor S19.

The swing angle calculating part F43 calculates the swing angle δ based on the output of the swing state sensor S5.

The swing current command generating part F41 basically generates a swing current command for the swing proportional valve 31D such that the difference between the swing command value δ* generated by the command value calculating part F111 and the swing angle δ calculated by the swing angle calculating part F43 is zero. In this case, the swing current command generating part F41 adjusts the swing current command to eliminate the difference between the intended amount of the displacement of the swing spool derived from the swing current command and the amount of the displacement of the swing spool calculated by the swing spool displacement amount calculating part F42. The swing current command generating part F41 outputs the adjusted swing current command to the swing proportional valve 31D.

The swing proportional valve 31D changes its opening area according to the swing current command and causes a pilot pressure commensurate with the magnitude of the swing current command to act on a pilot port of the control valve 173. The control valve 173 moves the swing spool according to the pilot pressure to cause hydraulic oil to flow into the swing hydraulic motor 2A. The swing spool displacement sensor S19 detects the displacement of the swing spool and feeds the detection result back to the swing spool displacement amount calculating part F42 of the controller 30. The swing hydraulic motor 2A rotates as hydraulic oil flows in to swing the upper swing structure 3. The swing state sensor S5 detects the swing angle of the swinging upper swing structure 3 and feeds the detection result back to the swing angle calculating part F43 of the controller 30. The swing angle calculating part F43 feeds the calculated swing angle δ back to the current bucket position calculating part F103.

Furthermore, for the left crawler 1CL and the right crawler 1CR of the lower traveling structure 1 as well, the same feedback loop as for other driven elements (operating elements) such as the boom 4, the arm 5, the bucket 6, and the upper swing structure 3 is provided. That is, a feedback loop based on the input of the right travel command value ε1* and the left travel command value ε2* generated by the command value calculating part F111 is configured. From this feedback loop, the right drive wheel rotation angle ε1 and the left drive wheel rotation angle ε2 representing the rotational positions (rotation angles) of the drive wheels of the right crawler 1CR and the left crawler 1CL are fed back to the current bucket position calculating part F103.

Thus, the controller 30 configures a three-stage feedback loop for each driven element (operating element). That is, the controller 30 configures a feedback loop associated with the amount of displacement of the spool of a control valve in the control valve 17, a feedback loop associated with the rotation angle of a driven element (operating element), and a feedback loop associated with the position of a working part (for example, the position of the teeth tips) of the bucket 6. Thus, the controller 30 can control the movement of a working part of the bucket 6 with high accuracy in the automatic operation function based on remote control performed by a remote operator. Furthermore, the controller 30 can control the movement of the shovel 100 with high accuracy in the gesture operation function based on a recognition target gesture made by a worker around the shovel 100.

<Fourth Example of Gesture Operation Function of Shovel>

A configuration associated with the gesture operation function is described with reference to FIG. 13. The following description focuses on differences from the above-described first through third examples, and a description of the same or corresponding portion may be omitted.

Figure 13:
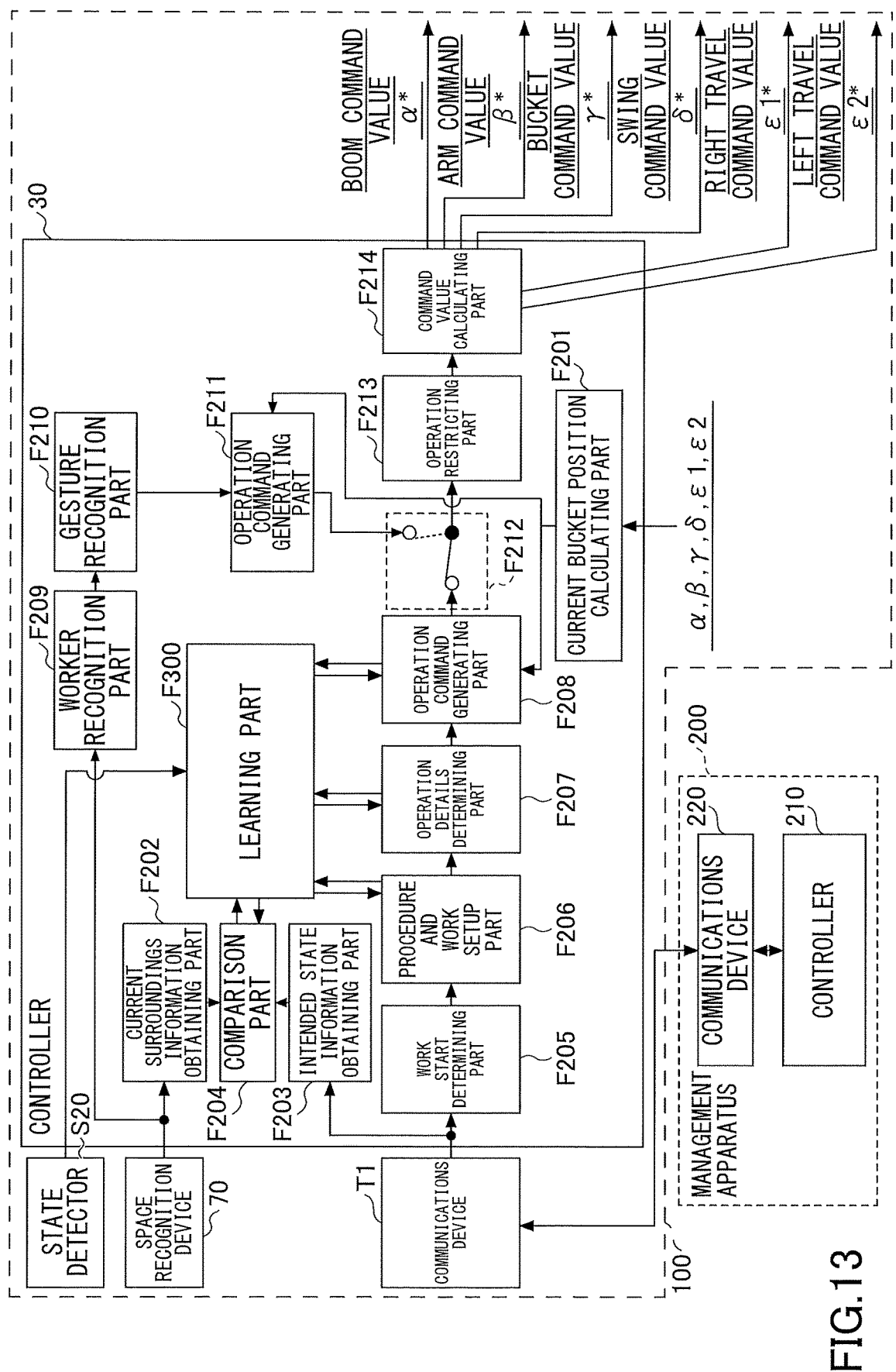
FIG. 13 is a functional block diagram illustrating a fourth example of the configuration associated with the gesture operation function of the shovel.

FIG. 13 is a functional block diagram illustrating a fourth example of the configuration associated with the gesture operation function of the shovel 100.

The functional configuration of causing hydraulic actuators of the shovel 100 to operate based on the output of a command value calculating part F214 in FIG. 13 is equal to a configuration of FIGS. 12A and 12B in which the reference numerals "F103" and "F111" are read as "F201" and "F214", respectively. Therefore, a graphical representation and a description thereof is omitted.

According to this example, the shovel 100 has a machine learning function and an autonomous operation function for autonomously determining its operation details for achieving the intended state of a work site.

As illustrated in FIG. 13, the controller 30 includes a current bucket position calculating part F201, a current surroundings information obtaining part F202, an intended state information obtaining part F203, a comparison part F204, a work start determining part F205, a procedure and work setup part F206, an operation details determining part F207, an operation command generating part F208, the worker recognition part F209, the gesture recognition part F210, an operation command generating part F211, a switch part F212, the operation restricting part F213, and the command value calculating part F214. These functions may be implemented by desired hardware or a combination of desired hardware and software. The controller 30 implements these functions by executing, on the CPU, various programs installed in the secondary storage, for example.

A description of the current bucket position calculating part F201 and the current surroundings information obtaining part F202, which are equal in function to the current bucket position calculating part F103 and the current surroundings information obtaining part F101, respectively, of the above-described third example, is omitted.

The intended state information obtaining part F203 obtains information on the intended state of a work site (hereinafter "intended state information") received from the management apparatus 200 through the communications device T1.

The comparison part F204 compares the current surroundings of the shovel 100 corresponding to the current surroundings information and the intended state of the work site corresponding to the intended state information, and outputs information on their difference (hereinafter "difference information") to a learning part F300.

The work start determining part F205 determines the start of work in response to a command received from the management apparatus 200 through the communications device T1.

The procedure and work setup part F206 (an example of a setup part) sets up a procedure at a work site and the details of work included in the procedure in response to a command received from the management apparatus 200 through the communications device T1. The set-up procedure and work details are input to the learning part F300 and the operation details determining part F207.

The operation details determining part F207 (an example of a determination part) autonomously determines operation details that are in line with the procedure and work details set up by the procedure and work setup part F206 in response to a command from the learning part F300. Furthermore, the determined operation details are input to the learning part F300 and the operation command generating part F208.

The operation command generating part F208 generates an operation command for the shovel 100 (for example, an operation command for the bucket 6) in accordance with a command from the learning part F300, the operation details determined by the operation details determining part F207, and the current position of a working part (for example, the teeth tips, the back surface, or the like) of the bucket 6 (current bucket position). The operation command generating part F208 may generate, for example, a speed command for the bucket 6. The generated operation command is input to the learning part F300 and a switch part F212.

A description of the worker recognition part F209, the gesture recognition part F210 (an example of a recognition part), and the operation command generating part F211, which are equal in function to the worker recognition part F106, the gesture recognition part F107, and the operation command generating part F108, respectively, of the above-described third example, is omitted.

The switch part F212 (an example of a control part) switches an operation command for the shovel 100 to be input to the operation restricting part F213 between the output of the operation command generating part F208 based on the autonomous operation function of the shovel 100 and the output of the operation command generating part F211 based on the gesture operation function of the shovel 100. Specifically, normally, that is, when the gesture recognition part F210 recognizes no recognition target gesture of a worker and the operation command generating part F211 outputs no operation command, the switch part F212 outputs an operation command generated by the operation command generating part F208 to the operation restricting part F213. When the gesture recognition part F210 recognizes a recognition target gesture of a worker and the operation command generating part F211 outputs an operation command, the switch part F212 inputs the operation command of the operation command generating part F211 to the operation restricting part F213.

A description of the operation restricting part F213 and the command value calculating part F214, which are equal in function to the operation restricting part F110 and the command value calculating part F111 of the above-described third example, is omitted.

The learning part F300 implements the machine learning function and the operation assist function of the shovel 100. Specifically, the learning part F300 implements the autonomous operation function of the shovel 100 by outputting a command to the procedure and work setup part F206, the operation details determining part F207, and the operation command generating part F208 based on the output of a state detector S20, using a trained model received from the management apparatus 200 through the communications device T1.

The state detector S20 outputs information detected with respect to various states of the shovel 100. The detected information output from the state detector S20 is fed into the controller 30.

For example, the state detector S20 detects the pose state or operating state of the attachment. Specifically, the state detector S20 may detect the boom angle, the arm angle, and the bucket angle. That is, the state detector S20 may include the boom angle sensor S1, the arm angle sensor S2, and the bucket angle sensor S3 that detects the boom angle, the arm angle, and the bucket angle, respectively. Furthermore, the state detector S20 may detect the accelerations, the angular accelerations, etc., of the boom 4, the arm 5, and the bucket 6. In this case, the state detector S20 may include, for example, a rotary encoder, an acceleration sensor, an angular acceleration sensor, a six-axis sensor, an IMU or the like attached to each of the boom 4, the arm 5, and the bucket 6. Furthermore, the state detector S20 may include cylinder sensors that detect the cylinder positions, speeds, accelerations, etc., of the boom cylinder 7, the arm cylinder 8, and the bucket cylinder 9 that drive the boom 4, the arm 5, and the bucket 6, respectively.

Furthermore, for example, the state detector S20 detects the pose state of the machine body, namely, the lower traveling structure 1 and the upper swing structure 3. Specifically, the state detector S20 may detect the tilt state of the machine body relative to a horizontal plane. That is, the state detector S20 may include the machine body tilt sensor S4.

Furthermore, for example, the state detector S20 detects the swing state of the upper swing structure 3. Specifically, the state detector S20 detects the swing angular velocity and the swing angle of the upper swing structure 3. In this case, the state detector S20 may include, for example, a gyroscope, a resolver, a rotary encoder or the like that is attached to the upper swing structure 3. That is, the state detector S20 may include the swing state sensor S5.

Furthermore, for example, the state detector S20 detects the state of action of a force acting on the shovel 100 through the attachment. Specifically, the state detector S20 may detect the working pressures (cylinder pressures) of hydraulic actuators. In this case, the state detector S20 may include pressure sensors that detect the pressures of the rod-side oil chamber and the bottom-side oil chamber of each of the boom cylinder 7, the arm cylinder 8, and the bucket cylinder 9.

Furthermore, for example, the state detector S20 may include a sensor that detects the displacement of the spool of a control valve in the control valve 17. Specifically, the state detector S20 may include the boom spool displacement sensor S16 that detects the displacement of the boom spool of the control valve 175. Furthermore, the state detector S20 may include the arm spool displacement sensor S17 that detects the displacement of the arm spool of the control valve 176. Furthermore, the state detector S20 may include the bucket spool displacement sensor S18 that detects the displacement of the bucket spool of the control valve 174. Furthermore, the state detector S20 may include the swing spool displacement sensor S19 that detects the displacement of the swing spool of the control valve 173. Furthermore, the state detector S20 may include a right travel spool displacement sensor and a left travel spool displacement sensor that detect the displacements of the right travel spool and the left travel spool of a right travel control valve and a left travel control valve, respectively.

Furthermore, for example, the state detector S20 detects the position of the shovel 100, the orientation of the upper swing structure 3, etc. In this case, the state detector S20 may include, for example, a GNSS (Global Navigation Satellite System) compass, a GNSS sensor, a direction sensor or the like attached to the upper swing structure 3.

The learning part F300 may perform reinforcement learning based on actual performance information obtained during the actual work and procedure, while causing its machine (the shovel 100) to execute the actual work and procedure. This causes the trained model to be additionally trained, thus making it possible to improve performance with respect to the autonomous operation function of the shovel 100. The actual performance information includes actual performance information regarding the procedure, work, and operation of the shovel 100 fed back from the procedure and work setup part F206, the operation details determining part F207, and the operation command generating part F208. Furthermore, the actual performance information includes actual performance information regarding an environmental condition such as the current surroundings of the shovel 100 input from the current surroundings information obtaining part F202 through the comparison part F204. Furthermore, the actual performance information includes actual performance information regarding the results of the procedure, work, and operation of the shovel 100, such as the difference information input from the comparison part F204. This enables the learning part F300 to generate, from the actual performance information, such a work pattern and a procedure pattern as to relatively increase a predetermined target index (an optimum work pattern and an optimum procedure pattern) with respect to each work type or (type of) combination of work details and each environmental condition. The learning part F300 outputs a command corresponding to the optimum work pattern and the optimum procedure pattern under a current environmental condition (for example, a current terrain shape) to the procedure and work setup part F206, the operation details determining part F207, and the operation command generating part F208 based on the difference information input from the comparison part F204. This enables the controller 30 (the operation command generating part F208) to autonomously control its machine (the shovel 100) based on the optimum work pattern and the optimum procedure pattern.

Instead of or in addition to the shovel 100, the management apparatus 200 may additionally train the trained model. In this case, the trained model subjected to additional training (hereinafter "additionally trained model") is transmitted to the shovel 100 with its timing being predetermined, so that the trained model of the shovel 100 is updated to the additionally trained model. Furthermore, the trained model additionally trained in the shovel 100 may be transmitted to the management apparatus 200 with its timing being predetermined. This enables the management apparatus 200 to apply the results of the machine learning of the shovel 100 to other shovels 100 or further perform additional learning from the results of the machine learning of the shovel 100.

Thus, when a recognition target gesture made by a worker is recognized in an area surrounding the shovel 100, the controller 30 can give priority to the gesture operation function over the autonomous operation function of the shovel 100 by the action of the switch part F212. In other words, the controller 30 can give priority to the determination (the details of a recognition target gesture) of a worker around the shovel 100 who is likely to be more familiar with a work site situation over the determination of its machine. Thus, even when a situation where the learning part F300 is prevented from making an appropriate determination occurs at a work site or in the shovel 100 or an abnormality occurs in the autonomous operation function, it is possible to stop the operation of the shovel 100 at the discretion of the worker at the work site. Therefore, it is possible to improve the safety of the shovel 100 in the case of the autonomous operation of the shovel 100.

VARIATIONS AND MODIFICATIONS

An embodiment of the present invention is described in detail above. The present invention, however, is not limited to such a particular embodiment, and variations and modifications may be made without departing from the scope of the subject matter of the present invention described in the claims.

For example, according to the above-described embodiment, the shovel 100 is configured such that various operating elements such as the lower traveling structure 1, the upper swing structure 3, the boom 4, the arm 5, and the bucket 6 are all hydraulically driven. The shovel 100, however, may also be configured such that one or more of them are electrically driven. That is, the configuration, etc., disclosed in the above-described embodiment may also be applied to hybrid shovels, electric shovels, etc.

What is claimed is:

1. A shovel comprising:
an operating element; and
circuitry configured to record a first worker among a plurality of workers in an area surrounding the shovel as a gesture instructor to give an instruction for performing operation control on the operating element, recognize a predetermined gesture made by the recorded first worker, and perform the operation control on the operating element in response to the predetermined gesture made by the recorded first worker,
wherein the circuitry is configured to, in response to recognizing a gesture to stop the operating element made by a second worker other than the first worker while the first worker is recorded as the gesture instructor, give priority to an operation command based on the gesture to stop the operating element made by the second worker over an operation command based on the predetermined gesture made by the recorded first worker.

2. The shovel as claimed in claim 1, wherein the circuitry is further configured to store correspondence information showing correspondence between the predetermined gesture and operation details of the operating element with respect to each of a plurality of predetermined gestures.

3. The shovel as claimed in claim 2, wherein the circuitry is further configured to select operation details corresponding to details of the predetermined gesture made by the recorded first worker from the correspondence information and cause the operating element to execute the selected operation details.

4. The shovel as claimed in claim 1, wherein the circuitry is further configured to start the operation control on the operating element in response to the recognized predetermined gesture and cancel the operation control in response to passage of a predetermined time thereafter.

5. The shovel as claimed in claim 1, wherein
the predetermined gesture includes a cancel gesture for canceling the operation control, and
the circuitry is further configured to, after starting the operation control in response to the predetermined gesture made by the recorded first worker, cancel the operation control when the cancel gesture made by the recorded first worker is recognized and not cancel the operation control when the cancel gesture made by a third worker different from the recorded first worker is recognized.

6. The shovel as claimed in claim 1, wherein the circuitry is further configured to, after starting the operation control in response to the predetermined gesture made by the recorded first worker, stop the operating element when the recorded first worker is no longer recognized.

7. The shovel as claimed in claim 1, further comprising:
an upper swing structure;
an attachment attached to the upper swing structure; and
a sensor placed on the attachment to detect an object in the surrounding area,
wherein the circuitry is configured to recognize the first worker based on an output of the sensor and record the recognized first worker.

8. The shovel as claimed in claim 1, further comprising:
a lever or pedal configured to be operated to operate the operating element.

9. The shovel as claimed in claim 1, further comprising:
a hydraulic pump configured to supply hydraulic oil to a hydraulic actuator configured to drive the operating element; and
an engine configured to drive the hydraulic pump,
wherein a rotational speed of the engine is changed to a preset rotational speed when the circuitry performs the operation control on the operating element in response to the predetermined gesture.

10. The shovel as claimed in claim 1, wherein the circuitry is further configured to set up a procedure based on current surroundings information and intended state information.

11. The shovel as claimed in claim 1, wherein the circuitry is further configured to determine operation details based on current surroundings information and intended state information.

12. The shovel as claimed in claim 1, wherein the circuitry is further configured to switch an operating mode of the shovel to a gesture operation mode to perform operations through gestures, in response to recording the first worker, and to recognize the predetermined gesture made by the recorded first worker after switching the operating mode to the gesture operation mode.

13. The shovel as claimed in claim 12, wherein the circuitry is configured to change a rotational speed of an engine of the shovel to a preset rotational speed lower than a rotational speed in a normal operation mode of the shovel, in response to switching the operating mode of the shovel to the gesture operation mode.

14. The shovel as claimed in claim 1, wherein the circuitry is further configured to cancel the recording of the first worker as the gesture instructor in response to an action of the first worker necessary to record the first worker as the gesture instructor being absent for a certain period of time after the recording of the first worker.

15. The shovel as claimed in claim 1, wherein the circuitry is configured to recognize and record the first worker in response to a predetermined action made by the first worker.

16. The shovel as claimed in claim 1, wherein the circuitry is further configured not to perform the operation control on the operating element in response to the predetermined gesture made by the recorded first worker, in response to determining that a predetermined condition for permitting execution of operation details of the operating element corresponding to the predetermined gesture is not satisfied.

17. The shovel as claimed in claim 16, wherein the circuitry is further configured to alert the recorded first worker that the predetermined condition is not satisfied in response to determining that the predetermined condition is not satisfied.

* * * * *